United States Patent [19]
Utagawa et al.

[11] Patent Number: 5,650,863
[45] Date of Patent: Jul. 22, 1997

[54] IMAGE READING AND COPYING USING PLURAL ILLUMINATION SOURCES HAVING DIFFERENT CHARACTERISTICS

[75] Inventors: Tsutomu Utagawa; Shinobu Arimoto, both of Yokohama; Kazuo Yoshinaga, Machida; Toshio Hayashi, Kawasaki; Takehiko Nakai, Tokyo; Tetsuya Nagase, Kawasaki; Nobuatsu Sasanuma, Yokohama, all of Japan

[73] Assignee: Canon Kabushiki Kaisha, Tokyo, Japan

[21] Appl. No.: 449,373

[22] Filed: May 24, 1995

Related U.S. Application Data

[63] Continuation of Ser. No. 140,542, Oct. 22, 1993.

[30] Foreign Application Priority Data

| Oct. 23, 1992 | [JP] | Japan | 4-286348 |
| Oct. 23, 1992 | [JP] | Japan | 4-286349 |
| Oct. 23, 1992 | [JP] | Japan | 4-286380 |
| Oct. 23, 1992 | [JP] | Japan | 4-286381 |

[51] Int. Cl.[6] .................................................. H04N 1/40
[52] U.S. Cl. ...................................... 358/475; 358/518
[58] Field of Search ............................... 358/474-475, 358/518, 515

[56] References Cited

U.S. PATENT DOCUMENTS

| 3,912,861 | 10/1975 | Vandling | 358/475 |
| 4,739,377 | 4/1988 | Allen | 355/133 |
| 5,075,787 | 12/1991 | Shaughnessy et al. | 358/452 |
| 5,212,558 | 5/1993 | Obata et al. | 358/296 |
| 5,216,498 | 6/1993 | Matsunawa et al. | 358/518 |
| 5,239,392 | 8/1993 | Suzuki | 358/475 |

FOREIGN PATENT DOCUMENTS

0342060   11/1989   European Pat. Off. .

*Primary Examiner*—Stephen Brinich
*Attorney, Agent, or Firm*—Fitzpatrick, Cella, Harper & Scinto

[57] ABSTRACT

An image reading apparatus includes, as an arrangement for discriminating a specific image with high precision, first illumination means for illuminating an object image so as to perform a normal reading operation, second illumination means for illuminating the object image with light having characteristics different from those of the light from the first illumination means so as to discriminate whether or not the object image is a specific image, and means for adjusting the quantity of light emitted from the first and second illumination means.

52 Claims, 45 Drawing Sheets

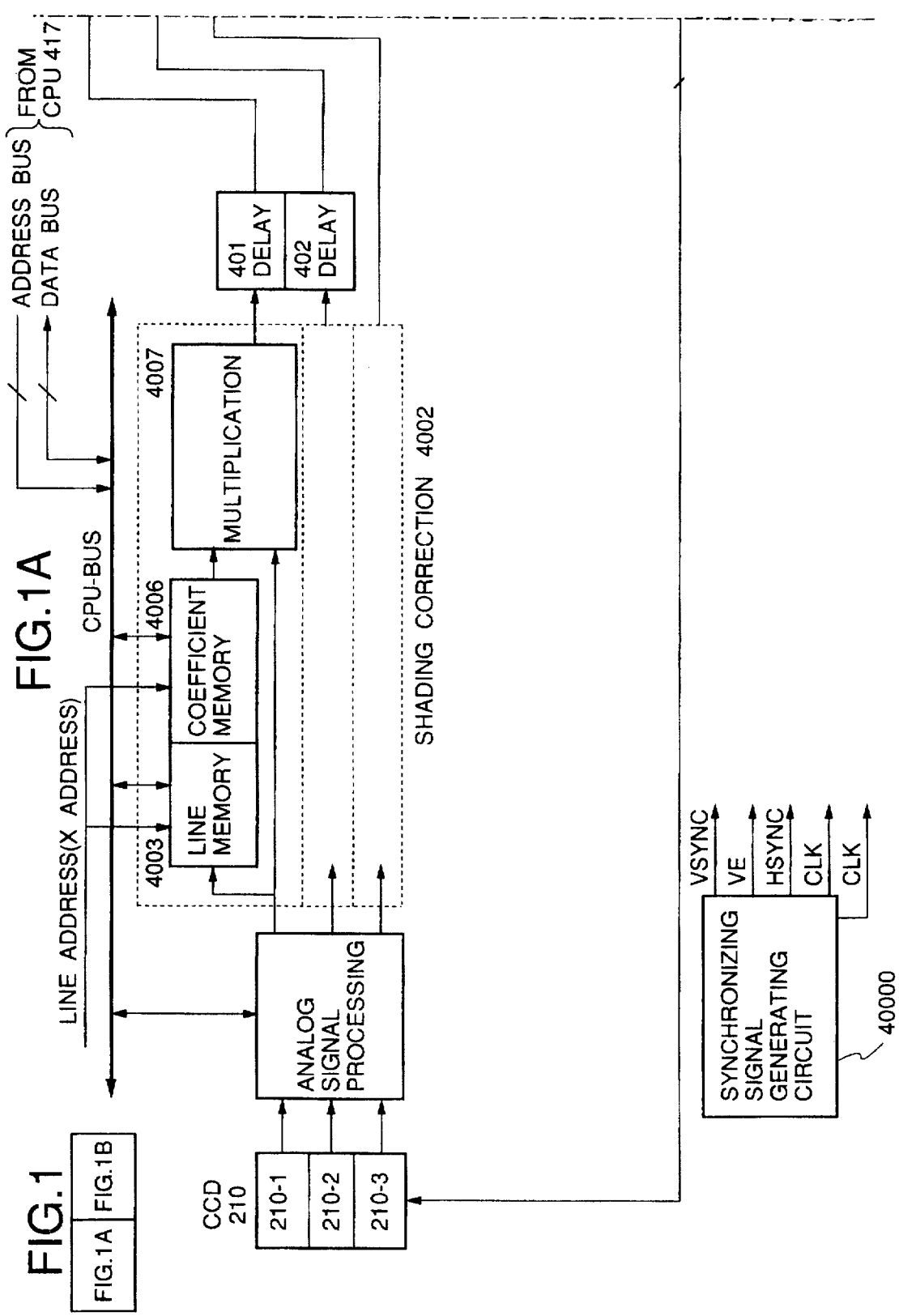

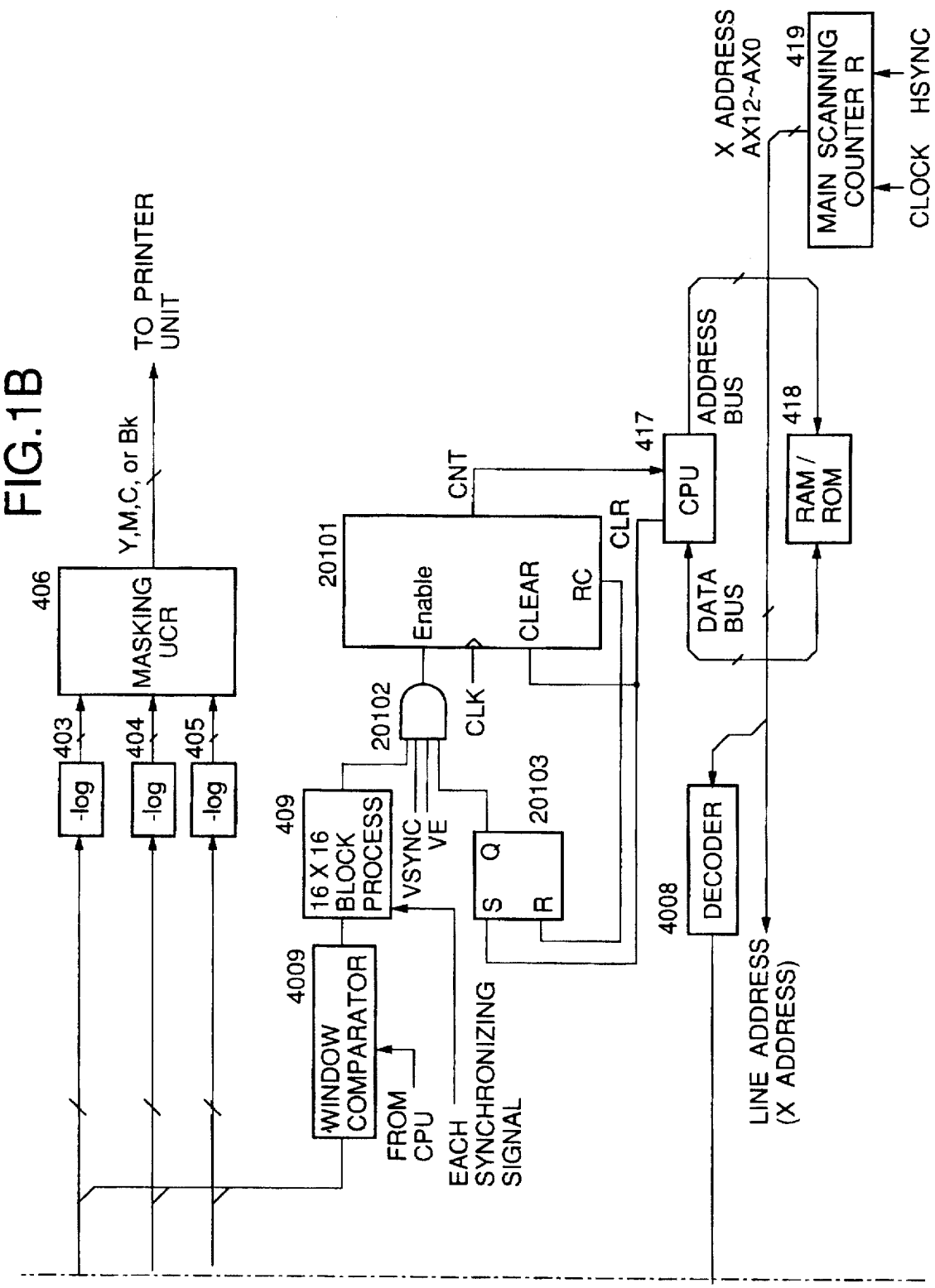

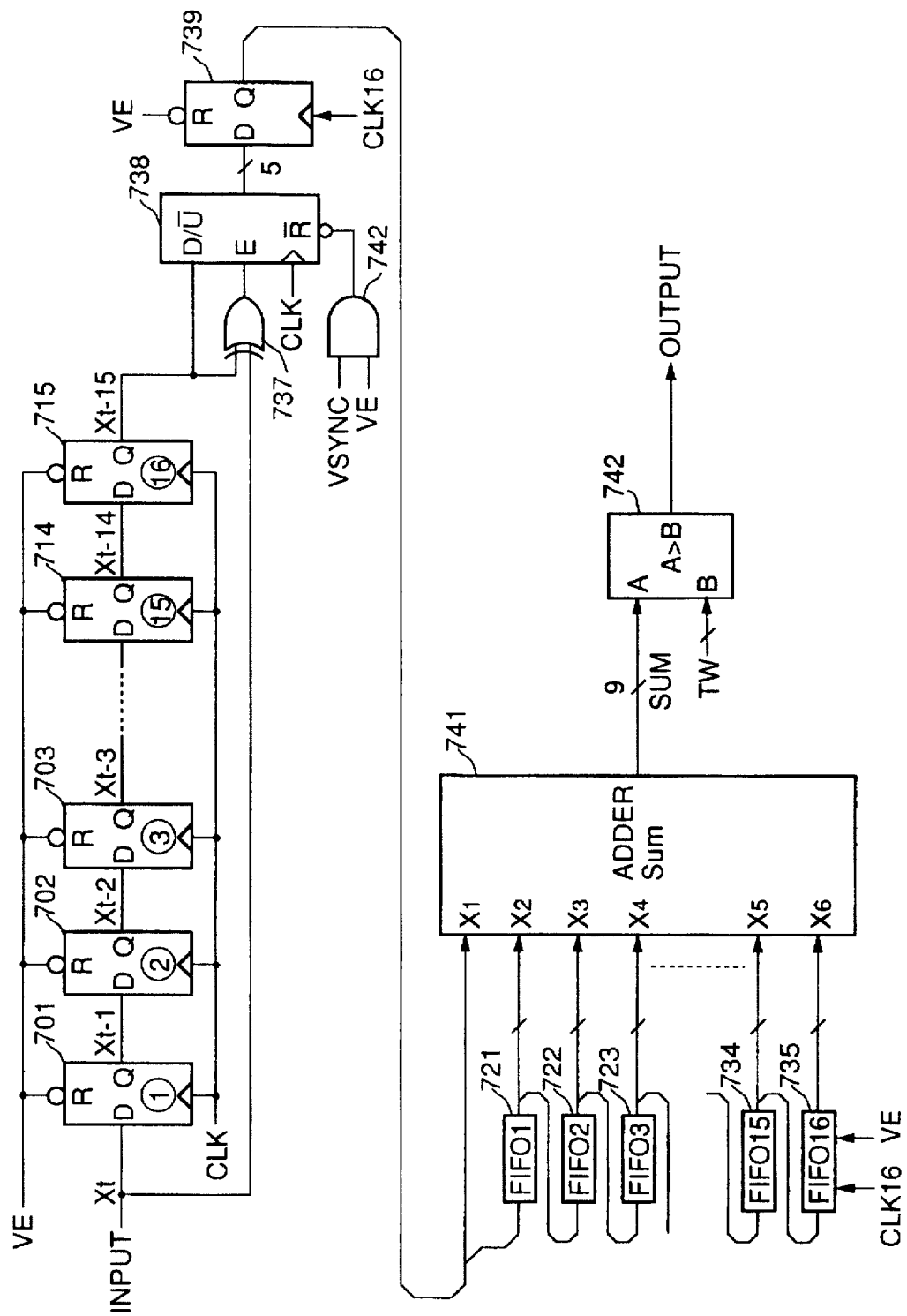

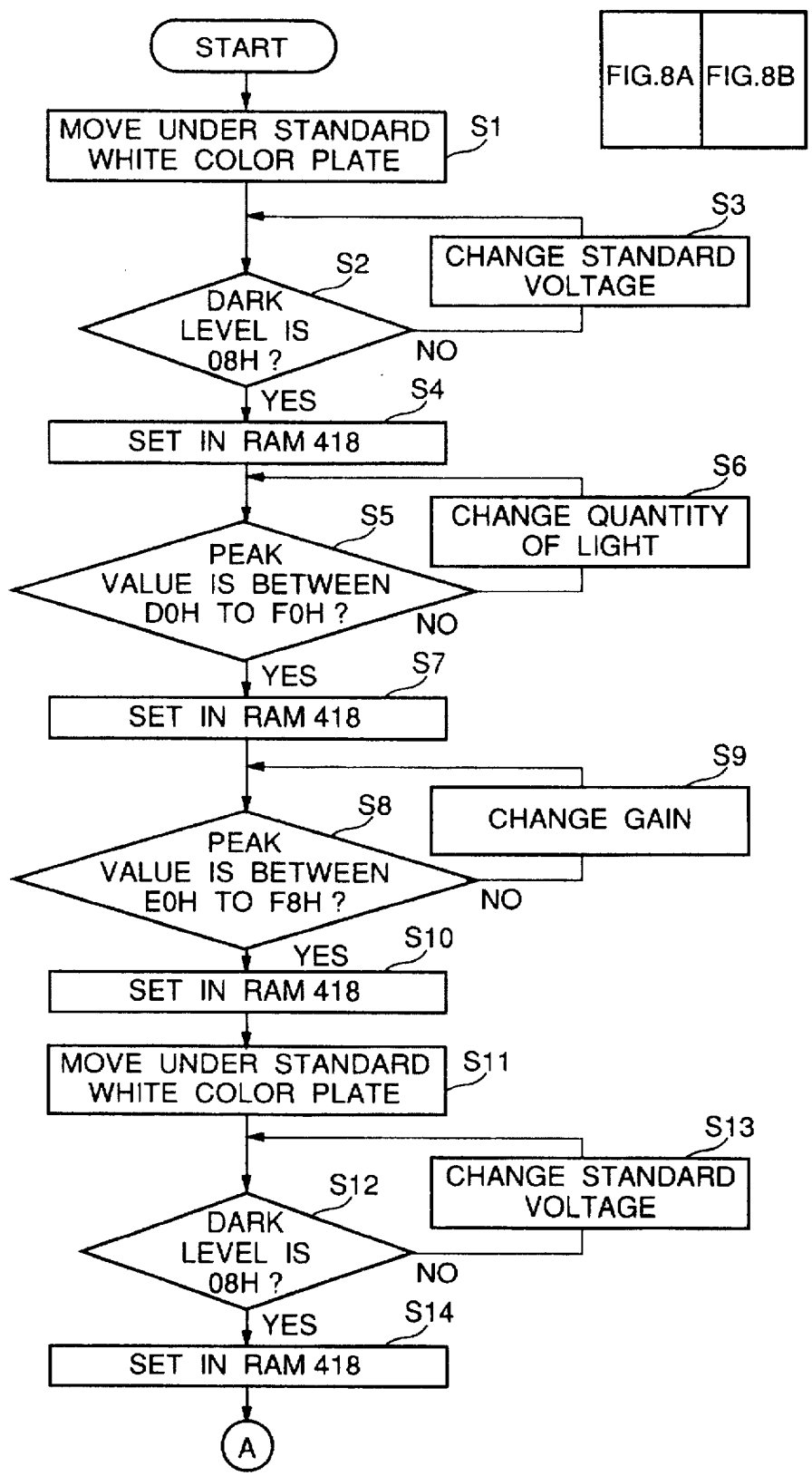

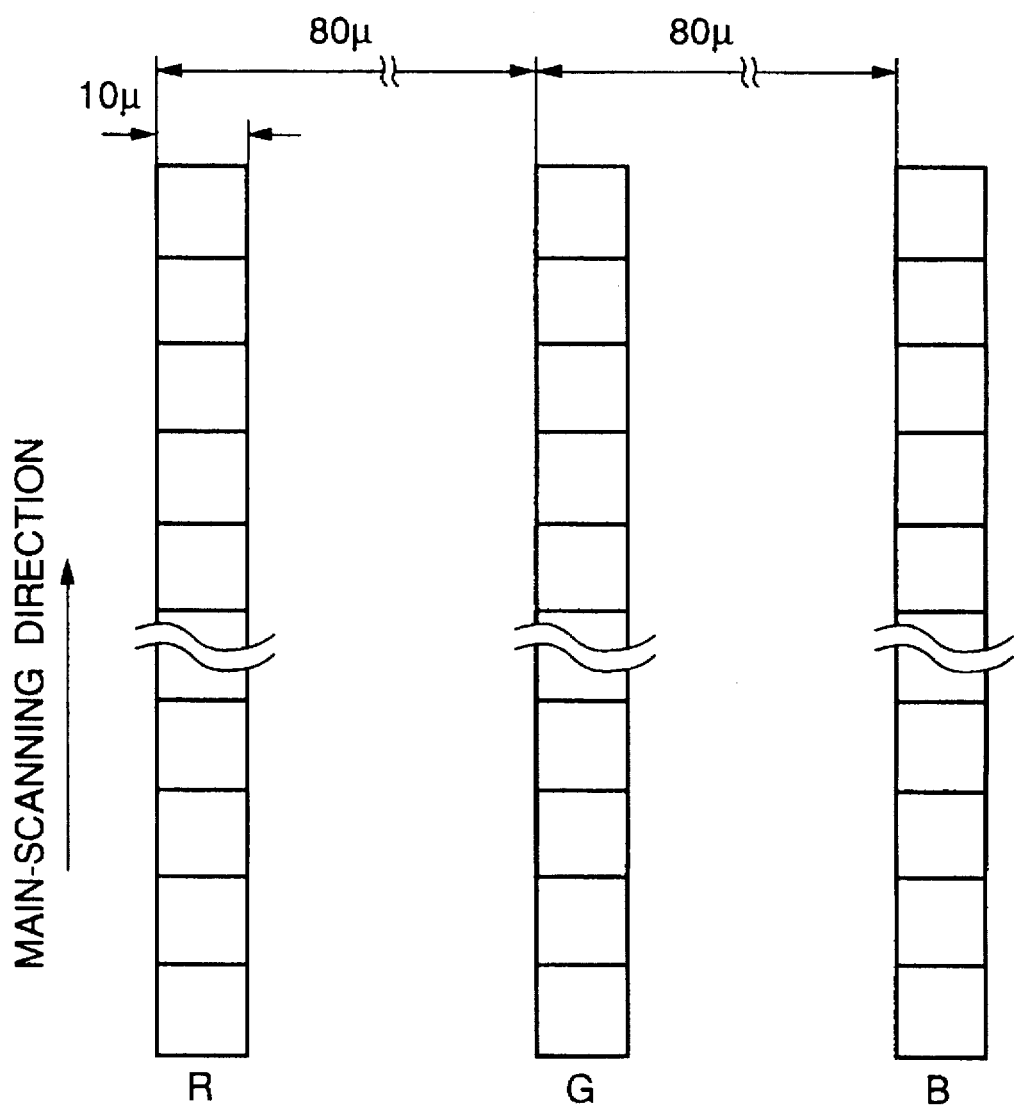

INFRARED FLUORESCENT PATTERN
IN WHICH VISIBLE RADIATION
IS TRANSMITTED

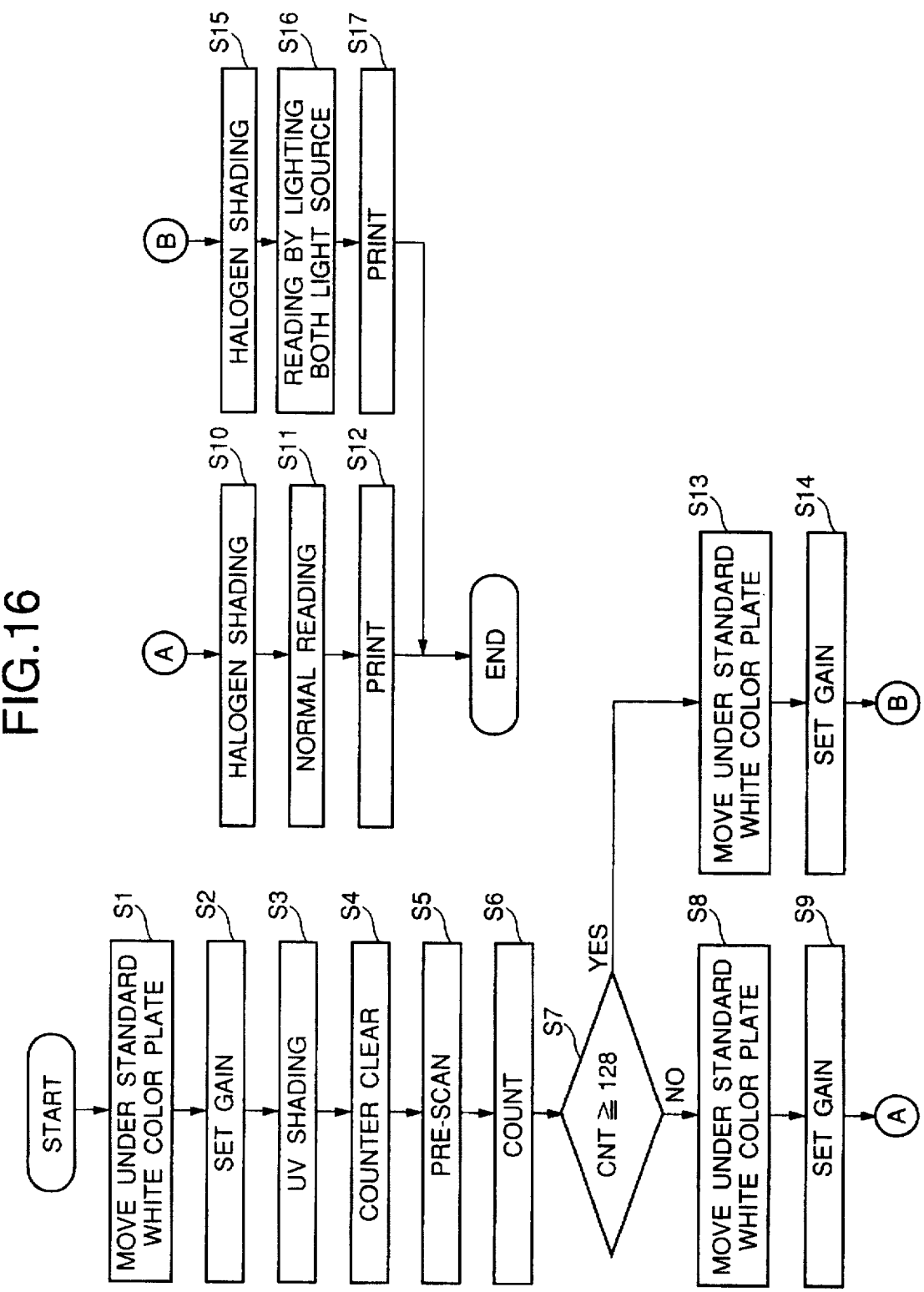

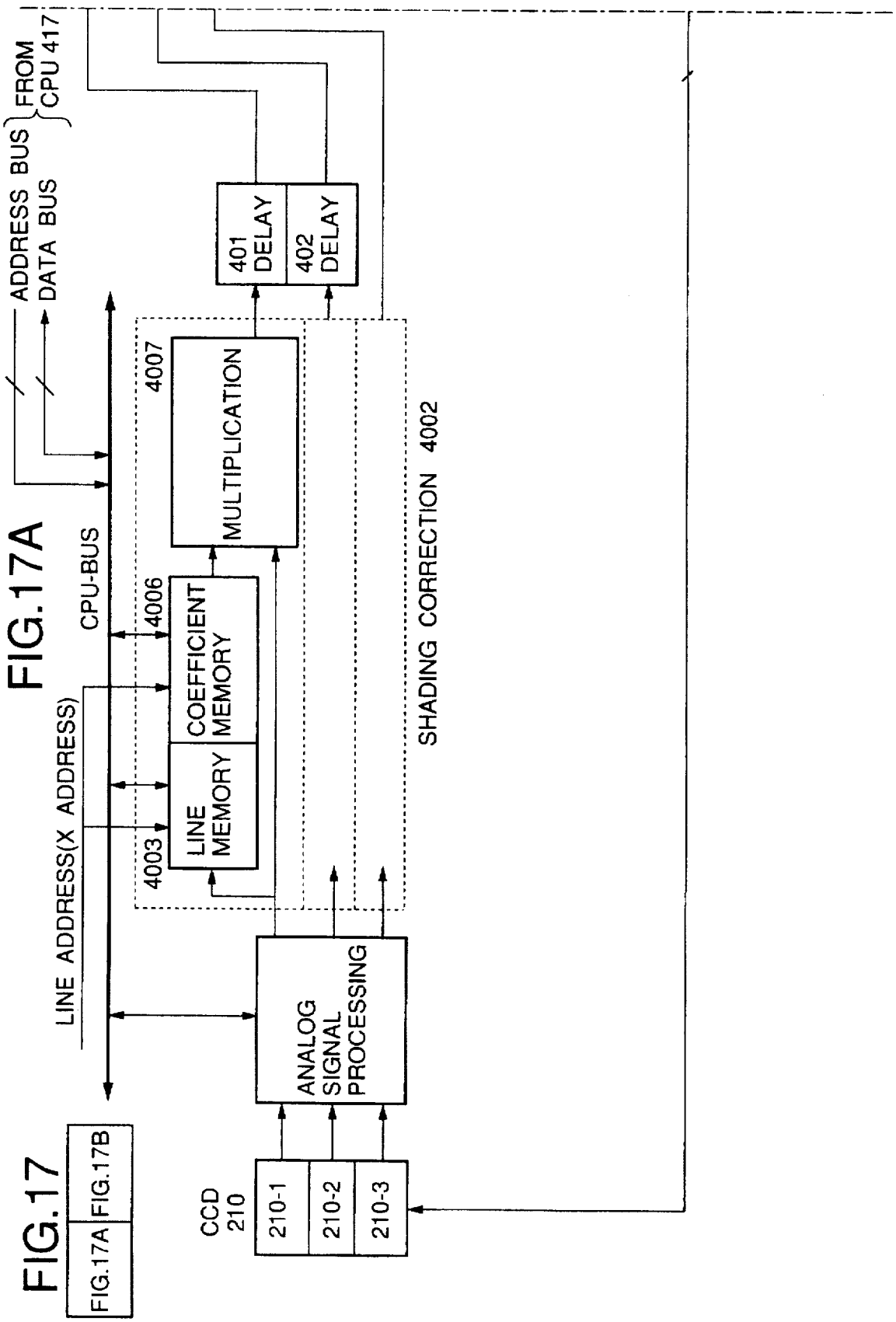

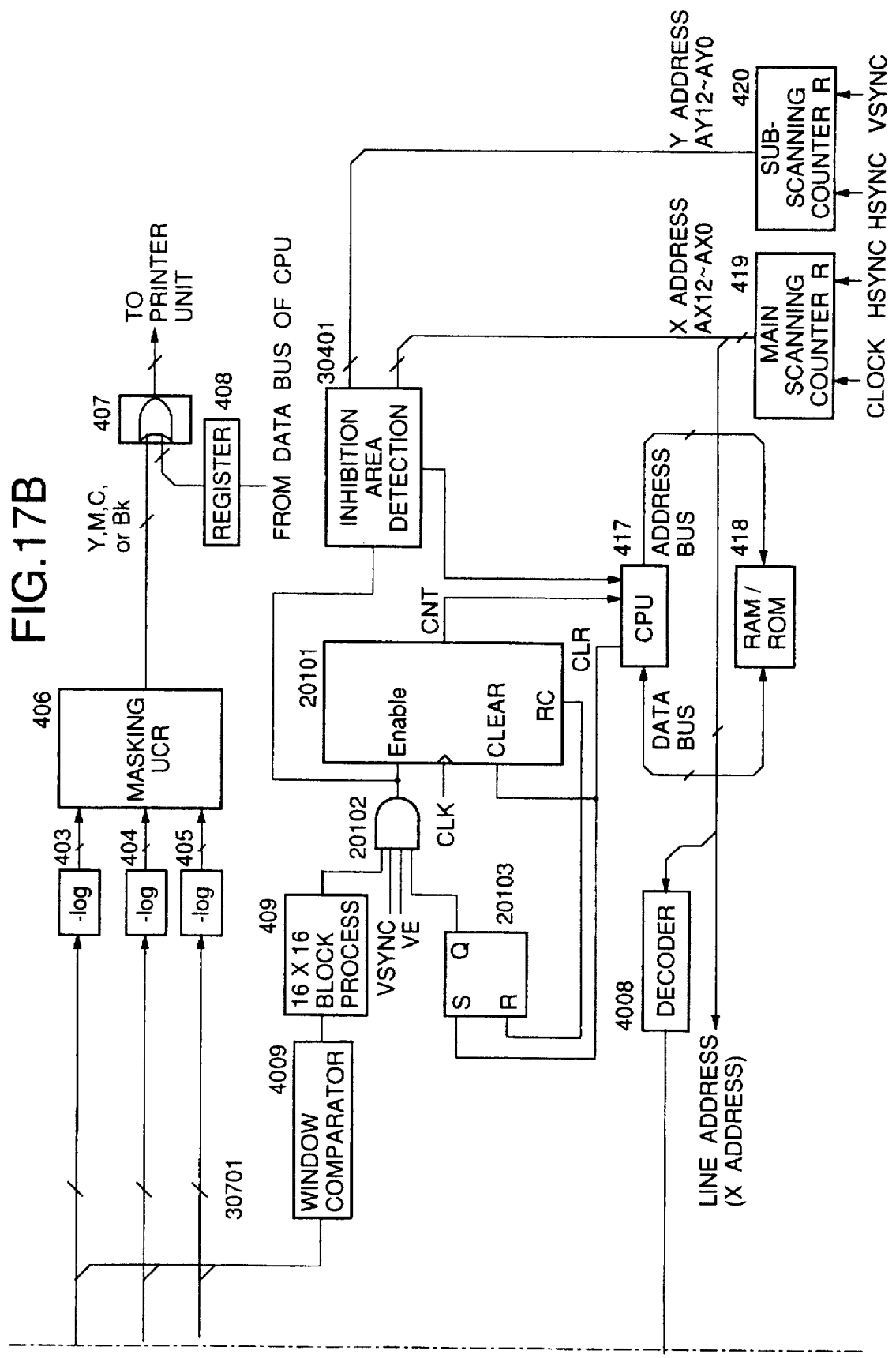

FIG.22A Hsync 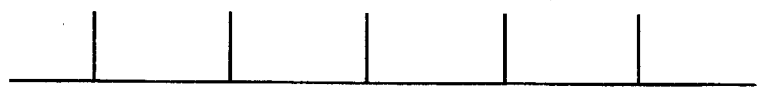
FIG.22B TG 
FIG.22C RC 
FIG.22D TGO 
FIG.22E VE 
FIG.22F WE 

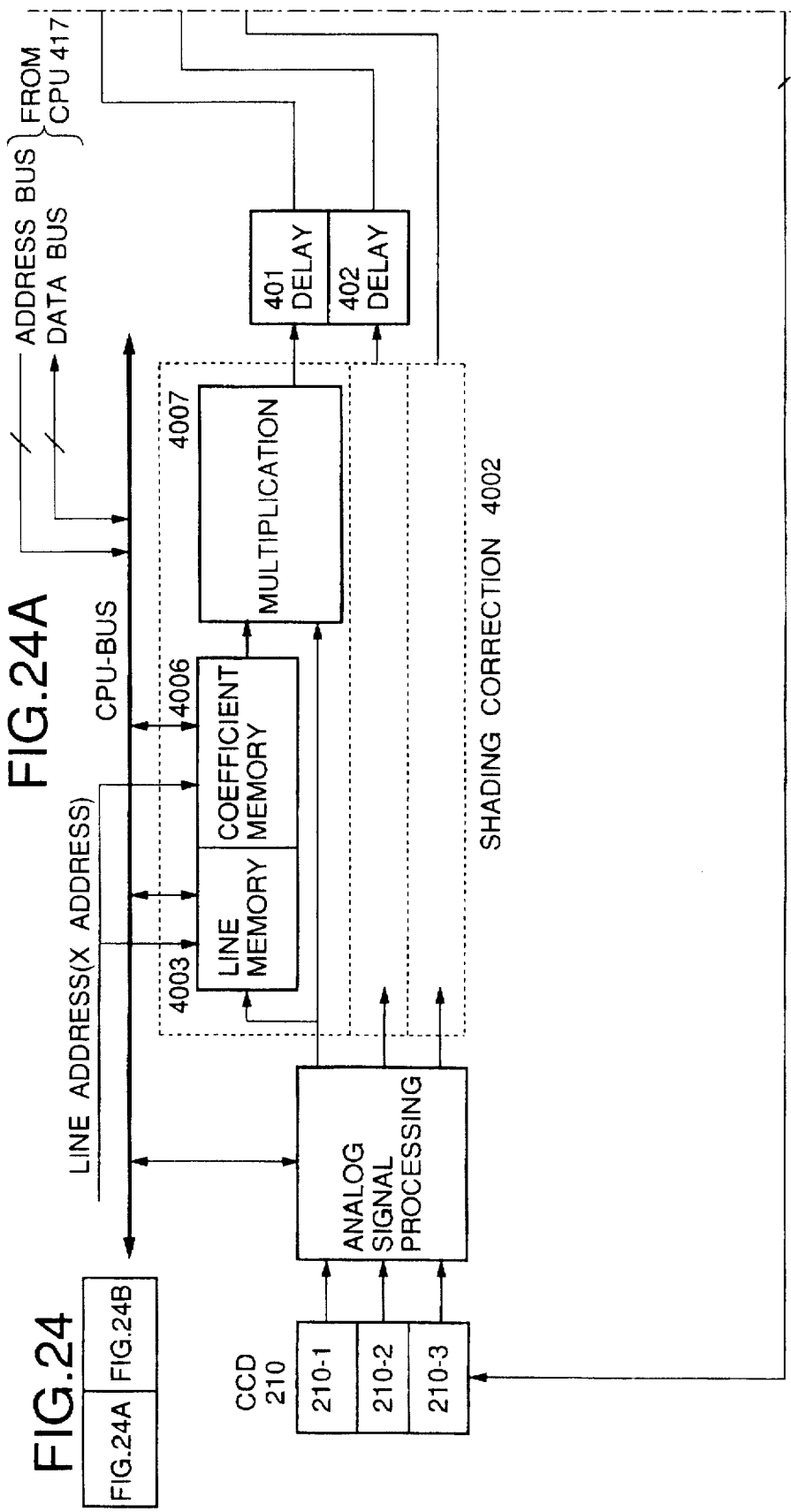

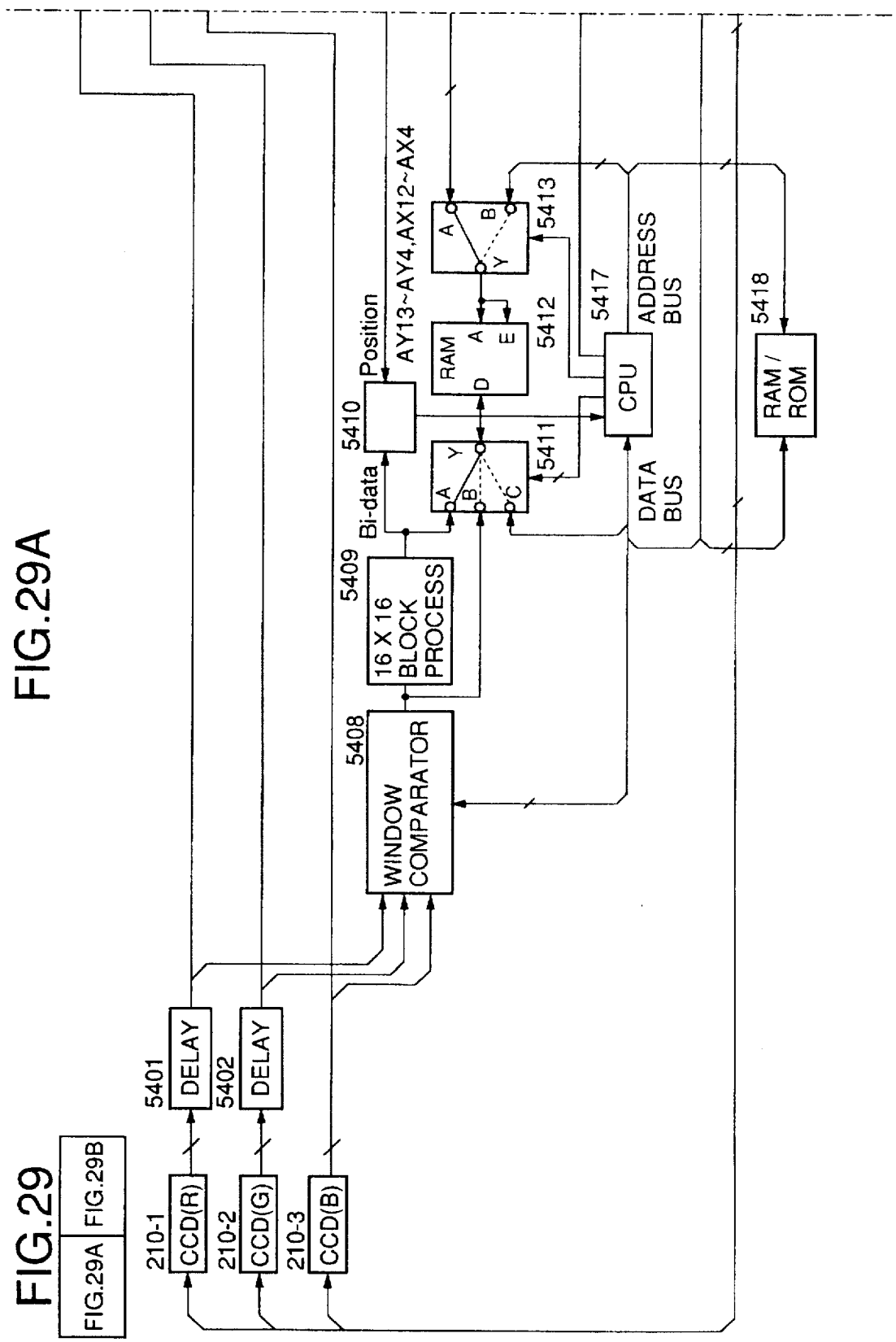

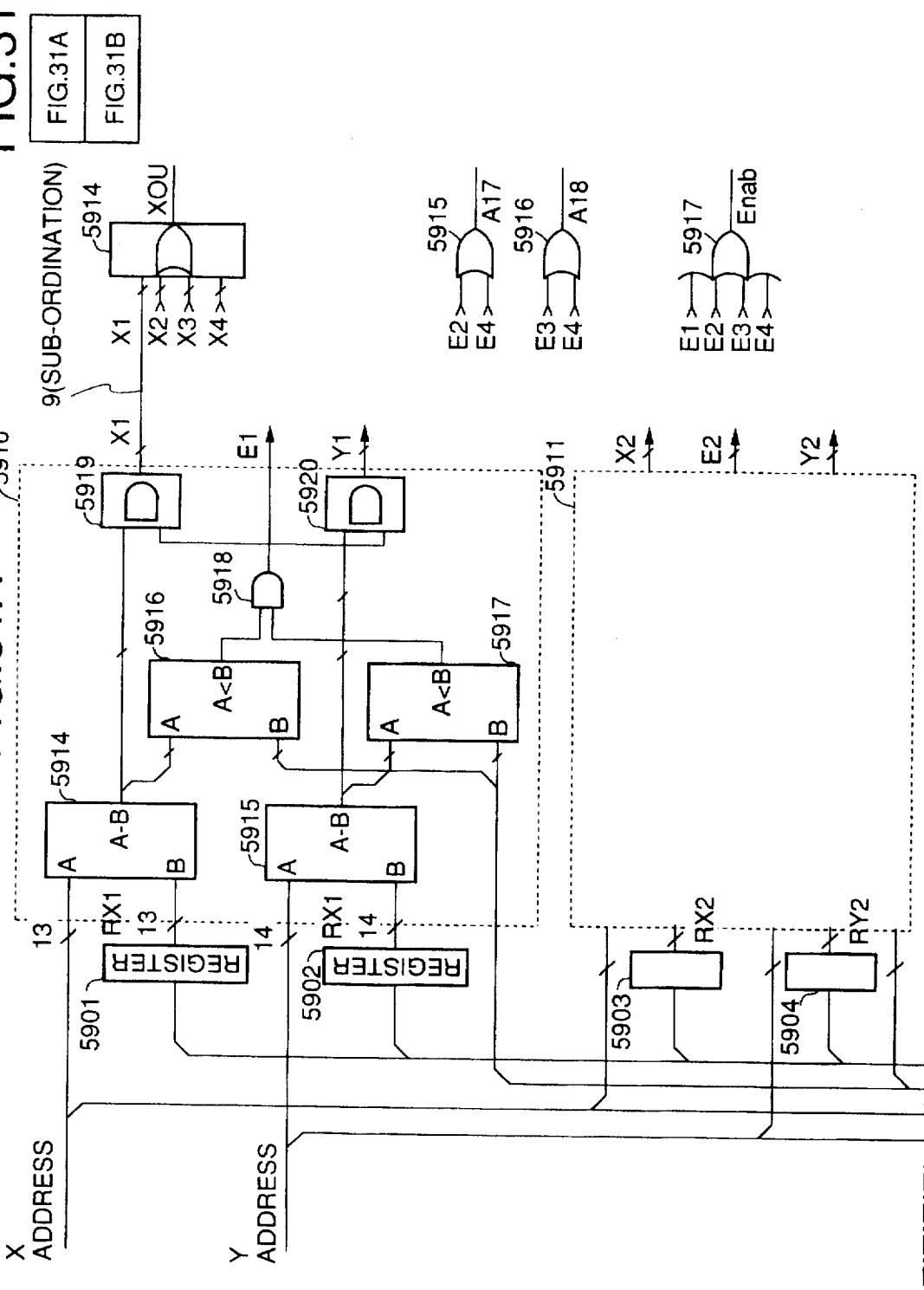

FIG.32
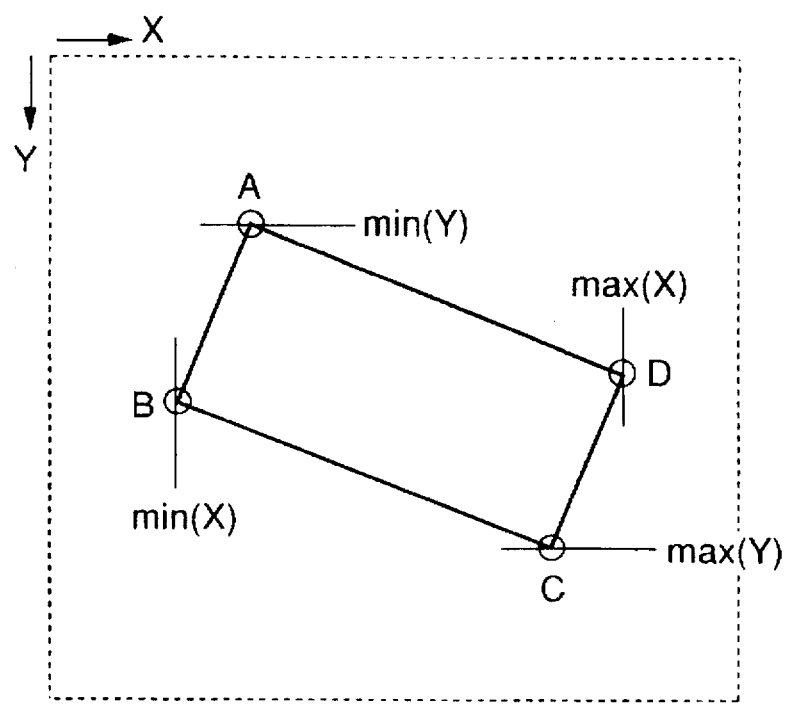
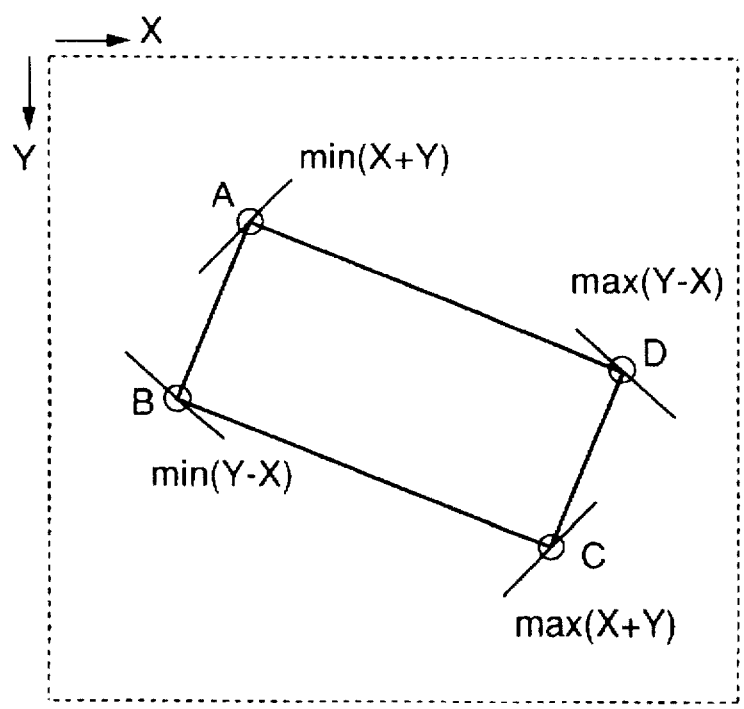

| | IMAGE SCANNER FORWARD | IMAGE SCANNER BACK | PRINTER |
|---|---|---|---|
| 1st SCANNING | MODE 1<br>•DETECTING SIZE OF ORIGINAL<br>•DETECTING ANGLE OF ORIGINAL<br>•DETECTING WATERMARK OF ORIGINAL<br>HALOGEN LAMP 205 ON<br>INFRARED LED 230 OFF | | |
| 2nd,3rd,4th SCANNING | MODE 3<br>•FORGREY PREVENTION PROCESS<br>HALOGEN LAMP 205 ON<br>INFRARED LED 230 OFF | MODE 2<br>•DETECTING FLUORESCENT PATTERN<br>HALOGEN LAMP 205 OFF<br>INFRARED LED 230 ON | MAGENTA OUTPUT<br>CYAN OUTPUT<br>YELLOW OUTPUT |
| 5th SCANNING | MODE 3<br>•FORGREY PREVENTION PROCESS<br>HALOGEN LAMP 205 ON<br>INFRARED LED 230 OFF | MODE 2<br>•DETECTING FLUORESCENT PATTERN<br>HALOGEN LAMP 205 OFF<br>INFRARED LED 230 ON | BLACK OUTPUT |

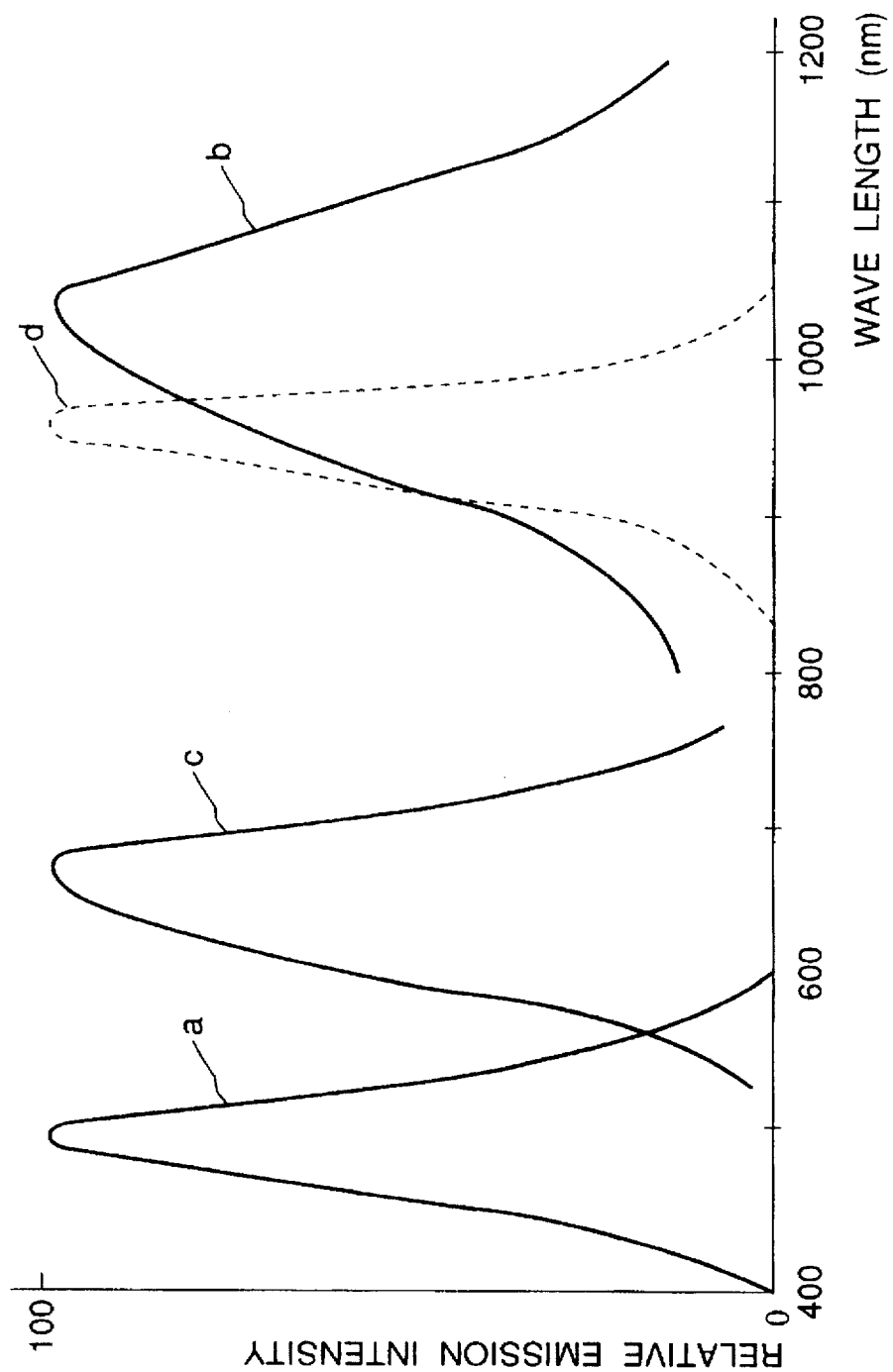

IMAGE READING AND COPYING USING PLURAL ILLUMINATION SOURCES HAVING DIFFERENT CHARACTERISTICS

This application is a continuation of application Ser. No. 08/140,542 filed Oct. 22, 1993.

BACKGROUND OF THE INVENTION

1. Field of the Invention

The present invention relates to an image reading apparatus and a copying apparatus.

2. Related Background Arts

Conventionally, there has been proposed a technique wherein a specific mark is printed using a fluorescent ink which excites a visible image upon radiation of, e.g., ultraviolet rays onto a specific image, and the specific image is discriminated based on the presence/absence of excited light upon irradiation with ultraviolet rays so as to discriminate whether an original bears the specific image.

When the above-mentioned technique is applied to an image reading apparatus, how precisely the specific image is discriminated, as well as normal original reading, and how simple the discrimination arrangement is, are serious problems.

More specifically, when marks are written on an original using, e.g., a fluorescent pen, a discrimination error may occur, and it is difficult to improve discrimination precision.

When the above-mentioned technique is applied to a copying machine, it is difficult to detect a specific original which is located at an arbitrary angle with respect to an arbitrary position on an original table of the copying machine, and hence, it is difficult to prevent illicit copying operation of the specific original.

Even when line image information or a color tone of an original is detected, some normal originals may exhibit equivalent characteristics to those of a specific original, and a normal original may be erroneously determined to be a copy-inhibited original.

SUMMARY OF THE INVENTION

It is an object of the present invention to provide an image reading apparatus or a copying apparatus, which can solve the above-mentioned problems, and can discriminate a specific image with high precision.

It is another object of the present invention to provide an efficient discrimination method upon discrimination of a specific original.

It is still another object of the present invention to simplify an apparatus arrangement used in discrimination.

It is still another object of the present invention to provide a discrimination method of a specific original on the basis of information of an original other than a visible image.

In order to achieve the above objects, according to a preferred aspect of the present invention, there is disclosed an apparatus comprising: illumination means for illuminating an object image; photoelectric conversion means for photoelectrically converting a light beam excited upon illumination by the illumination means; and discrimination means for discriminating a wavelength of the excited light beam on the basis of a signal from the photoelectric conversion means.

It is still another object of the present invention to provide an apparatus which can discriminate a specific image using a material which excites a light beam of a wavelength shorter than that of a radiation light beam.

It is still another object of the present invention to provide an apparatus, which can discriminate a specific image with high precision.

It is still another object of the present invention to provide an image reading apparatus suitable for a copying apparatus.

It is still another object of the present invention to provide an image reading apparatus having a novel function.

It is still another object of the present invention to provide an image processing apparatus or method suitable for an image reading apparatus.

Other objects and features of the present invention will become apparent from the following description of the embodiments taken in conjunction with the accompanying drawings.

BRIEF DESCRIPTION OF THE DRAWINGS

FIG. 1 is comprised of FIGS. 1A and 1B showing block diagrams of a signal processing unit of the first embodiment;

FIG. 5 is a block diagram of a 16×16 block processing unit;

FIG. 12 is a plan view showing the arrangement of a CCD sensor in the first embodiment;

FIG. 16 is a flow chart for explaining the second embodiment;

FIG. 17 is comprised of FIGS. 17A and 17B showing block diagrams of a signal processing unit of the third embodiment;

FIGS. 22A to 22H are timing charts of the circuit for thinning out shift pulses of the sensor and image data;

FIG. 32 is a view showing the principle of position detection in the 10th to 12th embodiments;

FIG. 37 is a table showing the relationship between scans and modes in the 11th and 12th embodiments;

FIG. 39 is a graph showing the excitation spectrum, stimulation spectrum, emission spectrum, and spectrum characteristics of an infrared LED.

DETAILED DESCRIPTION OF THE PREFERRED EMBODIMENTS (First Embodiment)

The preferred embodiment of the present invention will be described hereinafter.

In the embodiments to be described below, the present invention is applied to a color copying apparatus. However, the present invention is not limited to this. For example, the present invention can be applied to various other apparatuses such as a monochrome copying apparatus, an identification apparatus, and the like.

Figure 2:
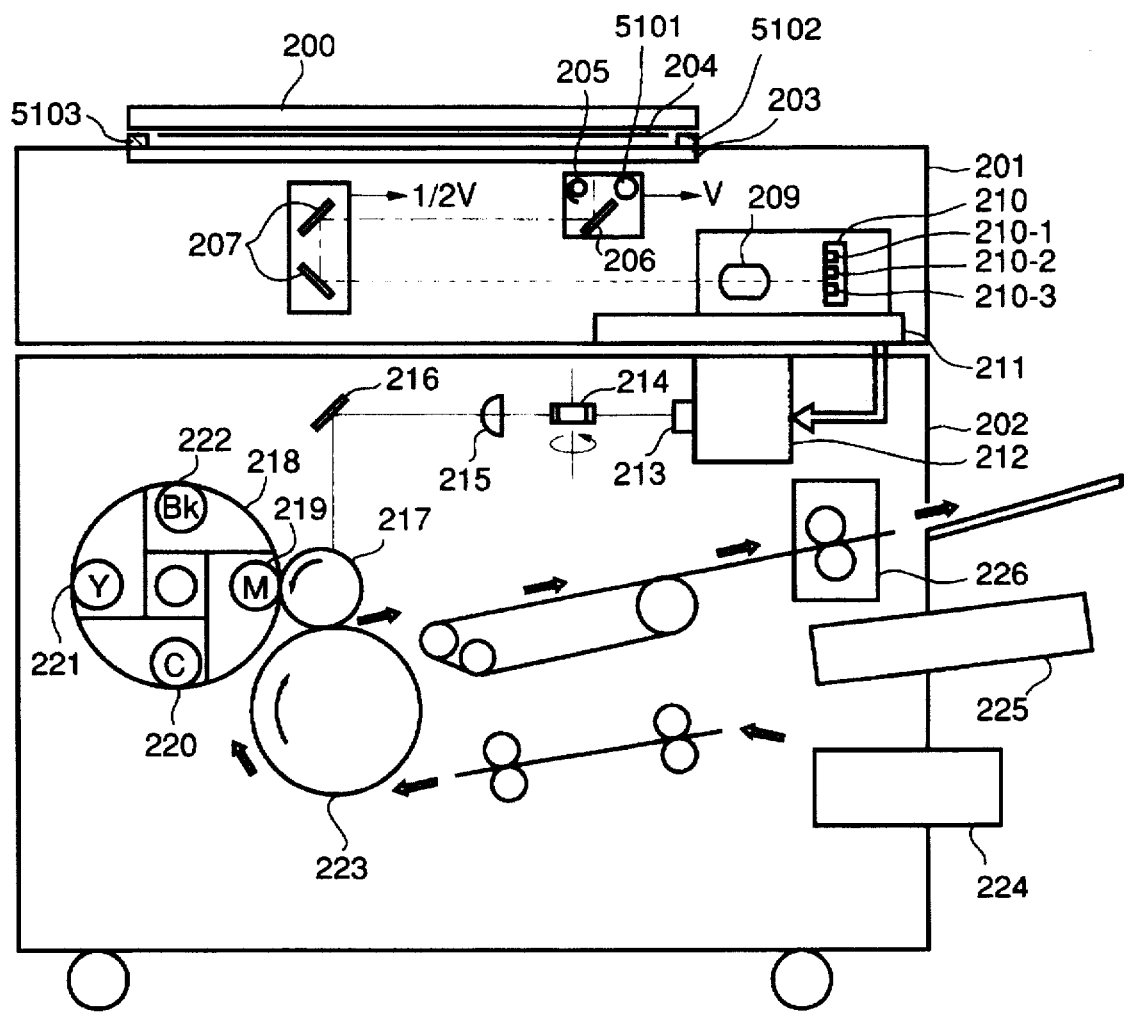
FIG. 2 is a schematic sectional view showing a color copying machine according to an embodiment of the present invention.

FIG. 2 shows the outer appearance of an apparatus according to the first embodiment of the present invention.

Referring to FIG. 2, an image scanner unit 201 performs an image reading operation, and digital signal processing. A printer unit 202 prints out a full-color image corresponding to an original image read by the image scanner unit 201 on a recording paper sheet.

Figure 10:
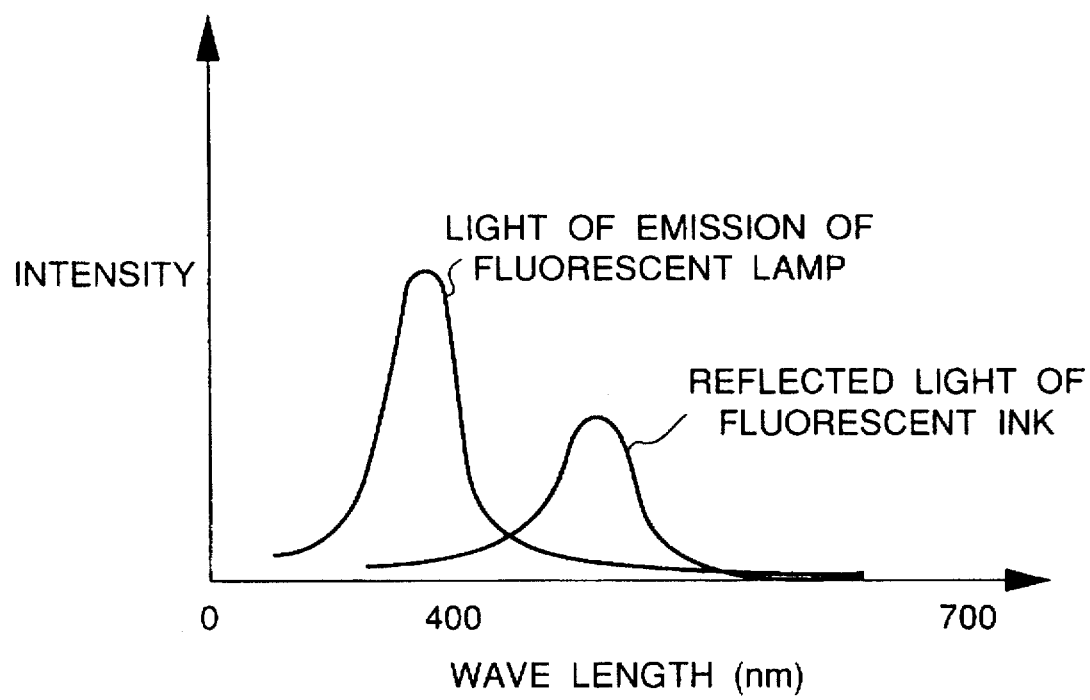
FIG. 10 is a graph showing the reflection spectrum characteristics of a fluorescent ink in the first embodiment.
Figure 11:
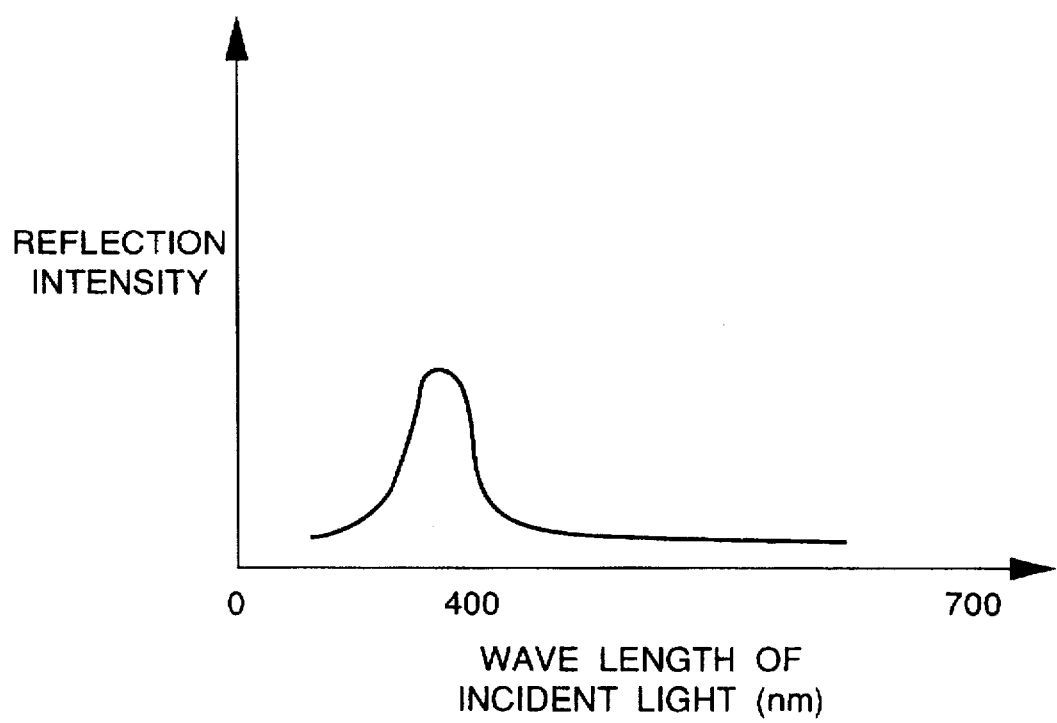
FIG. 11 is a graph showing the characteristics of the fluorescent ink in the first embodiment.

The image scanner unit 201 includes a fluorescent lamp 5101 for emitting light (e.g., ultraviolet rays) in a short-wavelength range, which light can efficiently excite a normal fluorescent ink. Skipping some figures, FIG. 10 shows the emission spectrum characteristics of the fluorescent lamp 5101, and the reflection spectrum characteristics of a fluorescent ink irradiated with light emitted from the fluorescent lamp 5101. The fluorescent ink of this embodiment has characteristics that it is not excited by light components emitted from a halogen lamp 205 as a visible light source. As shown in FIG. 11, the fluorescent ink is most efficiently excited by light of a specific wavelength (in FIG. 11, 350 nm; ultraviolet rays). A mirror-surface thick plate 200 is arranged on the upper surface of the image scanner unit 201. An original 204 placed on an original table glass (to be referred to as a platen hereinafter) 203 is irradiated with light emitted from the halogen lamp 205 or the fluorescent lamp 5101, and light reflected by the original is guided to reflection mirrors 206 and 207. The light then forms an image on a 3-line sensor (to be referred to simply as a sensor hereinafter) 210 by a lens 209, and is then supplied to a signal processing unit 211 as red (R), green (G), and blue (B) components of full-color information. The lamp 205 and the mirror 206 are mechanically moved at a speed v in a direction (to be referred to as a sub-scanning direction hereinafter) perpendicular to an electrical scan direction (to be referred to as a main-scanning direction hereinafter) of the line sensor, and the mirror 207 is mechanically moved at a speed (1/2) v in the sub-scanning direction, thereby scanning the entire surface of the original.

A standard white plate 5102 is used for correcting data read by the sensor 210 when using the halogen lamp 205. A fluorescent basis plate 5103 is uniformly coated with a fluorescent ink, which exhibits characteristics almost equivalent to those of the fluorescent ink having the reflection spectrum characteristics shown in FIG. 10, and is used for correcting data output from the sensor 210 when using the fluorescent lamp 5101.

The signal processing unit 211 electrically processes the read signals to convert them into magenta (M), cyan (C), yellow (Y), and black (Bk) components, and supplies these components to the printer unit 202. One of M, C, Y, and Bk components is supplied to the printer unit 202 for each original scanning operation of the image scanner unit 201, and a single print-out operation is completed by a total of four original scanning operations.

M, C, Y, and Bk image signals sent from the image scanner unit 201 are supplied to a laser driver 212. The laser driver 212 modulation-drives a semiconductor laser 213 in accordance with the image signals. The surface of a photosensitive drum 217 is scanned by a laser beam via a polygonal mirror 214, an f-θ lens 215, and a mirror 216.

A rotary developing unit 218 includes a magenta developer 219, a cyan developer 220, a yellow developer 221, and a black developer 222, and the four developers alternately contact the photosensitive drum to develop M, C, Y, and Bk electrostatic latent images formed on the photosensitive drum 217 with corresponding toners.

A paper sheet fed from a paper sheet cassette 224 or 225 is wound around a transfer drum 223, and the toner image developed on the photosensitive drum 217 is transferred onto the paper sheet.

In this manner, after the four, i.e., M, C, Y, and Bk color images are sequentially transferred, the paper sheet is exhausted via a fixing unit 226.

Figure 13A:
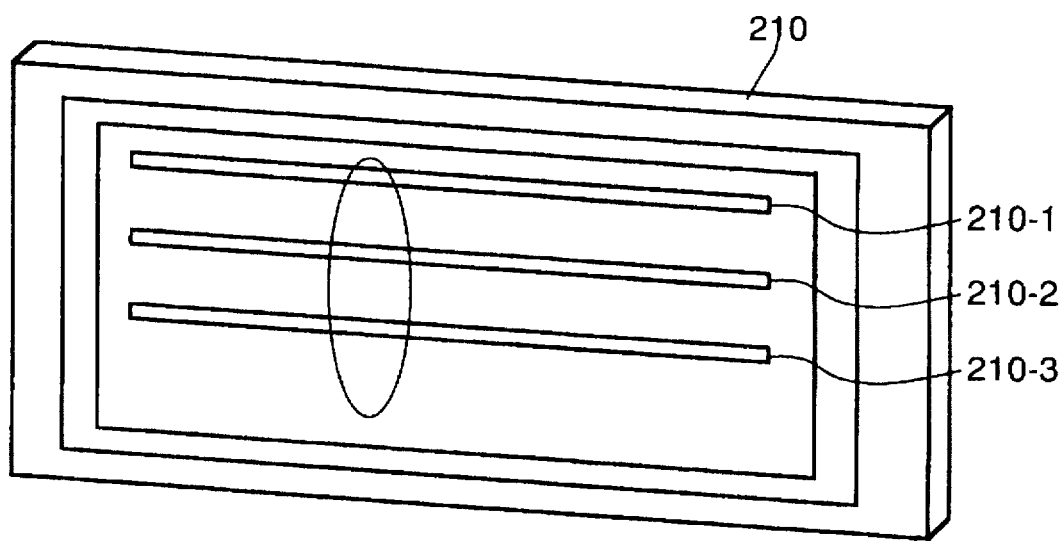
FIGS. 13A and 13B are respectively a perspective view and an enlarged view of light-receiving elements of the CCD sensor in the first embodiment.
Figure 13B:
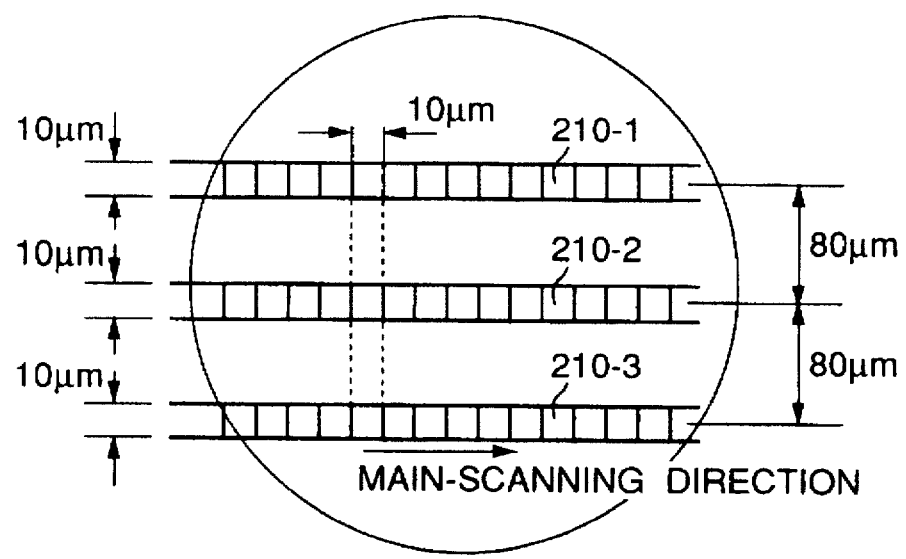

FIGS. 13A and 13B show the arrangement of the sensor 210 used in this embodiment.

Referring to FIGS. 13A and 13B, light-receiving element arrays 210-1, 210-2, and 210-3 respectively read R, G, and B wavelength components.

The three light-receiving element arrays having different optical characteristics are monolithically arranged on a single silicon chip, so that the R, G, and B sensors are arranged parallel to each other so as to read the same line.

FIG. 12 is an enlarged view of the light-receiving elements. Each sensor has a length of 10 μm per pixel in the main-scanning direction shown in FIG. 12. Each sensor has 5,000 pixels in the main-scanning direction to be able to read the widthwise direction (297 mm) of an A3-size original at a resolution of 400 dpi. The inter-line distance between two adjacent ones of the R, G, and B sensors is 80 μm, and these sensors are separated by 8 lines in correspondence with the sub-scanning resolution of 400 dpi.

Optical filters each having a predetermined transmittance are respectively formed on the surfaces of the line sensors so as to obtain predetermined R, G, and B spectrum characteristics.

The spectrum characteristics of the R, G, and B line sensors of the sensor 210 will be described below with reference to FIGS. 6A and 6B. The optical filters are formed on the surfaces of the R, G, and B line sensors so as to obtain the predetermined spectrum characteristics, as described above.

Figure 6A:
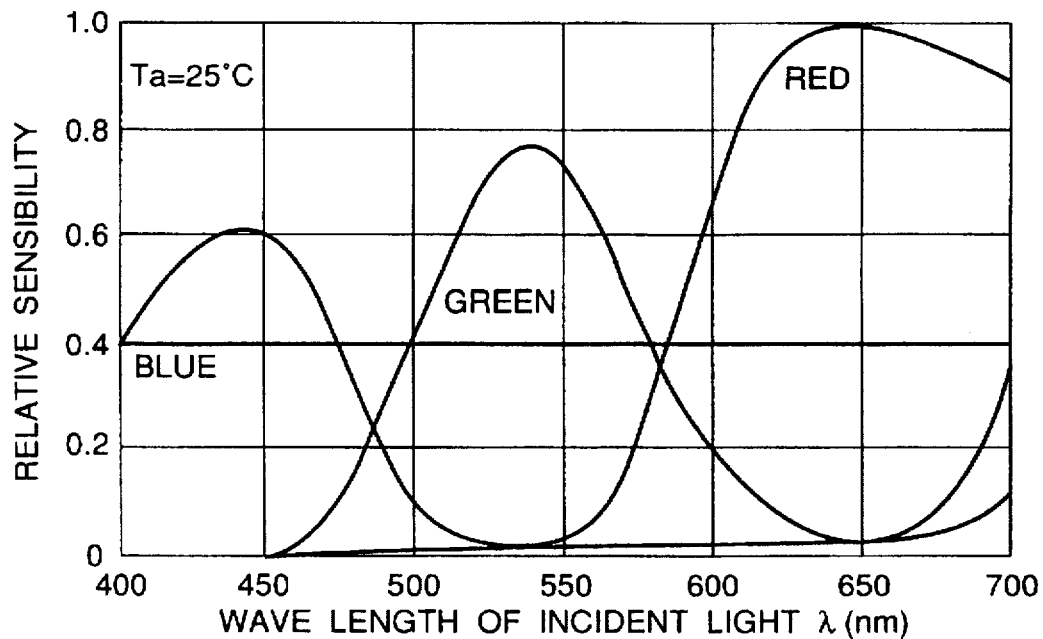
FIGS. 6A and 6B are graphs showing the spectrum sensibility of a visible line sensor in the first embodiment.
Figure 6B:
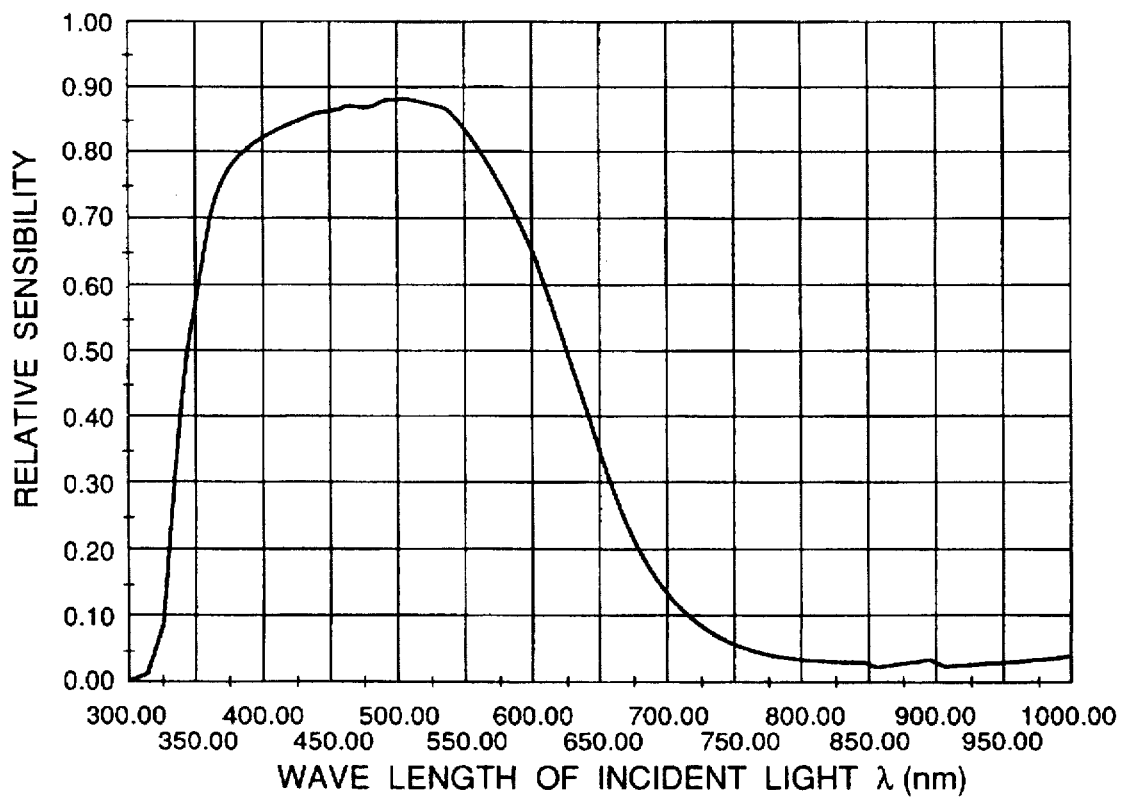

FIG. 6A shows the characteristics of conventional R, G, and B filters. As can be seen from FIG. 6A, since the conventional R, G, and B filters have sensibility with respect to infrared light of 700 nm or higher, an infrared cut filter which exhibits characteristics shown in FIG. 6B is provided to the lens 209.

FIGS. 1A and 1B are a block diagram showing the flow of image signals in the image scanner unit 201. The image signals output from the CCD sensor 210 are input to an analog signal processing unit 4001, and are converted into 8-bit digital image signals. Thereafter, these digital image signals are input to a shading correction unit 4002.

A decoder 4008 generates CCD driving signals (e.g., shift pulses, reset pulses, and the like) in units of lines by decoding main-scanning addresses from a main-scanning address counter 419.

Figure 7:
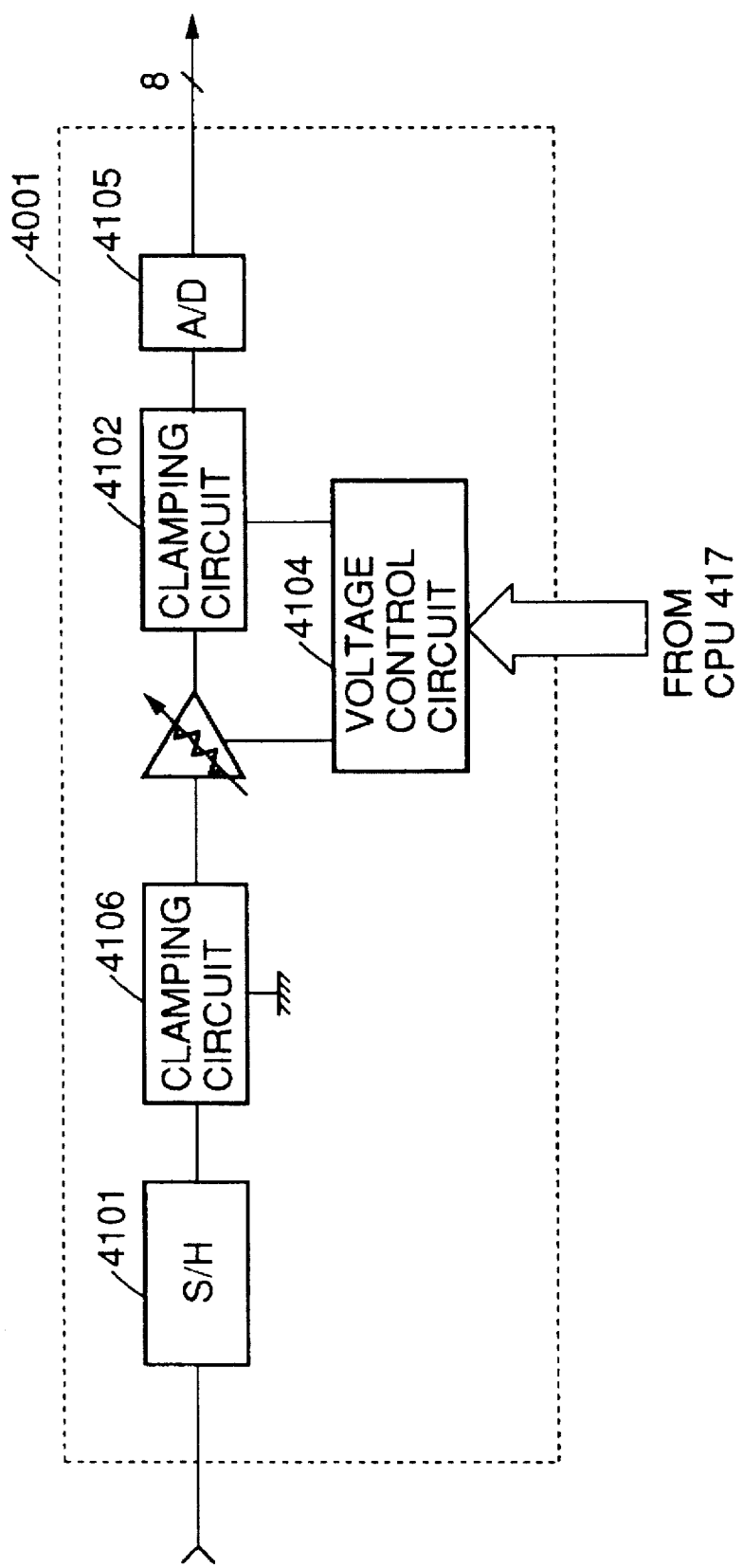
FIG. 7 is a block diagram showing an analog processing unit in the first embodiment.

FIG. 7 is a block diagram of the analog signal processing unit 4001 shown in FIGS. 1A and 1B. Since the unit 4001 includes the same R, G, and B processing circuits, FIG. 7 shows a circuit for one color. An image signal output from the CCD sensor 210 is sampled and held by a sample & hold (S/H) unit 4101 so as to stabilize an analog signal waveform. A CPU 417 controls a variable amplifier 4103 and a clamping circuit 4102 via a voltage control circuit 4104 so that the image signal can fully utilize the dynamic range of an A/D converter 4105. The A/D converter 4105 converts an analog image signal into an 8-bit digital image signal.

The 8-bit digital image signal is subjected to shading correction by a known shading correction means in the shading correction unit 4002 shown in FIG. 1.

When the fluorescent lamp 5101 is used, the CPU stores a fluorescence signal for one line read from the fluorescent basis plate 5103 in line memories 4003 in correspondence with the read signal from the sensor 210, calculates multiplication coefficients for converting read data of pixels stored in the line memories into 255 levels in units of pixels, and stores these coefficients in coefficient memories 4006 for one line. When an actual original is read, the CPU reads out the multiplication coefficients corresponding to output pixels in synchronism with the pixel signals of a line read by the sensor 210, and causes multiplication devices (to be referred to as multipliers hereinafter) 4007 to multiply the pixel signals from the sensor 210 with the multiplication coefficients, thereby achieving shading correction.

Shading correction upon using the halogen lamp 205 is performed in the same manner as that upon using the fluorescent lamp 5101. That is, a read signal for one line from the standard white plate 5102 is stored in the line memories, multiplication coefficients for converting pixel values of the stored signal into 255 levels are stored in the coefficient memories, and the read signal is multiplied with the multiplication coefficients in units of pixels from the coefficient memories by the multipliers.

As shown in FIG. 12, since the light-receiving units (light-receiving element arrays) 210-1, 210-2, and 210-3 are arranged to be separated by a predetermined distance, spatial shifts in the sub-scanning direction among these light-receiving units are corrected by delay elements 401 and 402 shown in FIGS. 1A and 1B. More specifically, R and G signals obtained by reading an original prior to a B signal in the sub-scanning direction are delayed in the sub-scanning direction to be synchronized with the B signal. Log converters 403, 404, and 405 comprise look-up table ROMs, and respectively convert luminance signals into density signals. A known masking and UCR circuit 406 (a detailed description thereof will be omitted) outputs Y, M, C, and Bk signals each having a predetermined bit length (e.g., 8 bits) in accordance with input three primary color signals every time a reading operation is performed.

Figure 3:
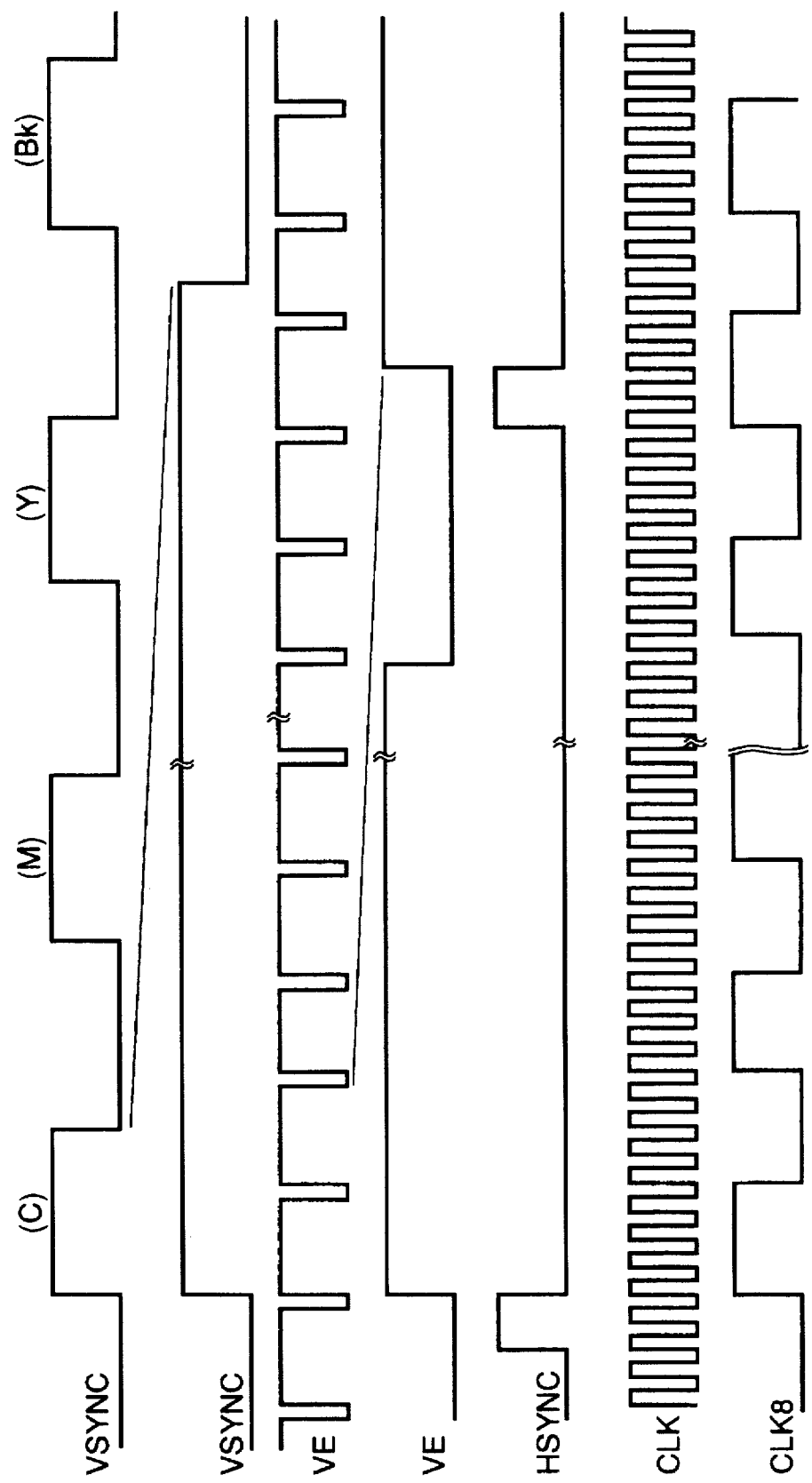
FIG. 3 is a timing chart.

FIG. 3 is an operation timing chart of the respective units in the image scanner unit of this embodiment.

A VSYNC signal is a signal indicating an image effective period in the sub-scanning direction, and is sequentially generated in the image reading (scanning) order, i.e., in the order of (C), (M), (Y), and (Bk) in "1" periods. A VE signal is a signal indicating an image effective period in the main-scanning direction, and defines the timing of a main-scanning start position in a "1" period. A CLK signal is a pixel synchronizing signal, and transfers image data at the timing of the leading edge of 0→1. Note that these synchronizing signals are output from a synchronizing signal generating circuit 40000 shown in FIG. 1A.

The CPU 417 shown in FIG. 1B controls the apparatus in the respective modes. A window comparator 4009 discriminates whether or not a specific level signal designated by the CPU 417 is input. A block processing circuit 409 executes 16×16 block processing, and processes the output from the window comparator 4009 in units of 16×16 blocks. A RAM/ROM 418 is connected to the CPU 417, and stores a program for controlling the operation of the CPU 417, and reference pattern data for pattern matching used when pattern matching (to be described later) is performed.

Figure 4:
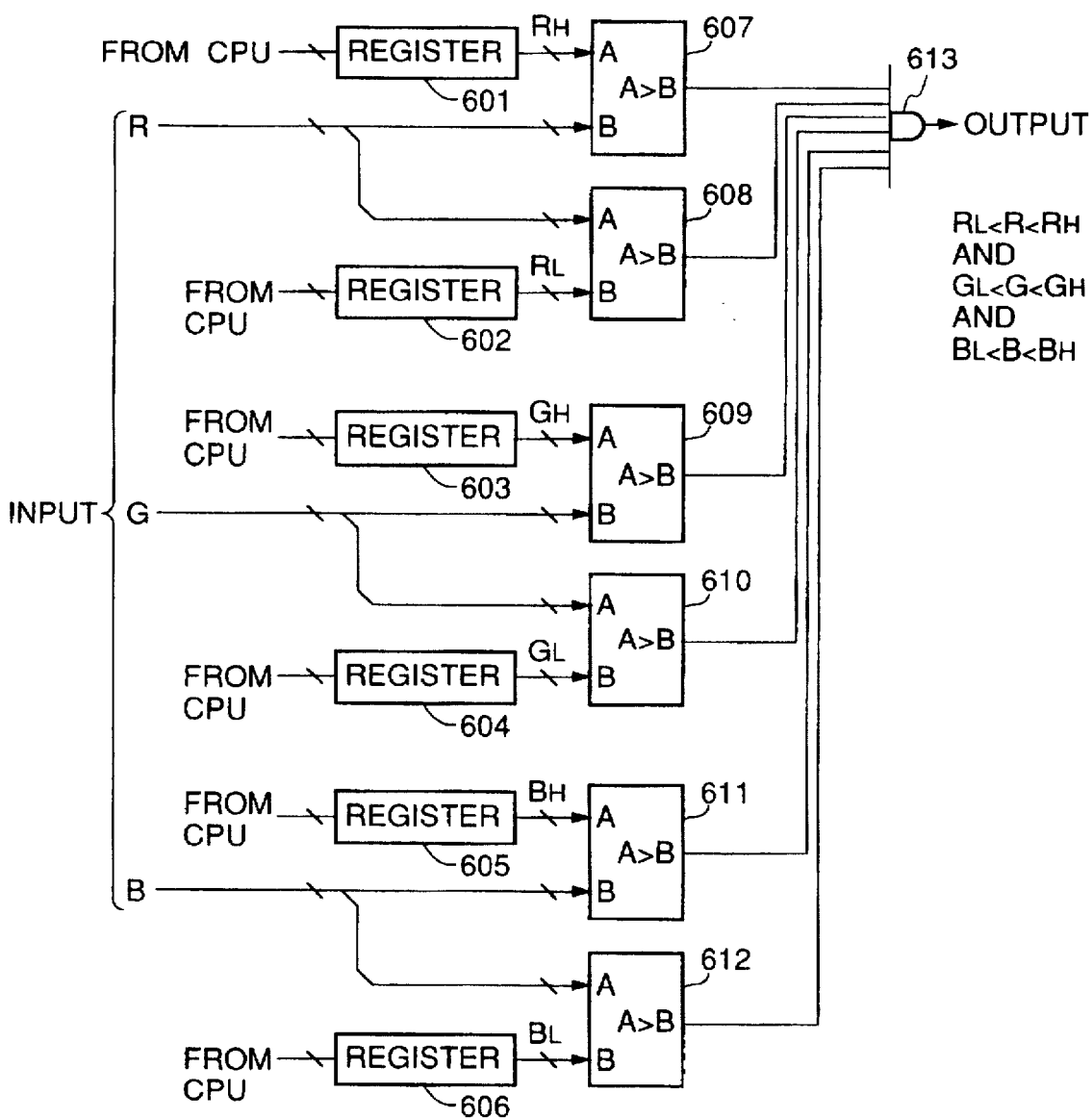
FIG. 4 is a block diagram of a window comparator.

FIG. 4 is a block diagram of the window comparator 4009 shown in FIG. 1B. The window comparator 4009 discriminates based on 8-bit R, G, and B image signals whether or not each pixel is a fluorescent pixel. In registers 601, 602, 603, 604, 605, and 606, the CPU 417 writes desired values in correspondence with the characteristics of a fluorescent ink to be detected.

Comparators 607, 608, 609, 610, 611, and 612 output "1" only when their inputs A and B satisfy A>B.

An AND gate 613 outputs "1" only when all the comparators output "1", and outputs "0" in other cases. Assuming that values $R_H$, $R_L$, $G_H$, $G_L$, $B_H$, and $B_L$ are respectively written in the registers 601, 602, 603, 604, 605, and 606, only when input signals R, G, and B satisfy all the following relations, the output from the window comparator 4009 goes to "1"; otherwise, the output from the window comparator 4009 goes to "0":

$$R_L < R < R_H$$

and $$G_L < G < G_H$$

and $$B_L < B < B_H$$

Since a fluorescent mark used in this embodiment has reflection spectrum characteristics shown in FIG. 10, the threshold values of the window comparator 4009 are adjusted, and it is determined that a fluorescent ink having fluorescent characteristics shown in FIG. 10 is printed when R, G, and B signals satisfy:

$$10H < R < 30H$$

and $$60H < G < A0H$$

and $$08H < B < 28H$$

FIG. 5 is a block diagram showing the detailed internal arrangement of the 16×16 block processing circuit 409 shown in FIG. 1B.

15 D flip-flops (to be referred to as DFFs hereinafter) 701, 702, 703, ..., 714, and 715 are connected in series with each other, and sequentially delay an input signal in response to the pixel clock signal CLK. These DFFs are cleared to "0" when VE="0", i.e., in a non-image period.

The block processing circuit 409 also includes a 5-bit up/down counter 738, an EX-OR gate 737, and an AND gate 740, which operate based on the following table.

TABLE 1

| VSYNC | VE | $X_t$ | $X_{t-15}$ | Counter Output |
|---|---|---|---|---|
| 0 | X | X | X | 0 (clear) |
| X | 0 | X | X | 0 (clear) |
| 1 | 1 | 0 | 0 | hold |
| 1 | 1 | 0 | 1 | count down |
| 1 | 1 | 1 | 0 | count up |
| 1 | 1 | 1 | 1 | hold |

More specifically, the output from the counter 738 is cleared to "0" in a period wherein VSYNC or VE="0", is held when $X_t = X_{t-15}$, is counted up when $X_t = 1$ and $X_{t-15} = 0$, and is counted down when $X_t = 0$ and $X_{t-15} = 1$. This counter output is latched using a latch 739 in response to a signal CLK16 having a 16-clock period, thereby outputting the total sum (=the number of "1"s) of 16 input data $X_t$ input for one period of the signal CLK16.

The output from the latch is input to FIFO memories 721, 722, 723, ..., 734, and 735 in units of lines, and data for 16 lines are simultaneously input to an adder 741. The adder 741 outputs the total sum of the input signals. As a result, the adder 741 outputs the total sum SUM of the number of "1"s in a 16×16 window as data corresponding to one of 0 to 256.

A digital comparator 742 compares the output SUM from the adder 741 with a comparison value TW determined in advance by the CPU 417, and outputs a comparison result "0" or "1".

When a proper value is set in the value TW in advance, noise elimination in units of 16×16 blocks can be attained (in this embodiment, TW=128).

Referring back to FIG. 1B, a counter 20101 counts the number of fluorescent pixel blocks of an original which is subjected to noise elimination in the 16×16 block processing circuit 409 in response to the signal CLK. In this embodiment, the counter 20101 comprises an 8-bit counter, and counts a maximum of 255 fluorescent pixels.

A 4-input AND pate 20102 supplies a binary fluorescence signal output from the window comparator 4009 as an enable signal of the counter 20101 when the main-scanning effective period signal VE and the sub-scanning effective period signal VSYNC are generated. The counter 20101 is cleared to "0" in response to a CLR signal from the CPU. In response to this clear signal, a flip-flop (F/F) 20103 is set, and enables an output from the pate 20102.

When a binary signal is input beyond the maximum count value "255" of the counter 20101, the counter 20101 generates an RC signal when the output from the counter 20101 has reached "255", the F/F 20103 is reset in response to the RC signal, the output from the gate 20102 becomes "0", and an enable input of the counter is forcibly set to be "0", thereby holding the counter output to be "255".

The CPU 417 reads the count result of the counter 20101 as a CNT signal. When the count result is equal to or larger than a predetermined value (e.g., equal to or larger than 128 pixels), the CPU detects that a copy-inhibited original is about to be copied.

Figure 8B:
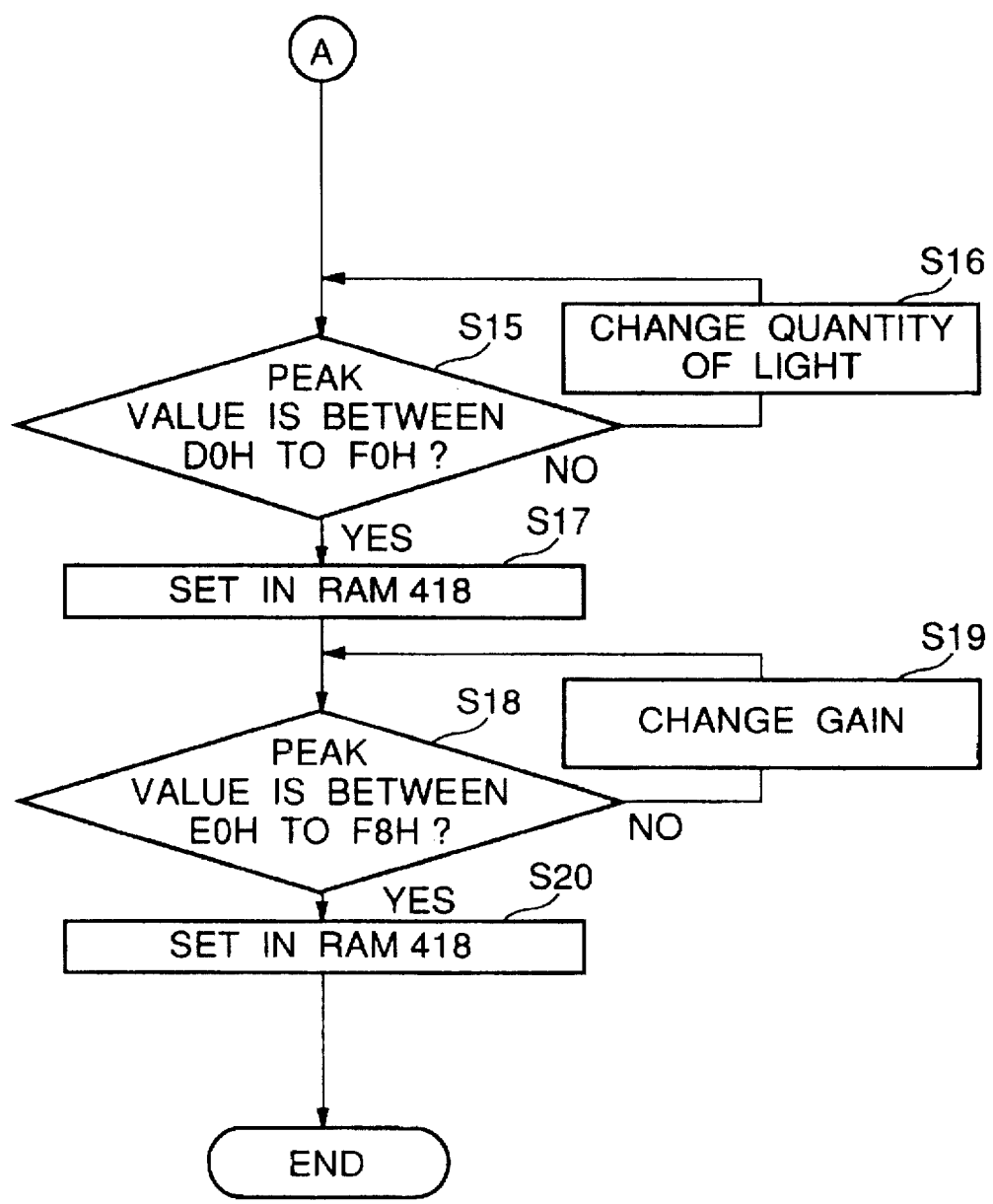
FIG. 8 is comprised of FIGS. 8A and 8B showing flow charts of quantity of light adjustment control and circuit gain control in the first embodiment.

The method of adjusting the quantity of light from the halogen lamp 205 and the fluorescent lamp 5101, and the method of controlling the variable amplifiers 4103 and the clamping circuits 4102 shown in FIG. 7 will be described below with reference to the flow chart shown in FIGS. 8A and 8B. Since the quantity of light reflected by the fluorescent ink using the fluorescent lamp is very small, the gain of each variable amplifier 4103 (FIG. 7) is changed as needed in correspondence with which one of the halogen lamp and the fluorescent lamp is used so as to satisfactorily detect light reflected by the fluorescent ink.

Figure 9:
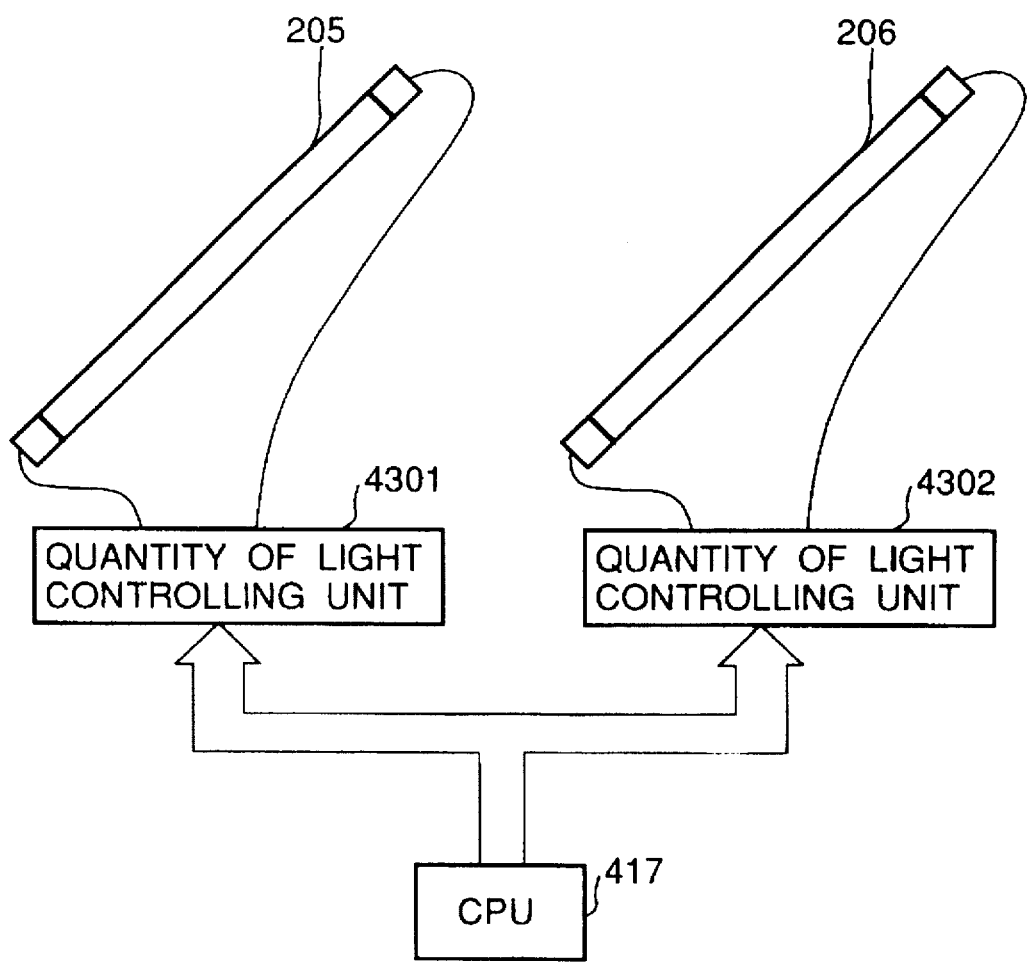
FIG. 9 is a block diagram showing quantity of light control blocks of an original illumination lamp in the first embodiment.

FIG. 9 is a block diagram of quantity of light controlling units 4301 and 4302 of the halogen lamp 205 and the fluorescent lamp 5101. In the analog signal processing unit 4001, in order to fully utilize the dynamic ranges of the A/D converters 4105, the gains of the variable amplifiers 4103 are adjusted on the basis of image data obtained upon reading of the standard white plate 5102, and the control voltages of the clamping circuits 4102 are adjusted by the corresponding voltage control circuits 4104 on the basis of image data obtained when no light is radiated on the sensor 210.

The control methods will be described below with reference to the flow chart shown in FIG. 8A and 8B.

When an adjustment mode is started by an operation unit (not shown), the reflection mirror 206 is moved to a position below the standard white plate 5102, and a predetermined gain for the halogen lamp is set in each variable amplifier 4103 (step 1). Image data obtained when no light is radiated on the CCD sensor 210 is stored in the line memories (shading RAMs) 4003. The CPU 417 calculates an average value of the stored image data for one line, and controls the voltage control circuits 4104 so that the average value of the image data for one line becomes closest to 08H, thereby adjusting the reference voltages of the clamping circuits 4102 (steps 2 and 3). The adjusted control value is stored in the RAM/ROM 418 connected to the CPU 417 (step 4).

Then, the halogen lamp 205 is turned on, and image data obtained upon reading of the standard white plate 5102 are stored in the line memories 4003. The CPU 417 controls the quantity of light controlling unit 4301, so that the peak value of a G signal falls within a range from D0H to F0H (steps 5 and 6; halogen lamp adjustment). The CPU stores the adjusted control value in the RAM/ROM 418 connected to the CPU 417 (step 7). Then, the halogen lamp 205 is turned on to have the quantity of light adjusted in steps 5 and 6, and R, G, and B image data obtained upon reading of the standard white plate 5102 are stored in the line memories 4003 corresponding to R, G, and B colors. Then, the voltage control circuits 4104 are controlled, so that the peak values of R, G, and B image data fall within a range from E0H to F8H, thereby adjusting the gains of the variable amplifiers 4103 in correspondence with R, G, and B colors (steps 8 and 9). The adjusted gains are stored as gain data (to be referred to as H-gain data hereinafter) corresponding to the halogen lamp 205 in the RAM/ROM 418 connected to the CPU 417. Thereafter, the halogen lamp 205 is turned off (step 10).

In order to adjust the quantity of light of the fluorescent lamp 5101, the reflection mirror 206 in FIG. 2 is moved to a position below the fluorescent basis plate 5103, and a predetermined gain for the fluorescent lamp is set in each variable amplifier 4103 (step 11). Image data obtained when no light is radiated on the CCD 210 are stored in the line memories 4003. The CPU 417 calculates an average value of the stored image data for one line, and controls the voltage control circuits 4104 so that the average value of the image data for one line becomes closest to 08H, thereby adjusting the reference voltages of the clamping circuits 4102 (steps 12 and 13). The adjusted control value is stored in the RAM/ROM 418 connected to the CPU 417 (step 14).

Then, the fluorescent lamp 5101 is turned on, and image data obtained upon reading of the fluorescent basis plate 5103 are stored in the line memories 4003. The CPU 417 controls the quantity of light controlling unit 4302, so that the peak value of the G signal falls within a range from D0H to F0H irrespective of the signal levels of R and B signals in this embodiment (steps 15 and 16; fluorescent lamp adjustment), and the adjusted value is stored in the RAM/ROM 418 connected to the CPU 417 (step 17). Then, the fluorescent lamp 5101 is turned on to have the quantity of light adjusted in step 17, and image data obtained upon reading of the fluorescent basis plate 5103 are stored in the shading RAMs 4003. The voltage control circuits 4104 are controlled, so that the peak values of R, G, and B image data fall within a range from E0H to F8H, thereby adjusting the gains of the variable amplifiers 4103 in units of R, G, and B colors (steps 18 and 19). The adjusted pains are stored as pain data (to be referred to as UV-gain data hereinafter) corresponding to the fluorescent lamp 5101 in the RAM/ROM 418 connected to the CPU 417. Thereafter, the fluorescent lamp 5101 is turned off (step 20).

The control data obtained in the above-mentioned adjustment mode are stored and set in memories (not shown) of the corresponding controlling units when the halogen lamp 205 and the fluorescent lamp 5101 are turned on.

In this embodiment, the presence/absence of a fluorescent ink in a copy-inhibited original is detected.

In some copy-inhibited originals, a fluorescent material with fluorescent characteristics is mixed in paper fibers.

In this embodiment, a fluorescent mark is detected from thin line information such as a fiber having reflection spectrum characteristics shown in FIG. 10 as an example of such a fiber, thereby detecting a copy-inhibited original. In this embodiment, the number of pixels of fluorescent information included in an original is counted, and when the count value is equal to or larger than a predetermined value, it is determined that an original is a copy-inhibited original.

Figure 14:
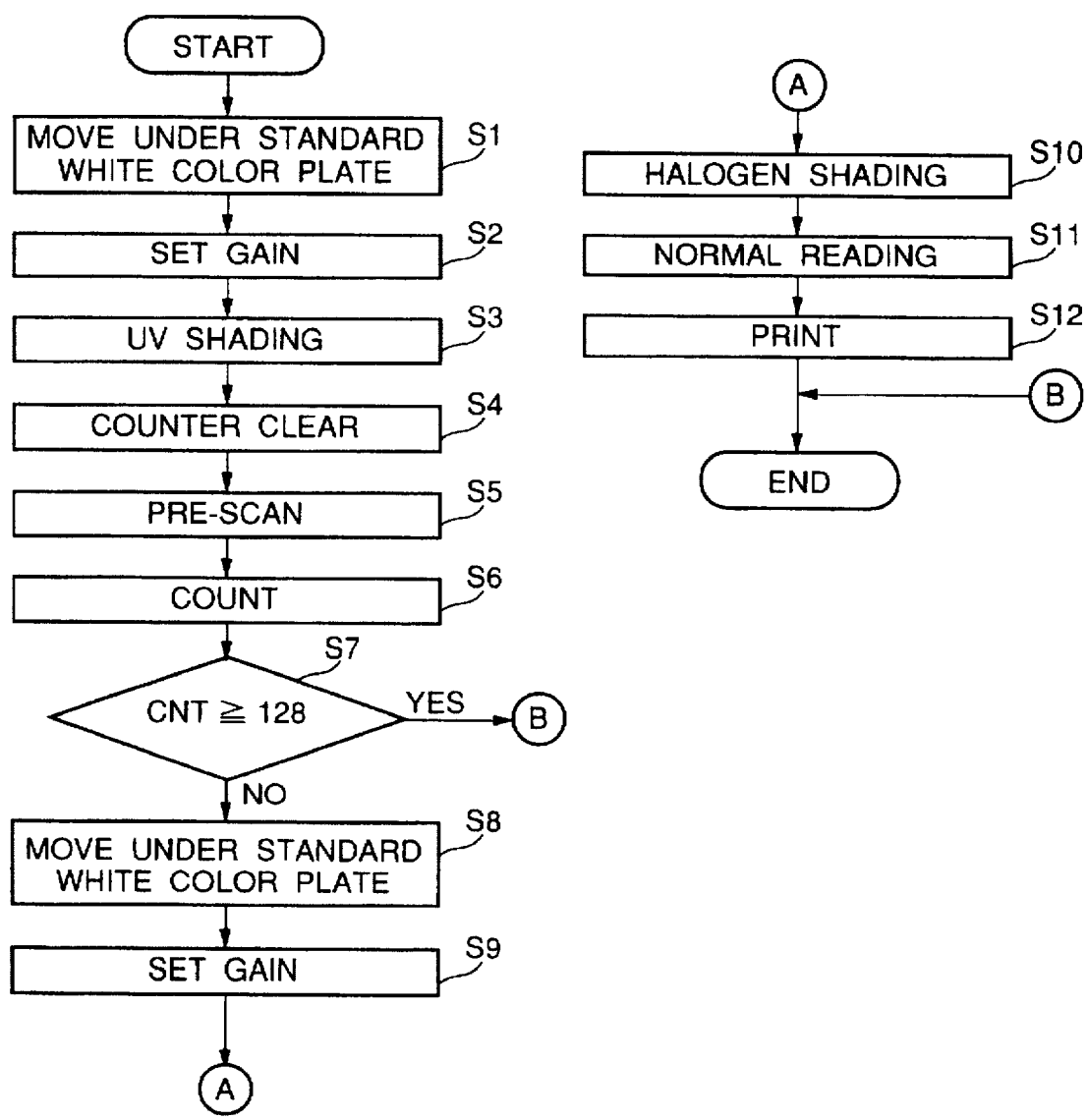
FIG. 14 is a flow chart for explaining the first embodiment.

The actual operation will be described below with reference to the flow chart shown in FIG. 14.

When an operator sets an original on the platen 203, and starts a copying operation using an operation unit (not shown), the CPU 417 controls a motor (not shown) to move the reflection mirror 206 to a position below the fluorescent basis plate 5103 (step 1). Then, the UV-gain data are set in the corresponding variable amplifiers 4103 via the voltage control circuits 4104 of the analog signal processing unit 4001 (step 2). The fluorescent lamp 5101 is turned on based on the control value set in the fluorescent lamp adjustment to illuminate the fluorescent basis plate 5103. In the shading correction unit 4002, shading data corresponding to the fluorescent lamp 5101 are stored in the corresponding line memories 4003, and known shading correction is executed (step 3). In step 4, the CPU 417 clears the counter 20101 and the F/F 20103. The original reading operation is performed (step 5; pre-scan), the window comparator 4009 detects fluorescent pixels on the original 204, fluorescent signals which are subjected to noise elimination in the 16×16 block processing are counted by the counter 20101 (step 6), and it is then checked if the number of fluorescent pixel blocks is equal to or larger than a predetermined value (in this embodiment, 128) (step 7).

If it is determined in step 7 that the number of fluorescent pixel blocks is equal to or larger than the predetermined value, it is determined that the original 204 is a copy-inhibited original, and the copying operation ends.

If it is determined in step 7 that the number of fluorescent pixel blocks is smaller than the predetermined value, i.e., that the original 204 is not a copy-inhibited original, the reflection mirror 206 is moved to a position below the standard white plate 5102 (step 8), and the H-gain data are set in the corresponding variable amplifiers 4103 (step 9). The halogen lamp 205 is turned on based on the control value set in the halogen lamp adjustment to illuminate the standard white plate 5102. In the shading correction unit, shading data corresponding to the halogen lamp 205 are re-stored in the line memories 4003, and known shading correction is executed (step 10). Then, a total of four normal reading operations are performed in correspondence with M, C, Y, and Bk colors (step 11), and the printer unit 202 executes an image formation operation (step 12), thus ending the copying operation.

All the above-mentioned control operations are executed by the CPU 417. When light emitted from the halogen lamp 205 includes a wavelength component which excites the fluorescent ink, a filter for cutting the wavelength component which excites the fluorescent ink may be arranged between the halogen lamp 205 and the original 204.

(Second Embodiment)

In the second embodiment, when a fluorescent mark is detected, and it is determined that the original 204 is a copy-inhibited original, the fluorescent lamp 5101 is turned on in a normal reading operation to convert fluorescent information of the fluorescent mark such as ultraviolet rays included in a copied image other than visible light into visible information, and the converted visible information is recorded together with visible recording information from an original. Thus, a normal copying operation of a copy-inhibited original can be prevented.

Figure 15:
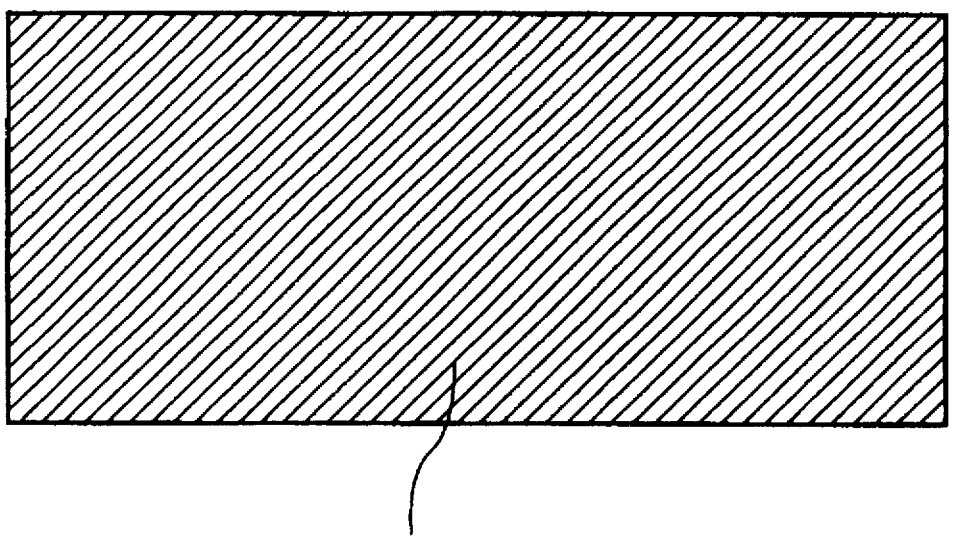
FIG. 15 is a view showing a printed state of fluorescence information on a copy-inhibited original in the second embodiment.

As fluorescent information of a copy-inhibited original effective in this embodiment, a regular pattern recorded on the entire surface of an original, or fluorescent information painted on the entire surface of an original, as shown in FIG. 15, is preferable. Normally, the fluorescent information does not pose any problem in practical normal use other than an illegal copying operation as long as it exhibits transparent characteristics under visible light.

In the first embodiment described above, the CPU 417 reads the count result of the counter 20101 as a CNT signal, and when the count result is equal to or larger than a predetermined value (e.g., 128 pixel blocks), it is detected that a copy-inhibited original is about to be copied. In this embodiment, when such detection is made, the fluorescent lamp 5101 is turned on to visualize ultraviolet fluorescent information, thereby preventing a normal copying operation.

In the second embodiment, the gains of the variable amplifiers 4103 and shading data cannot be changed in correspondence with which one of the halogen lamp 205 and the fluorescent lamp 5101 is used. However, in order to achieve an object to inhibit a normal copying operation of a copy-inhibited original, no problem is posed.

The actual operation will be described below with reference to the flow chart shown in FIG. 16.

When an operator sets an original on the platen 203, and starts a copying operation using an operation unit (not shown), the CPU 417 controls a motor (not shown) to move the reflection mirror 206 to a position below the fluorescent basis plate 5103 (step 1). Then, the UV-gain data are set in the corresponding variable amplifiers 4103 via the voltage control circuits 4104 of the analog signal processing unit 4001 (step 2). The fluorescent lamp 5101 is turned on based on the control value set in the fluorescent lamp adjustment to illuminate the fluorescent basis plate 5103. In the shading correction unit 4002, shading data corresponding to the fluorescent lamp 5101 are stored in the corresponding line memories 4003, and known shading correction is executed (step 3). In step 4, the CPU 417 clears the counter 20101 and the F/F 20103. The original reading operation is performed (step 5; pre-scan), the window comparator 4009 detects fluorescent pixels on the original 204, fluorescent signals which are subjected to noise elimination in the 16×16 block processing are counted by the counter 20101 (step 6), and it is then checked if the number of fluorescent pixel blocks is equal to or larger than a predetermined value (in this embodiment, 128) (step 7).

If it is determined in step 7 that the number of fluorescent pixel blocks is smaller than the predetermined value, i.e., that the original 204 is not a copy-inhibited original, the reflection mirror 206 is moved to a position below the standard white plate 5102 (step 8), and the H-gain data are set in the corresponding variable amplifiers 4103 (step 9). The halogen lamp 205 is turned on based on the control value set in the halogen lamp adjustment to illuminate the standard white plate 5102. In the shading correction unit, shading data corresponding to the halogen lamp 205 are re-stored in the line memories 4003, and known shading correction is executed (step 10). Then, a total of four normal reading operations are performed in correspondence with M, C, Y, and Bk colors (step 11), and the printer unit 202 executes an image formation operation (step 12), thus ending the copying operation.

If it is determined in step 7 that the number of fluorescent pixel blocks is equal to or larger than the predetermined value, i.e., that the original 204 is a copy-inhibited original, the reflection mirror 206 is moved to a position below the standard white plate 5102 (step 13), and the H-gain data are set in the corresponding variable amplifiers 4103 (step 14). The halogen lamp 205 is turned on based on the control value set in the halogen lamp adjustment to illuminate the standard white plate 5102. In the shading correction unit, shading data corresponding to the halogen lamp 205 are re-stored in the line memories 4003, and known shading correction is executed (step 15). Then, a total of four reading operations in which both the halogen lamp 205 and the fluorescent lamp 5101 are turned on are performed in correspondence with M, C, Y, and Bk colors (step 16), and the printer unit 202 executes an image formation operation of an abnormal image with a visualized ultraviolet fluorescent mark (step 17), thus ending the copying operation.

In this embodiment, since the fluorescent lamp 5101 is turned on, visible light output from the fluorescent mark is read, and is color-copied.

In the second embodiment, a copying operation may be performed by turning on only the fluorescent lamp.

(Third Embodiment)

As for originals other than a copy-inhibited original, when it is determined that a fluorescent ink of, e.g., a fluorescent pen is present on an original image, both the fluorescent lamp and the halogen lamp may be turned on in a normal reading operation to excite the fluorescent ink, thus emphasizing and outputting the fluorescent ink as a visible image.

(Fourth Embodiment)

Figure 18:
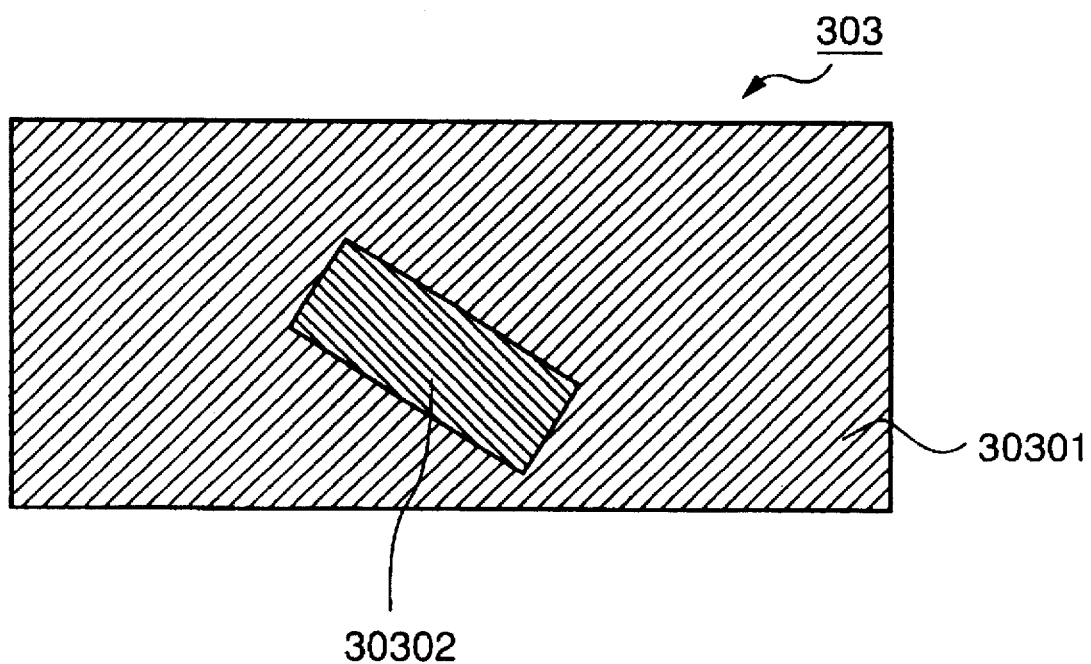
FIG. 18 is a bottom view showing an original in the third embodiment.

In this embodiment, as shown in FIG. 18 (bottom view), when a copy-inhibited original 30302 such as paper money is set on the platen 203 under a non-copy-inhibited original 30301 to overlap each other, only a copy-inhibited original portion is copied in black.

The same reference numerals in FIGS. 17A and 17B denote the same parts as in FIGS. 1A and 1B. An inhibition area detection circuit 30401 detects a copy-inhibited area of an original image, and is connected to the main-scanning address counter 419 and a sub-scanning address counter 420. The sub-scanning address counter 420 is reset in a "0" period of a VSYNC signal, and is counted up at the timing of an HSYNC signal, thereby generating 13-bit sub-scanning address data (Y address) Y12 to Y0.

In the pre-scan operation, the first and last coordinates at which fluorescent signals are detected from an original are detected, and in a Bk (black) image forming operation, the CPU 417 controls a register 408 to have a setting value "FFH", so that image data of FFH, i.e., a maximum density is output to the printer unit 202 between the detected first and last coordinates. As a result, a black image is output in correspondence with the copy-inhibited original area.

Figure 19:
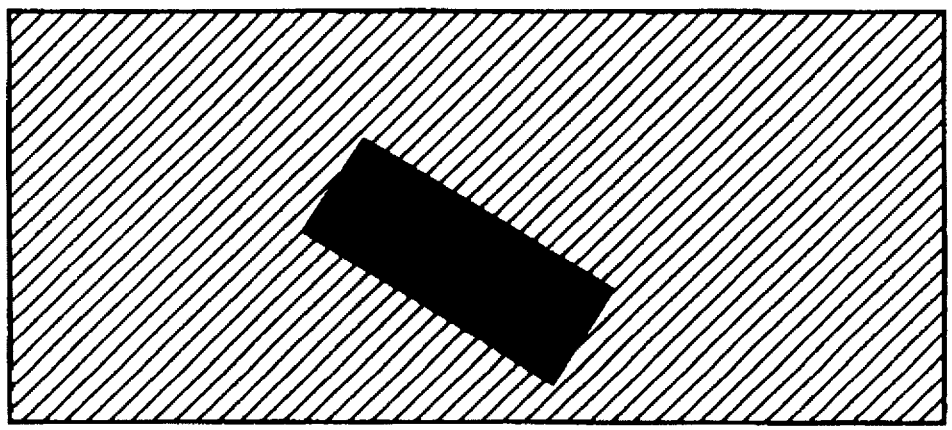
FIG. 19 is a bottom view showing an output image in the third embodiment.

FIG. 19 (bottom view) shows a copied image of FIG. 18.

(Fifth Embodiment)

Since the quantity of reflected light obtained by exciting a fluorescent ink is very small, it cannot often be sufficiently detected by only changing the gains of the variable amplifiers. In this case, the accumulation time of the CCD may be changed in correspondence with which one of the halogen lamp and the fluorescent lamp is used. That is, the accumulation time when using the fluorescent lamp may be prolonged.

Figure 20:
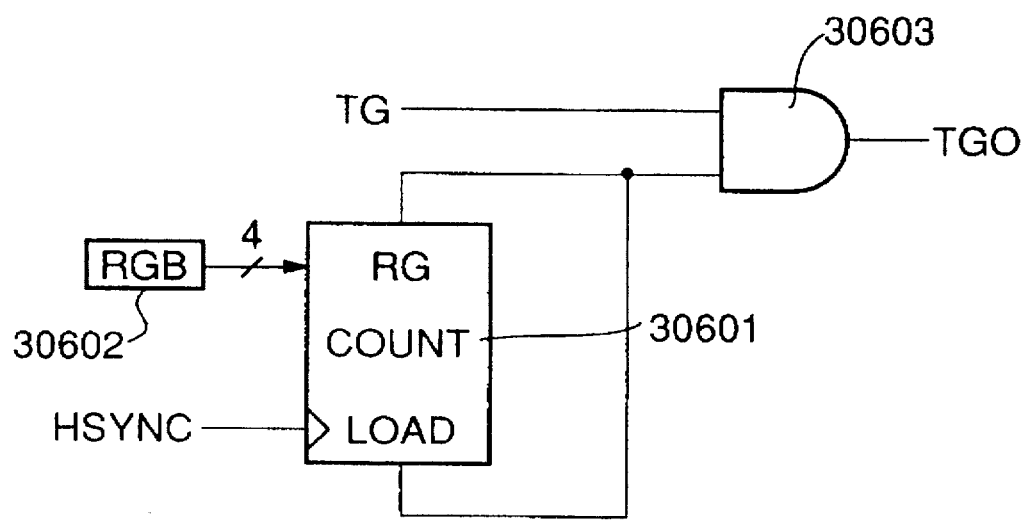
FIG. 20 is a block diagram showing a circuit for thinning out shift pulses of a sensor.

A method of prolonging the accumulation time of the sensor 210 will be described below with reference to FIGS. 20 to 22H. FIG. 22A shows a main-scanning synchronizing signal HSYNC, and FIG. 22B shows shift pulses TG for the sensor 210. The interval between two adjacent shift pulses TG corresponds to the accumulation time of the sensor 210. FIG. 20 shows a circuit for prolonging the accumulation time in the decoder 4008 shown in FIG. 1B. Referring to FIG. 20, a 4-bit counter 30601 is controlled by the CPU 417 to thin out shift pulses TG. In this embodiment, a method of prolonging the interval between the two adjacent shift pulses TG to three times will be described below. The CPU 417 sets a value (in this case, 2) indicating the number of shift pulses TG to be thinned out in a register 30602. A ripple carry RC (FIG. 22C) of the counter 30601 goes to "H" once per three intervals of HSYNC signals. An AND gate 30603 calculates an AND of the ripple carry RC and the shift pulses TG to thin out the shift pulses TG, and outputs pulses TGO (FIG. 22D). Since the pulses TGO have an interval three times that of the pulses TG, the accumulation time of the sensor 210 is prolonged to three times, and the output signal level of the sensor 210 can be increased to three times. Thus, very weak reflected light obtained by exciting the fluorescent ink can be read.

(Sixth Embodiment)

Figure 21:
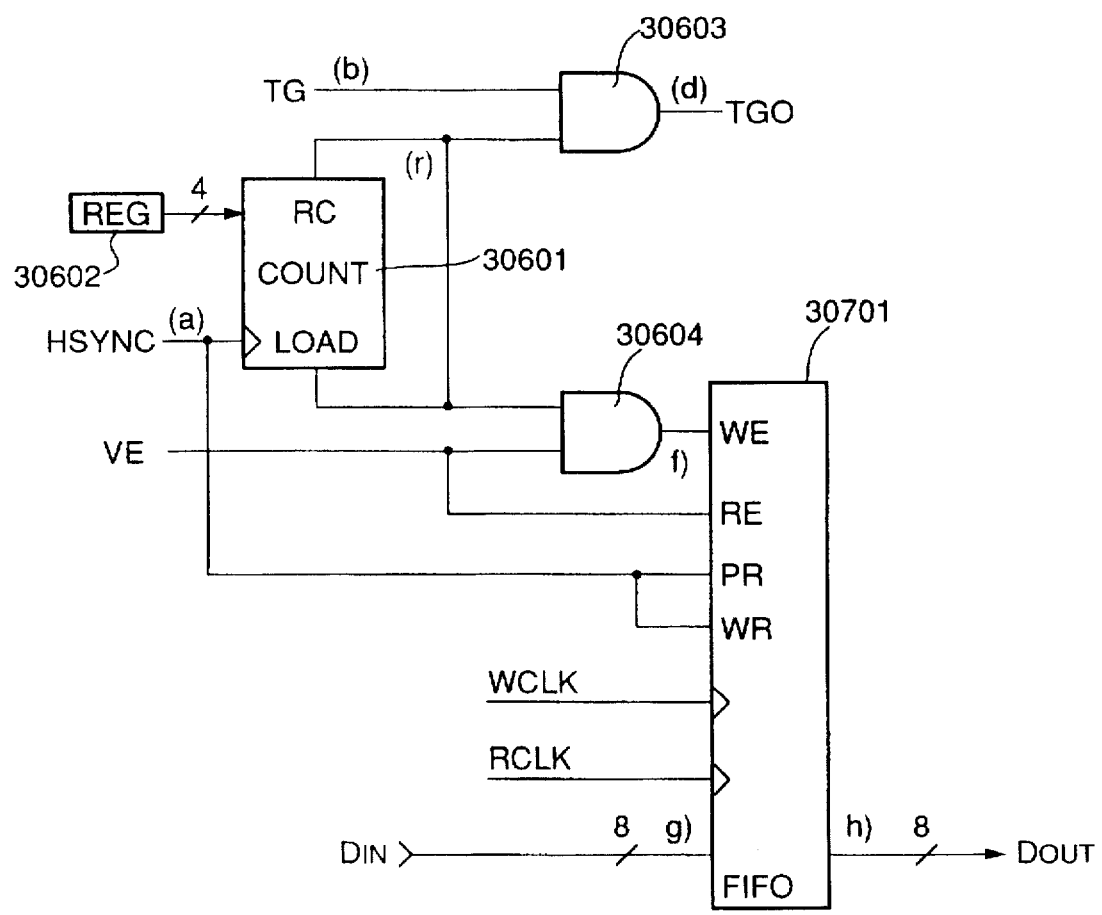
FIG. 21 is a block diagram showing a circuit for thinning out shift pulses of the sensor and image data.
Figure 22G:
Figure 22H:
Figure 24B:
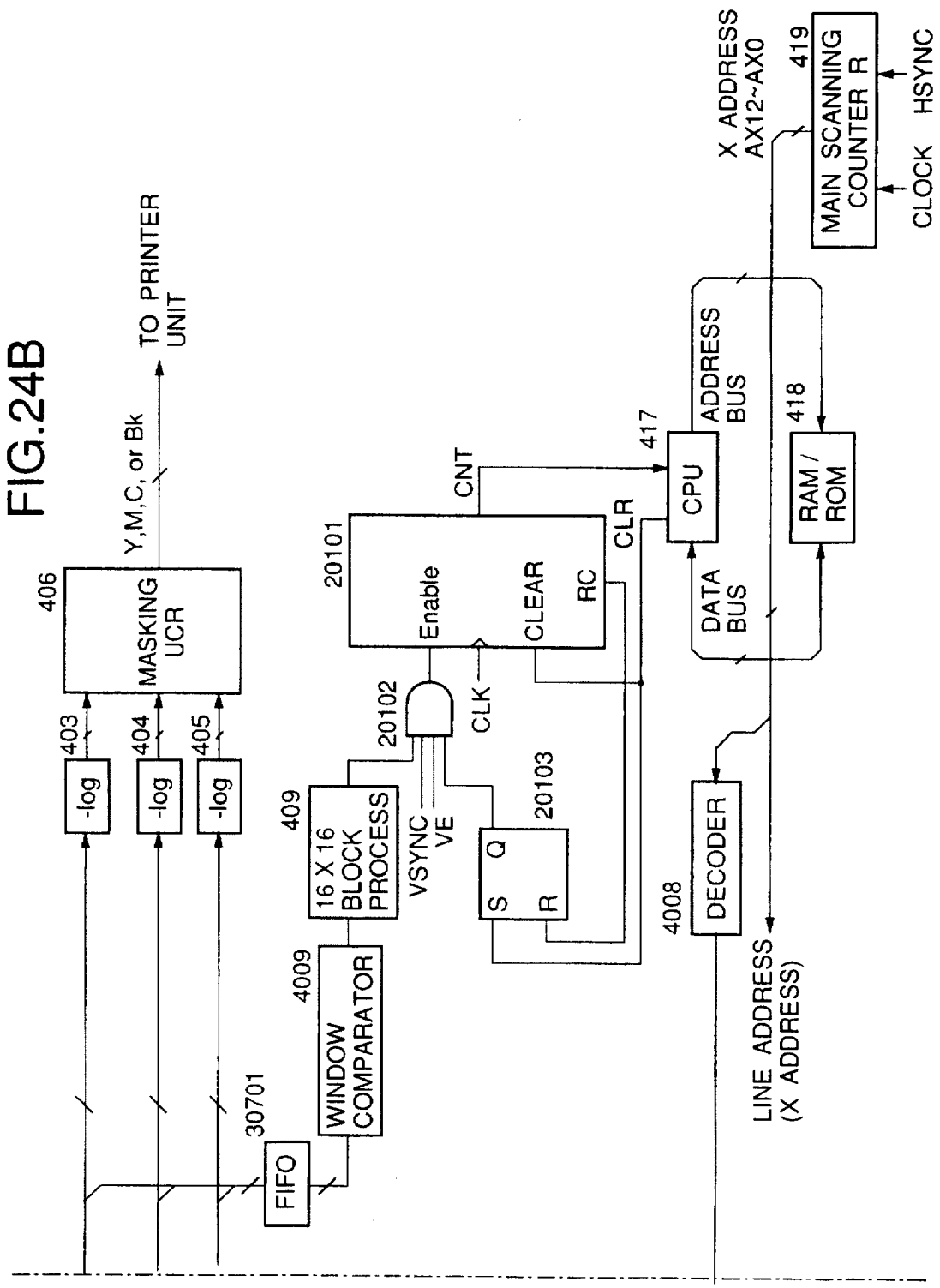
FIG. 24 is comprised of FIGS. 24A and 24B showing block diagrams of a signal processing unit of the fourth embodiment.

When the accumulation time of the sensor 210 is prolonged, the resolution in the sub-scanning direction may be decreased. A method of decreasing the resolution in the sub-scanning direction will be described below with reference to circuits shown in FIGS. 21 and 24A and 24B. In this case, as shown in FIGS. 24A and 24B, a FIFO memory 30701 is inserted between the window comparator 4009 and the delay element 401, and the like. FIG. 21 is a block diagram including peripheral circuits for driving the FIFO memory 30701. FIG. 22E shows an image effective period signal VE, which is used in read/write control of the FIFO memory 30701. Write and read clocks WCLK and RCLK are input to the FIFO memory 30701. An AND gate 30604 calculates an AND of the image effective period signal VE and the ripple carry RC to thin out the image effective period signal VE, and inputs the AND signal to the FIFO memory 30701 as a write enable signal WE shown in FIG. 22F. The FIFO memory 30701 receives image data Din (FIG. 22G) input in synchronism with the write clocks WCLK during an "H" period of the write enable signal, and outputs image data (FIG. 22H) in synchronism with the read clocks RCLK during an "H" period of the image effective period signal VE. As shown in FIGS. 22G and 22H, the FIFO memory 30701 thins out image data for two lines per three lines of input image data (FIG. 22G), and repetitively outputs image data for three lines, which are not thinned out. The FIFO memory 30701 need only be inserted immediately before the window comparator 4009, as shown in FIG. 24B.

(Seventh Embodiment)

Furthermore, the reading speed in the sub-scanning direction may be changed simultaneously with the change in accumulation time of the sensor 210, and the resolution in the sub-scanning direction may then be left unchanged. In this case, the delay amount of a delay element may be adjusted in correspondence with the sub-scanning speed.

For example, when the accumulation time is prolonged to twice, the sub-scanning speed is decreased to ½, and the delay times of R and G signals are increased to twice, the output signal level of the sensor 210 is doubled without decreasing the resolution in the sub-scanning direction.

(Eighth Embodiment)

When a plurality of fluorescent inks having different fluorescent characteristics are present on an original, the presence of a desired fluorescent ink can be detected by adjusting the threshold values of the window comparator 4009.

Figure 23:
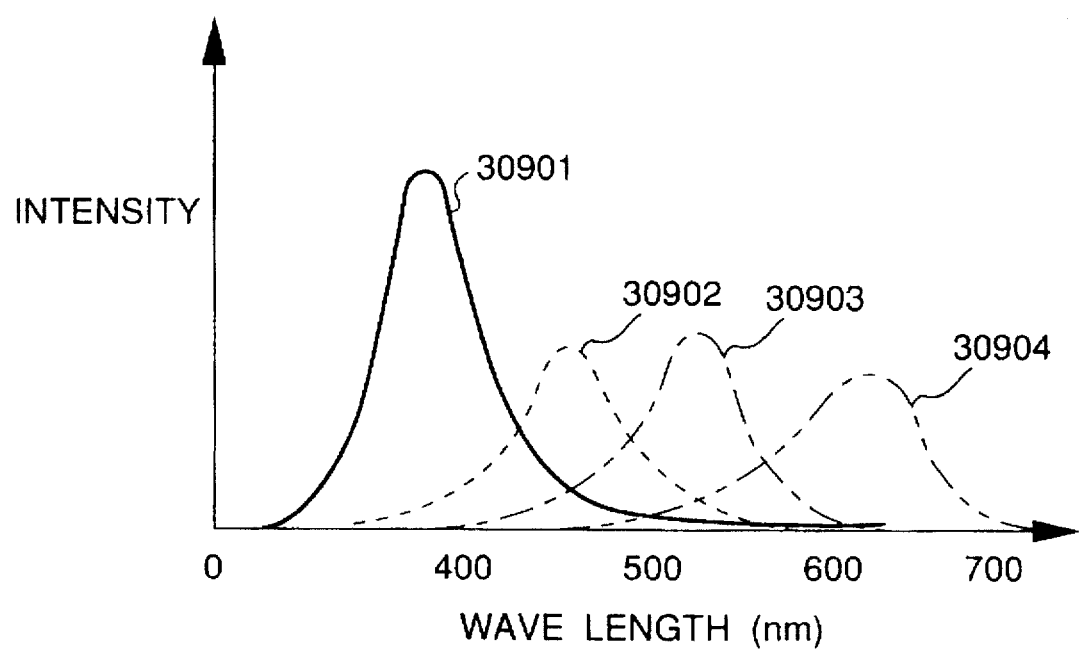
FIG. 23 is a graph showing the characteristics of a plurality of fluorescent inks.

Referring to FIG. 23, a curve 30901 represents the emission spectrum characteristics of the fluorescent lamp. Curves 30902, 30903, and 30904 respectively represent the characteristics of fluorescent inks which are excited by the fluorescent lamp having the spectrum characteristics 30901, and exhibit different reflection spectrum characteristics. For example, when it is discriminated whether or not a fluorescent ink which exhibits the fluorescent characteristics 30902 is printed on an original, the threshold values of the window comparator 4009 are adjusted, and it can be determined that a fluorescent ink which exhibits the fluorescent characteristics 30902 is printed on an original when R, G, and B signals satisfy the following relations:

$$08H<R<30H$$

and $$12H<G<30H$$

and $$60H<B<A0H$$

When it is discriminated whether or not a fluorescent ink which exhibits the fluorescent characteristics 30903 is printed on an original, the threshold values of the window comparator 4009 are adjusted, and it can be determined that a fluorescent ink which exhibits the fluorescent characteristics 30903 is printed on an original when R, G, and B signals satisfy the following relations:

$$10H<R<30H$$

and $$60H<G<A0H$$

and $$08H<B<28H$$

When it is discriminated whether or not a fluorescent ink which exhibits the fluorescent characteristics 30904 is printed on an original, the threshold values of the window comparator 4009 are adjusted, and it can be determined that a fluorescent ink which exhibits the fluorescent characteristics 30904 is printed on an original when R, G, and B signals satisfy the following relations:

$$60H<R<A0H$$

and $$10H<G<30H$$

and $$08H<B<28H$$

When the threshold values of the window comparator 4009 are adjusted in this manner, whether or not an original is a copy-inhibited original can be discriminated in correspondence with the color tone of reflected light of a fluorescent ink. A plurality of types of copy-inhibited originals can be detected by arranging a plurality of window comparators which have different sets of threshold values.

In the above description, discrimination of a copy-inhibited original has been exemplified. However, an original to be detected is not limited to a copy-inhibited original.

(Ninth Embodiment)

As processing executed when it is determined that an original image is a copy-inhibited original, in the above description, the copying operation is stopped, a copy is output with a copy-inhibited area painted in black, a copy is output after a fluorescent mark printed for discriminating a copy-inhibited original is visualized thereon, or the like. In addition, any other methods of stopping a normal copying operation may be adopted. For example, the entire output image, or one or a plurality of portions of an output image may be painted in white, black, or a specific color, or may be output in a specific pattern, a warning tone may be generated, a specific pattern may be added, forgery may be informed to a police via, e.g., a modem, an original image may be inhibited from being removed, the functions of the entire apparatus are stopped, and so As a visible light source, the halogen lamp has been exemplified. However, the present invention is not limited to this as long as a light source can emit light in a visible wavelength range.

In the above embodiments, the standard white plate and the fluorescent basis plate are separately prepared. Alternatively, an ultraviolet fluorescent material, which exhibits white characteristics with respect to visible light, may be used, and sensor outputs corresponding to visible light and ultraviolet fluorescence may be corrected using a single basis plate.

The single basis plate may comprise a plate obtained by coating an ultraviolet fluorescent material, which exhibits characteristics of transparency with respect to visible light, on a basis plate which is white under visible light.

Also, a driver common to the fluorescent lamp and the visible light lamp may be used to alternately control these lamps.

Figure 25:
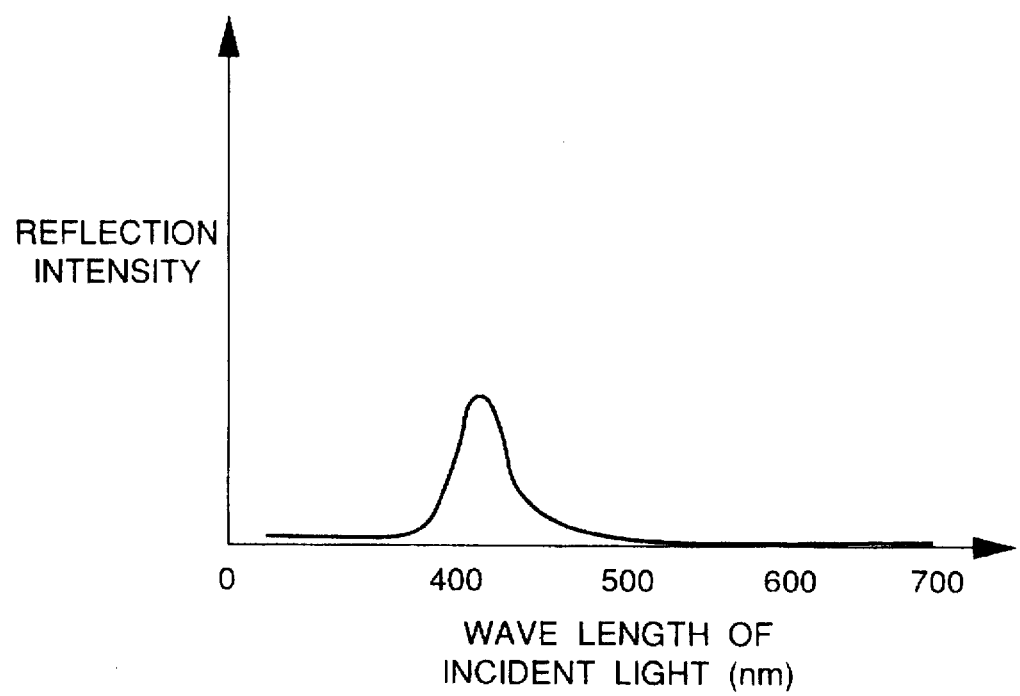
FIG. 25 is a graph showing the characteristics of a fluorescent ink excited by visible light.
Figure 26:
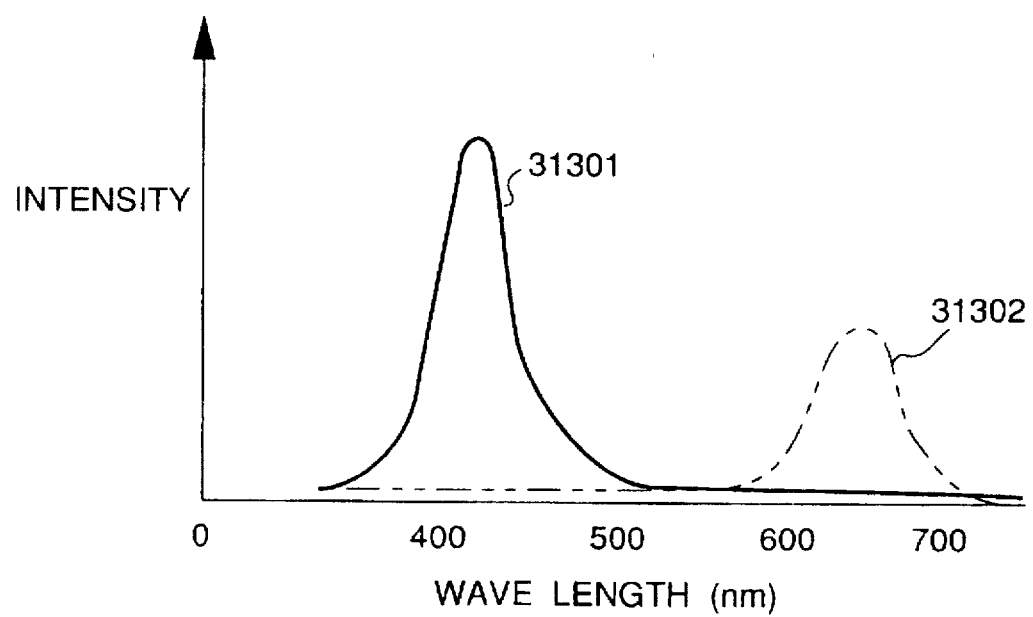
FIG. 26 is a graph showing the reflection spectrum characteristics of the fluorescent ink excited by visible light.

As the fluorescent lamp, the lamp, which emits ultraviolet rays, has been exemplified. However, a light source, which emits light of other wavelengths, may be adopted. For example, a fluorescent lamp used for detecting a fluorescent ink excited in a visible wavelength range may be a visible light source. FIGS. 25 and 26 show the characteristics of a fluorescent ink excited by visible light. The wavelength of incident light is plotted along the abscissa of the graph in FIG. 25. As can be seen from FIG. 25, this fluorescent ink is most efficiently excited by incident light having a wavelength of 420 nm (visible light).

FIG. 26 shows the reflection spectrum characteristics obtained when a fluorescent ink having fluorescent characteristics 30904 (FIG. 23) is irradiated with light emitted from a fluorescent lamp having emission characteristics 31301.

Detection of fluorescent inks which exhibit the fluorescent characteristics shown in FIGS. 23 and 26 can be realized by adjusting the threshold values of the window comparator 4009, as described above.

As described above, according to the above embodiments, when a fluorescent ink is detected from an original using a fluorescent ink, a copy-inhibited original can be detected.

In order to read fluorescent information, a fluorescent basis plate, which exhibits fluorescent characteristics, is arranged, and the output from the read sensor is corrected based on a signal obtained by reading the fluorescent basis plate, thus allowing precise reading of fluorescent information.

When read signals are corrected in correspondence with a plurality of light sources, fluorescent information can be read more precisely.

When the quantities of light from visible light illumination means and non-visible light illumination means are independently adjusted, fluorescent information can be read more precisely.

Since the fluorescent basis plate has fluorescent characteristics equivalent to those of a fluorescent ink printed on an original, fluorescent information can be read more precisely.

Since information which cannot be identified under visible light is recorded as visible information, a normal copying operation of a copy-inhibited original can be prevented.

When both the fluorescent lamp and the halogen lamp are turned on in a normal reading operation, a fluorescent ink, which is not easily emphasized by visible light, can be emphasized and output as a visible image.

Since the quantity of reflected light obtained by exciting a fluorescent ink is very small, it cannot often be sufficiently detected by only changing the gains of the variable amplifiers. In this case, the accumulation time of the CCD may be changed in correspondence with which one of the halogen lamp and the fluorescent lamp is used. In this case, the resolution in the sub-scanning direction may be decreased in correspondence with the prolonged accumulation time of the CCD. Also, when the reading speed in the sub-scanning direction is changed simultaneously with a change in accumulation time of the CCD, the resolution in the sub-scanning direction may be left unchanged.

By adjusting the threshold values of the window comparator for detecting fluorescent information, a specific original can be discriminated based on the color tone of light reflected by a fluorescent ink.

According to the above embodiments, a specific image can be satisfactorily discriminated by a simple arrangement in addition to a normal original reading operation.

(10th Embodiment)

The 10th embodiment of the present invention will be described below.

In the embodiments to be described below, the present invention is applied to a copying machine. However, the present invention is not limited to this. For example, the present invention can be applied to various other apparatuses such as an image scanner connected to a computer.

In the embodiments to be described below, infrared rays will be exemplified as excitation light, and visible light will be exemplified as emission light. However, the excitation light and emission light may be present in any of infrared, visible, and ultraviolet wavelength ranges as long as the wavelength of the emission light is shorter than that of the excitation light.

The arrangement of the apparatus of this embodiment is the same as that of the first embodiment, and a detailed description thereof will be omitted.

Figure 27:
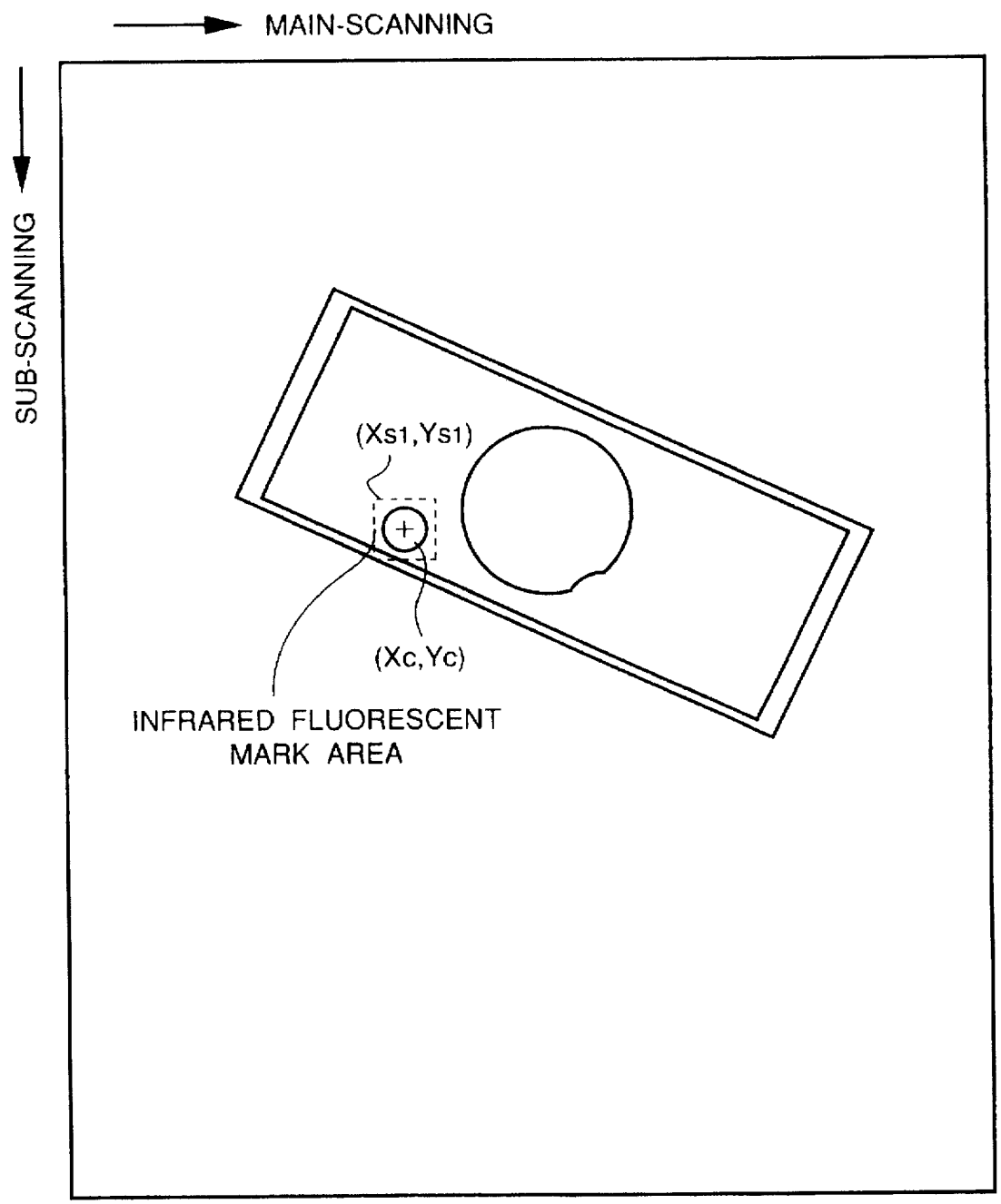
FIG. 27 is a view showing a detection state of an identification mark on a copy-inhibited original in the 10th to 12th embodiments.

In the following description, this embodiment assumes, as an example of a copy-inhibited original, an original on which a mark similar to a red seal is printed at a predetermined position of an original using an ink having characteristics of an infrared-excited fluorescent material with respect to infrared rays, as shown in FIG. 27. However, the present invention is not limited to this.

The infrared-excited fluorescent material used in this embodiment will be described below. The infrared-excited fluorescent material can be classified in units of its mechanisms as follows:

(1) fluorescent material based on multi-stage energy transmission (2) fluorescent material utilizing infrared stimulation effect The fluorescent material (1) emits visible light by two- or three-stage energy transmission upon radiation of infrared rays.

The fluorescent material (2) generates luminescence of visible light upon radiation of infrared rays after light of a short wavelength is radiated in advance.

In this embodiment, the fluorescent material (1) based on multi-stage energy transmission is used. More specifically, a fluorescent compound of BaY1.34Yb0.60Er0.06F8 is used.

Figure 28:
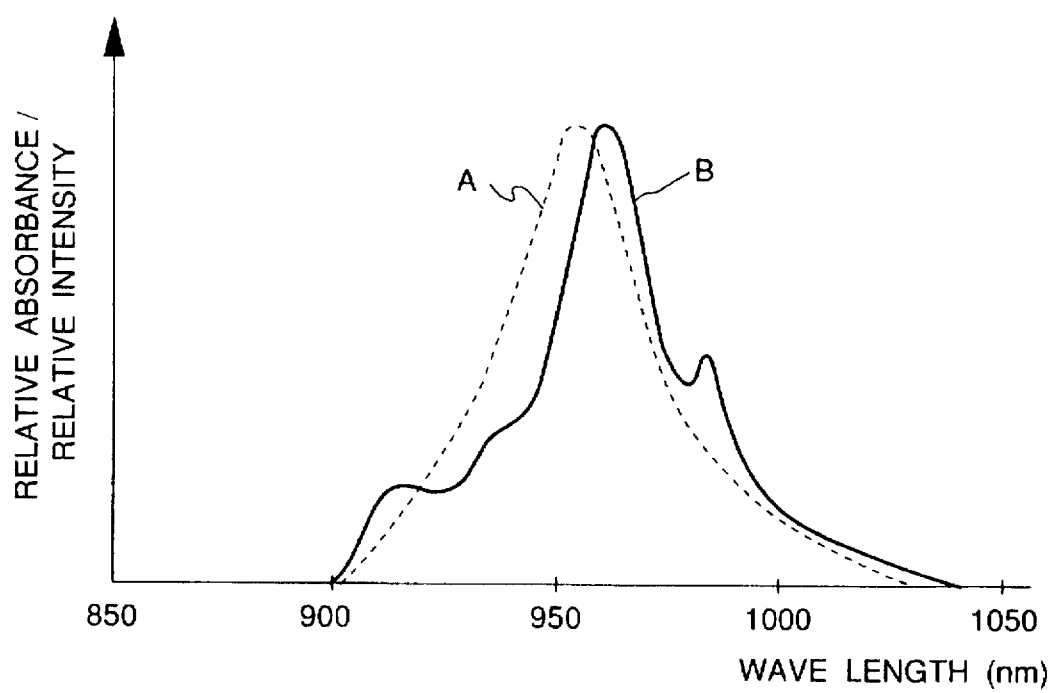
FIG. 28 is a graph showing the excitation spectrum of an infrared fluorescent material, and the spectrum characteristics of an infrared LED in the 10th and 11th embodiments.

FIG. 28 shows an emission spectrum B of an LED 230 used in this embodiment, and an excitation spectrum A of a fluorescent material used in this embodiment.

Figure 36:
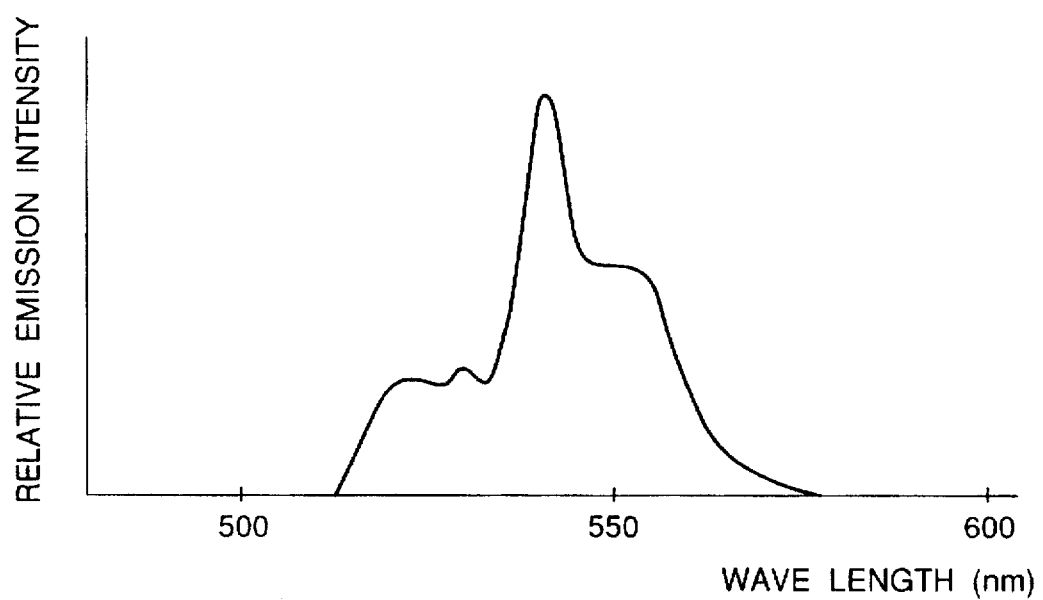
FIG. 36 is a graph showing the emission spectrum of an infrared fluorescent material in the 10th and 11th embodiments.

Skipping some figures, FIG. 36 shows the emission spectrum of the fluorescent material used in this embodiment.

As can be seen from FIG. 36, the fluorescent emission spectrum has a peak at 545 nm, and this reflected light is read by a G (green) line sensor. The reason why the reflected light is read by the G sensor is that G is closest to ND.

In general, the intensity of fluorescence is as low as half or less (sometimes, 10% or less) of that of excitation light. In this embodiment, when an infrared fluorescent signal is read, the moving speed of a reader optical system is decreased to increase the charge accumulation time of a CCD, thus assuring a required dynamic range of the read signal of fluorescent light.

(Image Scanner Unit)

Figure 29B:
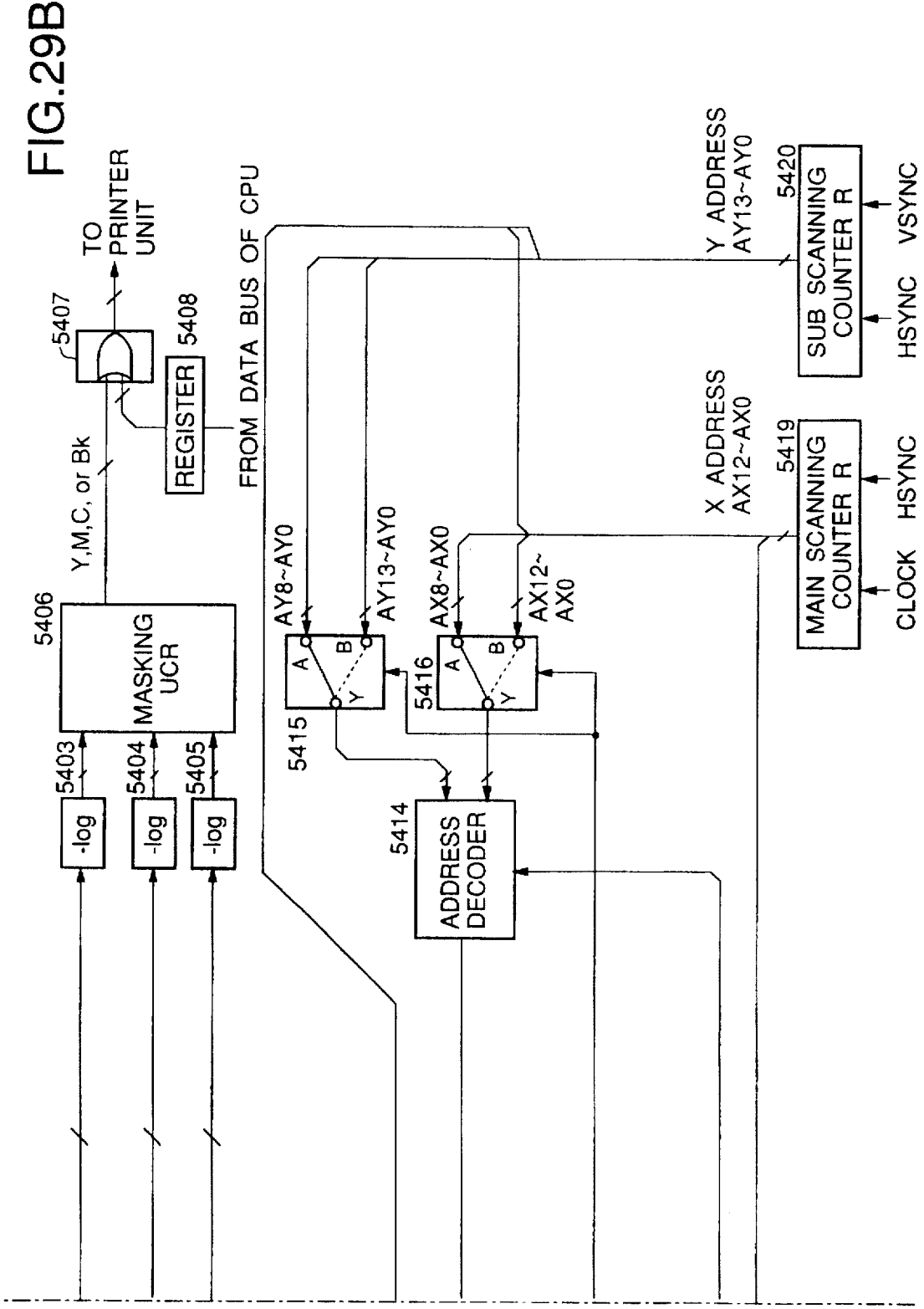
FIG. 29 is comprised of FIGS. 29A and 29B showing block diagrams of a signal processing unit of the 10th embodiment.

FIGS. 29A and 29B show internal blocks of an image scanner 201. CCDs (sensors) 210-1, 210-2, and 210-3 respectively have red (R), green (G), and blue (B) spectrum sensibility characteristics, and output signals quantized to 8 bits, i.e., 0 to 255.

Since the sensors 210-1, 210-2, and 210-3 used in this embodiment are arranged to be separated by a predetermined distance, as shown in FIG. 13, as in the above-mentioned embodiment, spatial shifts among these sensors are corrected by delay elements 5401 and 5402. Log converters 5403, 5404, and 5405 comprise look-up table ROMs, and convert luminance signals into density signals. A known masking & UCR circuit 5406 (a detailed description thereof will be omitted) outputs Y, M, C, and Bk signals each having a predetermined bit length (e.g., 8 bits) in accordance with input three primary color signals every time a reading operation is performed. An OR gate 5407 logically ORs the output from the circuit 5406 and a value held in a register 5408. Normally, a value "00H" is written in the register 5408, and the output from the circuit 5406 is directly output to a printer unit. However, when a CPU 5417 sets FFH in the register 5408 via a data bus in forgery prevention processing, an image painted by toners can be output. As the forgery prevention processing, various other processing may be proposed in addition to such alteration of image data. For example, the power supply of the apparatus may be turned off, image forming processing means may be stopped, and so on.

The CPU 5417 controls the apparatus in the respective modes. A window comparator 5408 discriminates whether or not a specific level signal designated by the CPU 5417 is input, and detects a red seal, which emits infrared fluorescence, in the above-mentioned infrared fluorescence reading mode.

A block processing circuit 5409 executes 16×16 block processing, and processes the output from the window comparator 5408 in units of 16×16 blocks.

A programmable random-access memory (RAM) 5412 is connected to selectors 5411 and 5413. The selector 5411 selects data to be accessed by the RAM 5412, and the selector 5413 selects an address. Note that the RAM 5412 has a capacity capable of storing image signals in a mark area shown in FIG. 27.

A main-scanning counter 5419 is reset in response to an HSYNC signal, is counted up in response to the timing of a CLK signal, and generates 13-bit main-scanning address data (to be referred to as X address hereinafter) X12 to X0.

A sub-scanning address counter 5420 is reset in a "0" period of a VSYNC signal, is counted up in response to the timing of the HSYNC signal, and generates 13-bit sub-scanning address data (Y address) Y13 to Y0.

In this embodiment, since the sub-scanning length is larger than the main-scanning length, the address counter 5420 is set to be 13 bits.

The CPU 5417 controls the selectors 5411 and 5413, selectors 5415 and 5416, and an address decoder 5414 to read/write data from/in the RAM 5412. A RAM/ROM 5418 is connected to the CPU 5417. A watermark detection circuit 5410 detects a watermark portion of paper money.

The window comparator 5408 shown in FIG. 29A has the same arrangement as that shown in FIG. 4.

Figure 30:
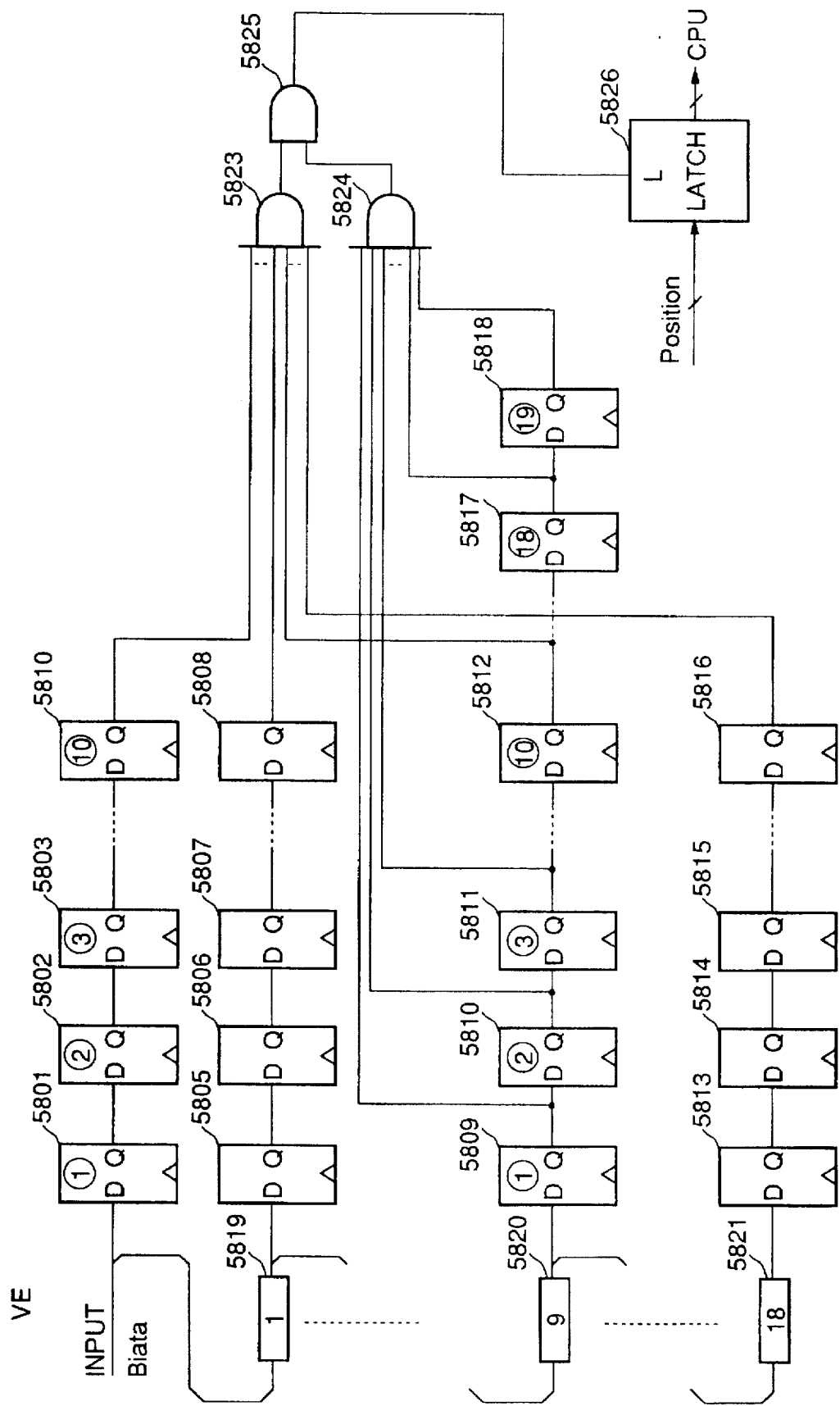
FIG. 30 is a block diagram showing a circuit for detecting the position of a fluorescent mark in the 10th to 12th embodiments.

FIG. 30 is a block diagram for explaining the watermark detection circuit 5410.

Each of 18 FIFOs 5819, 5820, . . . , 5821 delays input data by one line, so that data for 19 lines can be processed at the same time.

Ten each of DFFs 5801, 5802, 5803, . . . , 5804, 5805, 5806, 5807, . . . , 5808, . . . , 5809, 5810, 5811, . . . , 5812, . . . , 5813, 5814, 5815, . . . , 5816 are connected in series in correspondence with each of the outputs for 19 lines. Furthermore, nine DFFs . . . , 5817, 5818 are further arranged at the output side of the DFF 5812. All these DFFs are driven in response to a signal CLK16. "1" is output via AND gates 5823, 5824, and 5825 when all the outputs from the DFFs 5804, 5808, . . . , 5812, 5816 (vertical 19 blocks), and from the DFFs 5809, 5810, 5811, 5812, 5817, 5818 (horizontal 19 blocks) are "1", and the position at that time is latched and is supplied to the CPU.

Figure 31B:
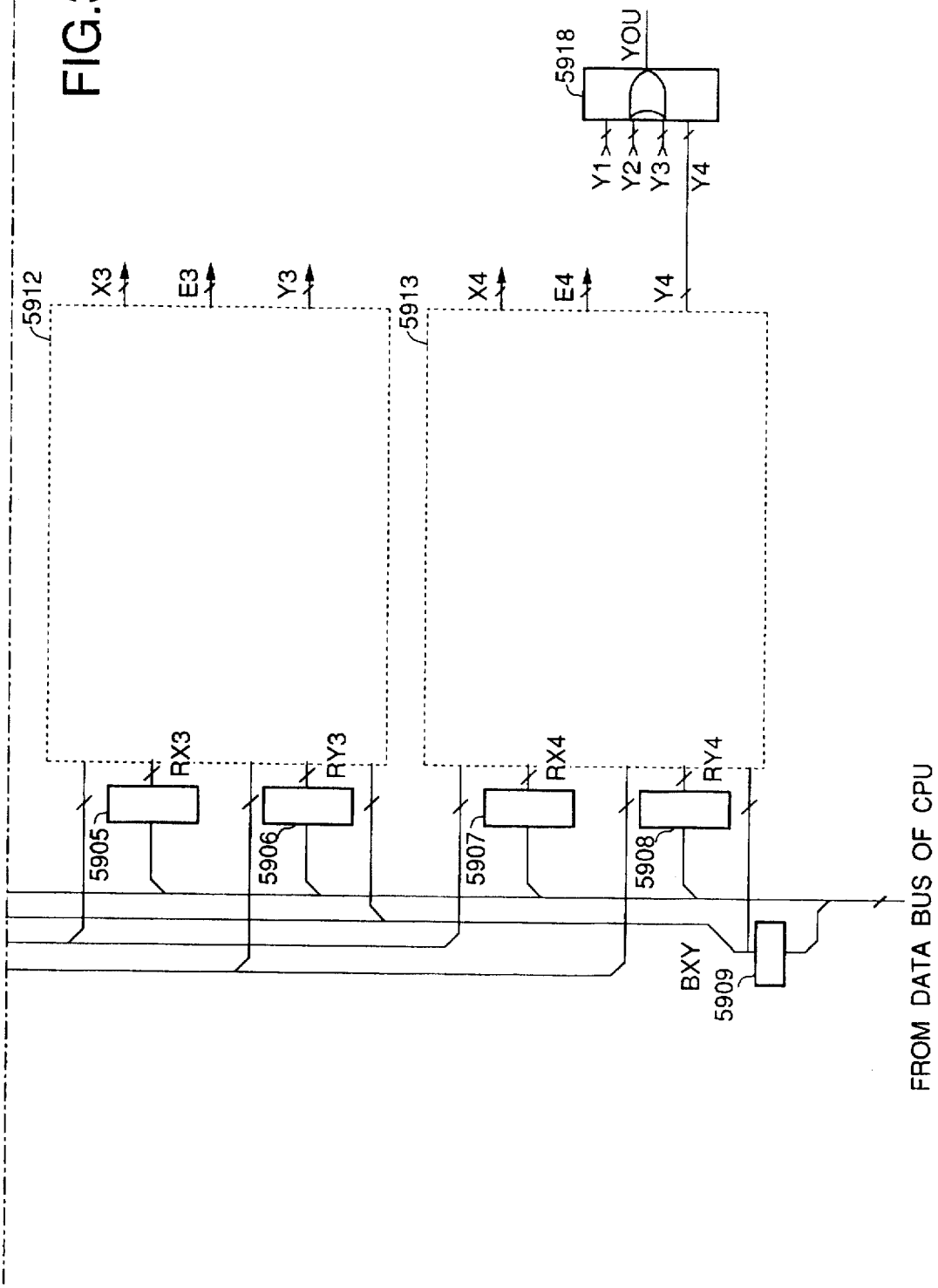
FIG. 31 is comprised of FIGS. 31A and 31B showing block diagrams of the arrangement of an address decoder 414 for generating an address of a memory 412 for storing a fluorescent mark in the 10th to 12th embodiments.

FIGS. 31A and 31B are a block diagram of the address decoder 5414.

Registers 5901, 5902, 5903, 5904, 5905, 5906, 5907, 5908, and 5909 are directly connected to the data bus of the CPU, and are written with desired values by the CPU.

Since circuits 5910, 5911, 5912, and 5913 have the same structure, only the circuit 5910 will be described below.

Each of subtracters 5914 and 5915 outputs A–B for their inputs A and B. The MSB of the output from each subtracter is a sign bit, and when the sign bit represents negative, MSB=1 is output. Each of comparators 5916 and 5917 outputs "1" when their inputs A and B satisfy A<B. However, when the MSB of the input A is "1", each comparator outputs "0" regardless of the input B.

AND gates 5918, 5919, and 5920 are connected to these subtracters and comparators. When a value "BXY" is written in the register 5909, only when the following condition (1) is satisfied:

$$RX1 < X\text{address} < RX1 + BXY$$

and $$RY1 < Y\text{address} < RY1 + BXY \quad (1)$$

the AND gates 5918, 5919, and 5920 output:

$$X1 = X\text{address} - RX1$$

$$Y1 = Y\text{address} - RY1$$

$$E1 = 1$$

Similarly, in the circuit 5911, only when the following condition (2) is satisfied:

$$RX2 < X\text{address} < RX2 + BXY$$

and $$RY2 < Y\text{address} < RY2 + BXY \quad (2)$$

the AND gates 5918, 5919, and 5920 output:

$$X2 = X\text{address} - RX2$$

$$Y2 = Y\text{address} - RY2$$

$$E2 = 1$$

Similarly, in the circuit 5912, only when the following condition (3) is satisfied:

$$RX3 < X\text{address} < RX3 + BXY \quad (3)$$

and $$RY3 < Y\text{address} < RY3 + BXY$$

the AND gates 5918, 5919, and 5920 output:

$$X3 = X\text{address} - RX3$$

$$Y3 = Y\text{address} - RY3$$

$$E3 = 1$$

Similarly, in the circuit 5913, only when the following condition (4) is satisfied:

$$RX4 < X\text{address} < RX4 + BXY$$

and $$RY4 < Y\text{address} < RY4 + BXY \quad (4)$$

the AND gates 5918, 5919, and 5920 output:

$$X4 = X\text{address} - RX4$$

$$Y4 = Y\text{address} - RY4$$

$$E4 = 1$$

OR gates 5914, 5915, 5916, 5917, and 5918 are connected to the circuits 5910 to 5913. When RX1, RY1, ..., RX4, and RY4 are set so that two or more of conditions (1), (2), (3), and (4) are not simultaneously satisfied, the OR gate 5914 outputs one of X1, X2, ..., X4, the OR gate 5917 outputs "1" when one of the conditions is satisfied, and the OR gate 5918 outputs one of Y1, Y2, ..., Y4.

The OR gates 5915 and 5916 output data according to the following table:

TABLE 2

| Condition | A17 | A18 |
|---|---|---|
| (1) satisfied | 0 | 0 |
| (2) satisfied | 1 | 0 |
| (3) satisfied | 0 | 1 |
| (4) satisfied | 1 | 1 |
| No output | 0 | 0 |

(Processing Flow)

Figure 33:
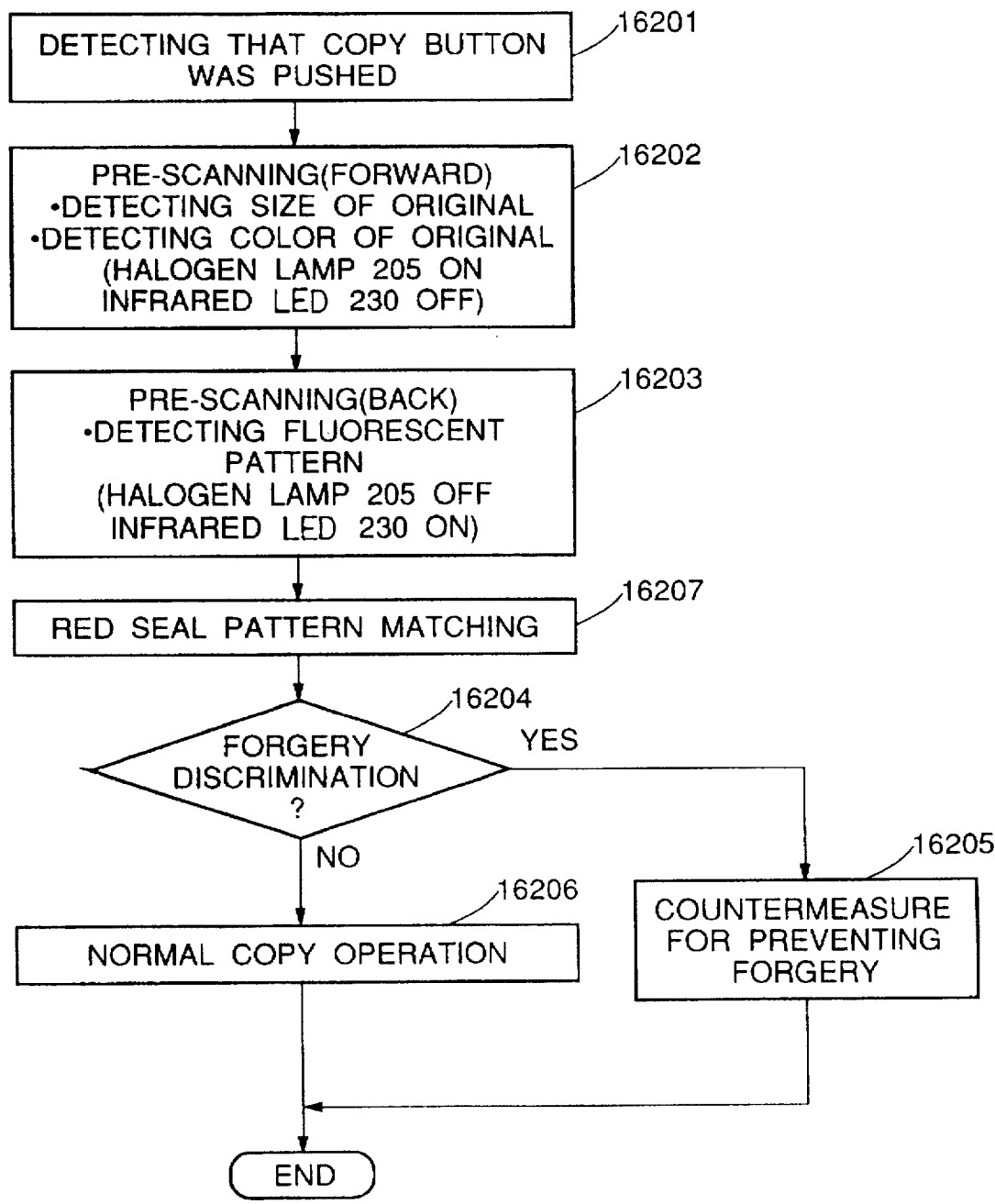
FIG. 33 is a flow chart of the 10th embodiment.

FIG. 33 is a flow chart showing processing under the control of the CPU. Referring to FIG. 33, it is detected in step 16201 that a start (copy) button is pushed. In step 16202, a halogen lamp 205 is turned on, and the infrared LED is turned off. In this state, original size detection, original angle detection, and rough position detection of a watermark portion in an original are executed while moving the reading optical system. For this purpose, the CPU writes values capable of detecting a background of paper money in the registers 601 to 606 (FIG. 4) in the window comparator 5408.

FIG. 27 shows a state wherein a specific original is placed on the original table. In the 1st scanning operation, i.e., in mode 1, the window comparator outputs "1" in correspondence with a hatched portion in FIG. 27, i.e., a watermark portion and its surrounding portion.

Furthermore, since the output "1" continues over a predetermined number of pixels in the vertical and horizontal directions on the watermark portion, an address corresponding to ($X_c$, $Y_c$) is latched in the watermark detection circuit 5410 at a portion corresponding to ($X_c$, $Y_c$) in FIG. 27, and is supplied to the CPU 5417.

The CPU 5417 can detect a rough value of ($X_c$, $Y_c$) as the center of an original. Then, a setting operation for backward scanning (step 16203 in FIG. 33) is executed. More specifically, the selector 5411 is set at the A side, and the selectors 5413, 5415, and 5416 are also set at the A side. Also, the position of a red seal is set in the address decoder 5414 to have:

$$RX1 = X_{s1}, \; RY1 = Y_{s1} \text{ (in units of pixels)}$$

Note that $X_c$ and $Y_c$ are data of the central position of the mark within a 9.5-mm detection range, as has been described in the description of the detection circuit with reference to FIG. 30.

In order to sufficiently cover the range of a fluorescent mark having a diameter of 10 mm to 20 mm, the number of pixels (e.g., 472 when the reading resolution of the CCD including the CCDs 210-1 to 210-3 is 400 dpi) corresponding to about 30 mm is set in BXY.

As the start address data $X_{s1}$ and $Y_{s1}$, values closer to the origin by 15 mm (236 pixels at 400 dpi) than $X_c$ and $Y_c$ are set.

When the reading optical system is moved backward in step 16203 after the optical system reaches one end, the halogen lamp 205 is turned off, and the infrared LED 230 is turned on to execute an infrared fluorescent signal reading mode.

As can be seen from the emission spectrum characteristics shown in FIG. 37, a fluorescent signal is read using a G (green) CCD signal.

The selector 5411 is switched to the B side, so that the output from the window comparator 5408 is written in the RAM 5412 at four positions considered as the position of the red seal shown in FIG. 27.

Excited light of the red seal portion is detected in step 16207 according to an algorithm (to be described later), and forgery discrimination is performed in step 16204. If there is no possibility of forgery, i.e., if no red seal is detected, an image is developed by four color toners (Y, M, C, and Bk toners) in a normal copying operation, and the developed image is fixed and output in step 16206.

However, if it is determined in step 16204 that there is a possibility of forgery, i.e., if the red seal is detected, a countermeasure for preventing forgery is taken in step 16205. More specifically, a value "FFH" is set in the register 5408 (FIG. 29A; a value "00H" is normally set), and is supplied to the printer unit. Thus, a Bk toner becomes attached to the entire surface of a paper sheet, thus disturbing the normal copying operation.

(Pattern Matching)

Pattern matching of the red seal in step 16207 will be described in detail below.

Note that two red seal patterns are registered in advance in the RAM/ROM 5418 of this embodiment so as to execute pattern matching.

Figure 34:
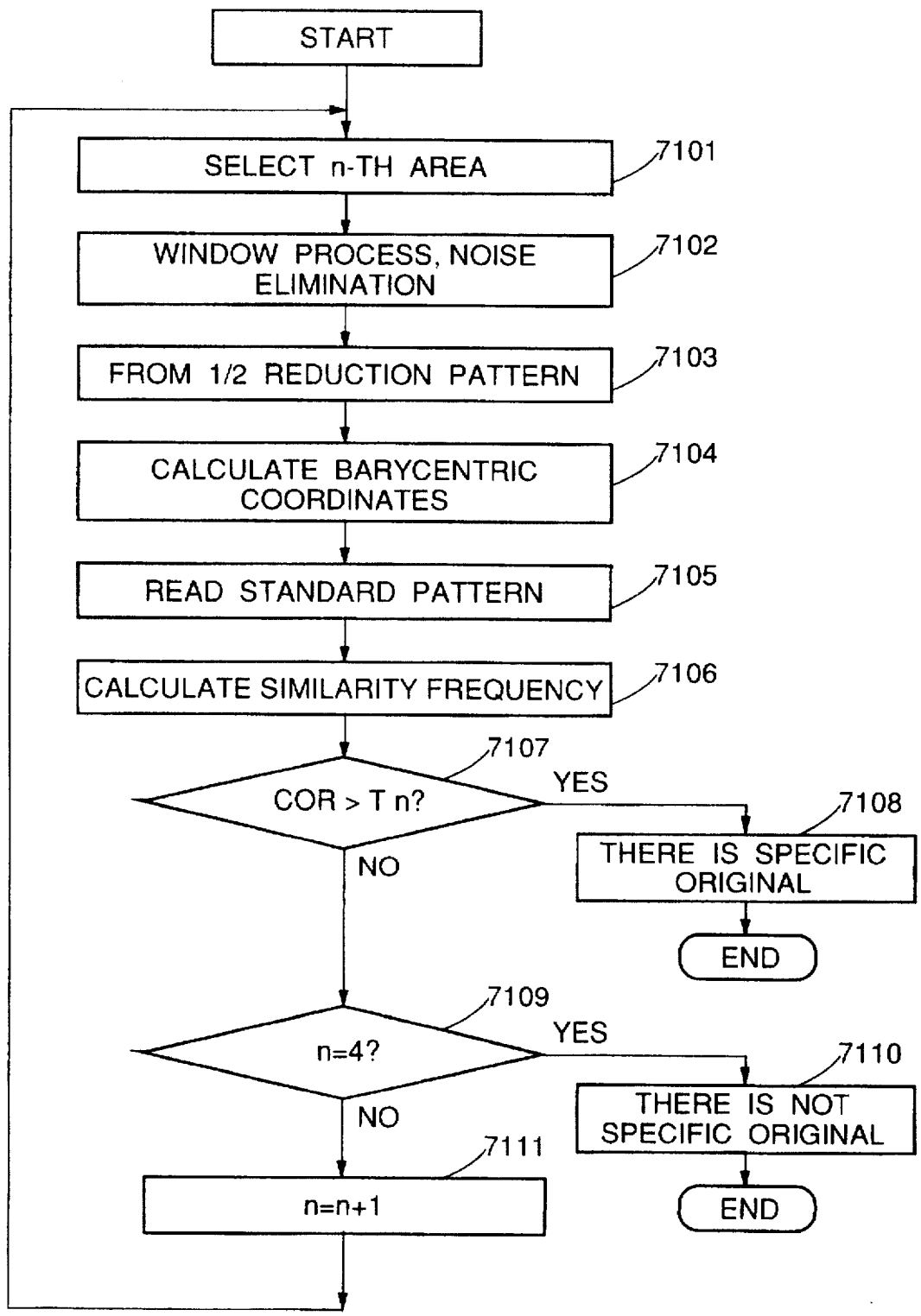
FIG. 34 is a flow chart showing a pattern matching operation of a CPU in the 10th to 12th embodiments.

When a specific portion of a specific original is written in the RAM 5412, the CPU 5417 executes a pattern matching operation with reference to the content of the RAM 5412. FIG. 34 is a flow chart showing the pattern matching operation. The RAM 5412 stores four different binary data as candidates of a specific portion. These four data will be referred to as area 1 to area 4 hereinafter.

Processing in step 7102 and subsequent steps is executed for area 1. In step 7102, window processing for noise elimination is executed.

Assume that the binary image of area 1 corresponds to a pattern 2201. In the pattern 2201, a small square represents one pixel, a blank square represents a white pixel, and a hatched square represents a black pixel. This pattern is scanned using a 2×2 pixel window 2202, and the number of black pixels in the window is counted. A portion where the count value exceeds 2 is set to be a new black pixel. In this manner, the processing result is reduced to ½ in both the vertical and horizontal directions, as indicated by a pattern 2203, and a noise-eliminated pattern is obtained. Since the number of black pixels in the window at the position of 2202 is 1, the black pixel is replaced with a white pixel at a position of 2204.

Then, the barycentric position of the pattern 2203 is calculated.

The barycentric position can be calculated by a known method by projecting the pattern 2203 in the vertical and horizontal directions.

Then, the similarity frequency is calculated by standard pattern matching. In step 7105, a standard pattern registered in advance as a dictionary is loaded from the RAM/ROM 5418 (FIG. 29A) to the CPU. The standard pattern is a red seal pattern of paper money as the current object. However, a pattern extracted in step 7103 may be rotated depending on the angle when paper money is placed on the original table, and a satisfactory result cannot be obtained even if the extracted pattern is compared with a single standard pattern.

Figure 35A:
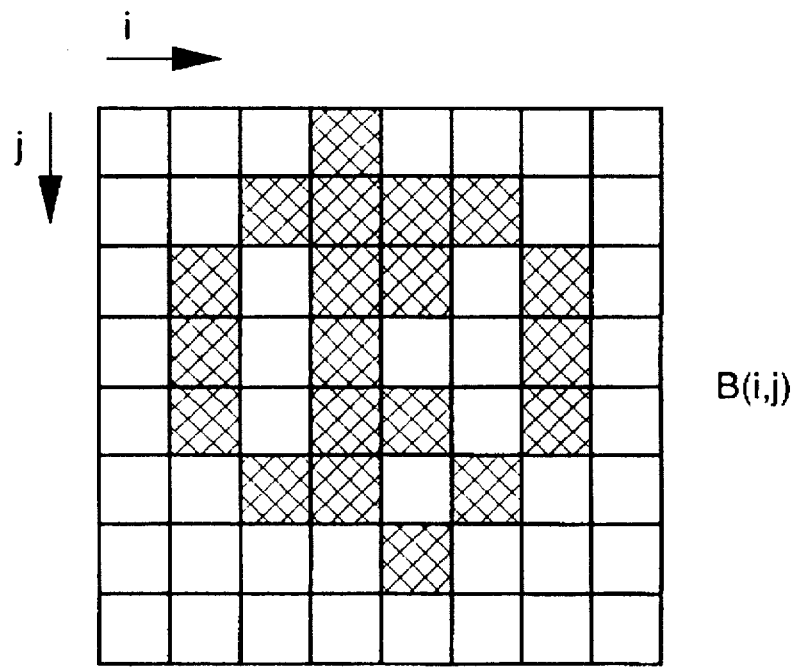
FIGS. 35A and 35B are schematic views for explaining a pattern matching operation of a fluorescent mark in the 10th to 12th embodiments.
Figure 35B:
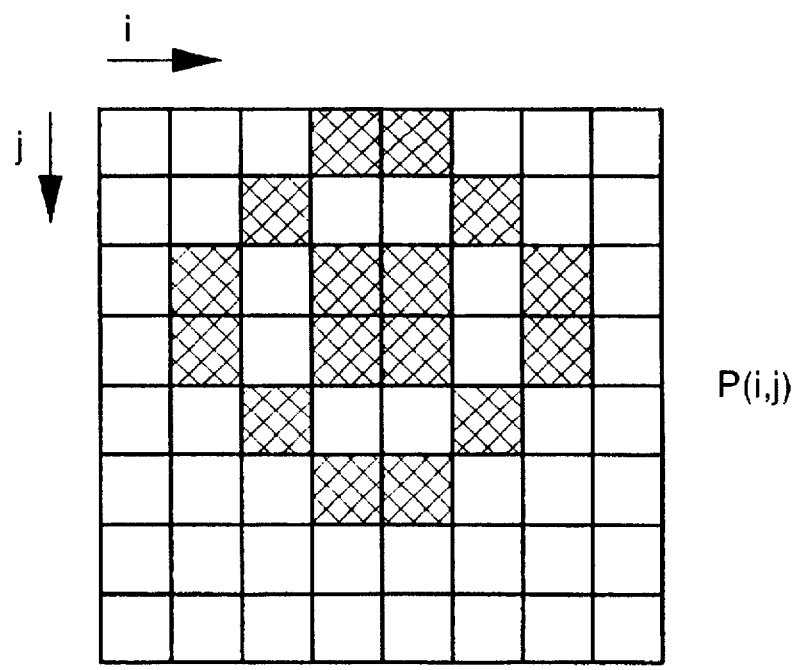

As the standard pattern, a plurality of patterns obtained by rotating the red seal pattern at every several degrees are formed and stored in advance in the RAM/ROM 5418, and a proper pattern is selected from these patterns and is loaded to the CPU. As the plurality of patterns, a total of 24 patterns obtained by rotating the red seal pattern at every 15° within a range from 0° to 360° are used. As a selection method, the already detected angle θ of an original is referred to, and when $-8° \leq \theta < 8°$, a standard pattern having a rotational angle of 0 degrees is selected. When $8° \leq \theta < 24°$, a standard pattern having a rotational angle of 15 degrees is selected. When a standard pattern having a rotational angle of 0 degrees is selected, a standard pattern having a rotational angle of 180° must also be selected. Similarly, when a standard pattern having a rotational angle of 15° is selected, a pattern having a rotational angle of 195° must also be selected, and when a standard pattern having a rotational angle of 30° is selected, a pattern having a rotational angle of 210° must also be selected. Therefore, in the similarity frequency calculation, various methods may be adopted. For example, the following method may be used. FIG. 35A shows a pattern extracted in the above-mentioned processing, and FIG. 35B shows a standard pattern having a predetermined rotational angle, which pattern is selected by the above-mentioned method. These patterns are respectively represented by B(i, j) and P(i, j).

B(i, j) and P(i, j) assume "1" when the pixel of interest is a black pixel, and assume a value of "0" when the pixel of interest is a white pixel. Also, when the barycentric coordinates of B(i, j) obtained in step 7104 in FIG. 34 are represented by (iBC, jBC), and the similarly obtained barycentric coordinates of P(i, j) are represented by (iPC, jPC), the similarity frequency COR between these patterns is given by:

$$COR = \sum_i \sum_j P(i-iPC, j-jPC) \star B(i-iBC, j-jBC) \quad (1)$$

where ☆ represents an exclusive OR, and equation (1) expresses the Hamming distance when the barycentric positions of the patterns B(i, j) and P(i, j) are caused to coincide with each other. As the value COR is larger, the similarity frequency between the two patterns becomes larger.

In this embodiment, in order to improve reliability of the similarity frequency, and to prevent generation of recognition errors as much as possible, the similarity frequency COR is calculated using equation (2) obtained by modifying equation (1):

$$COR = 2 \times \left( \sum_i \sum_j P(i-iPC, j-jPC) \cdot B(i-iBC, j-jBC) - \right.$$
$$\left. \left( \sum_i \sum_j \overline{P(i-iPC, j-jPC)} \cdot B(i-iBC, j-jBC) \right) \right) \quad (2)$$

where • represents an AND, and $\overline{P(i-iPC, j-jPC)}$ represents discrimination of P. When both P and B are black pixels, "2" is added to COR; when P=0 and B=1, "1" is subtracted from COR, thereby greatly improving recognition precision.

When the similarity frequency COR is calculated by the above-mentioned processing, the frequency COR is compared with a predetermined value Th in step 7107.

If COR>Th, it is determined that a red seal is present, and the presence of a specific original is determined in step 7108, thus ending the matching operation.

If COR<Th, it is determined that no red seal is present in the current processing area. If n is smaller than 4, n is incremented by 1, and the matching operation in steps 7101 to 7109 is repeated for the next area n. If it is determined in step 7109 that n=4, since it is determined that a red seal is present in none of the first to fourth areas, the absence of a specific original is determined in step 7110, and the matching operation ends.

(11th Embodiment)

In the 10th embodiment, whether or not an original is a copy-inhibited original is discriminated by pre-scanning an original. In such an embodiment, if no security is placed on the original table in the pre-scanning mode, and a security is placed in an actual scanning mode of the image forming operation, the security can be copied undesirably.

This embodiment solves this problem.

In this embodiment, an infrared fluorescent material based on multi-stage energy transmission is used. More specifically, a fluorescent compound of BaY1.34Yb0.60Er0.06F8 is used.

(Processing Flow)

FIG. 37 shows the relationship between scanning modes and printer outputs.

Figure 38:
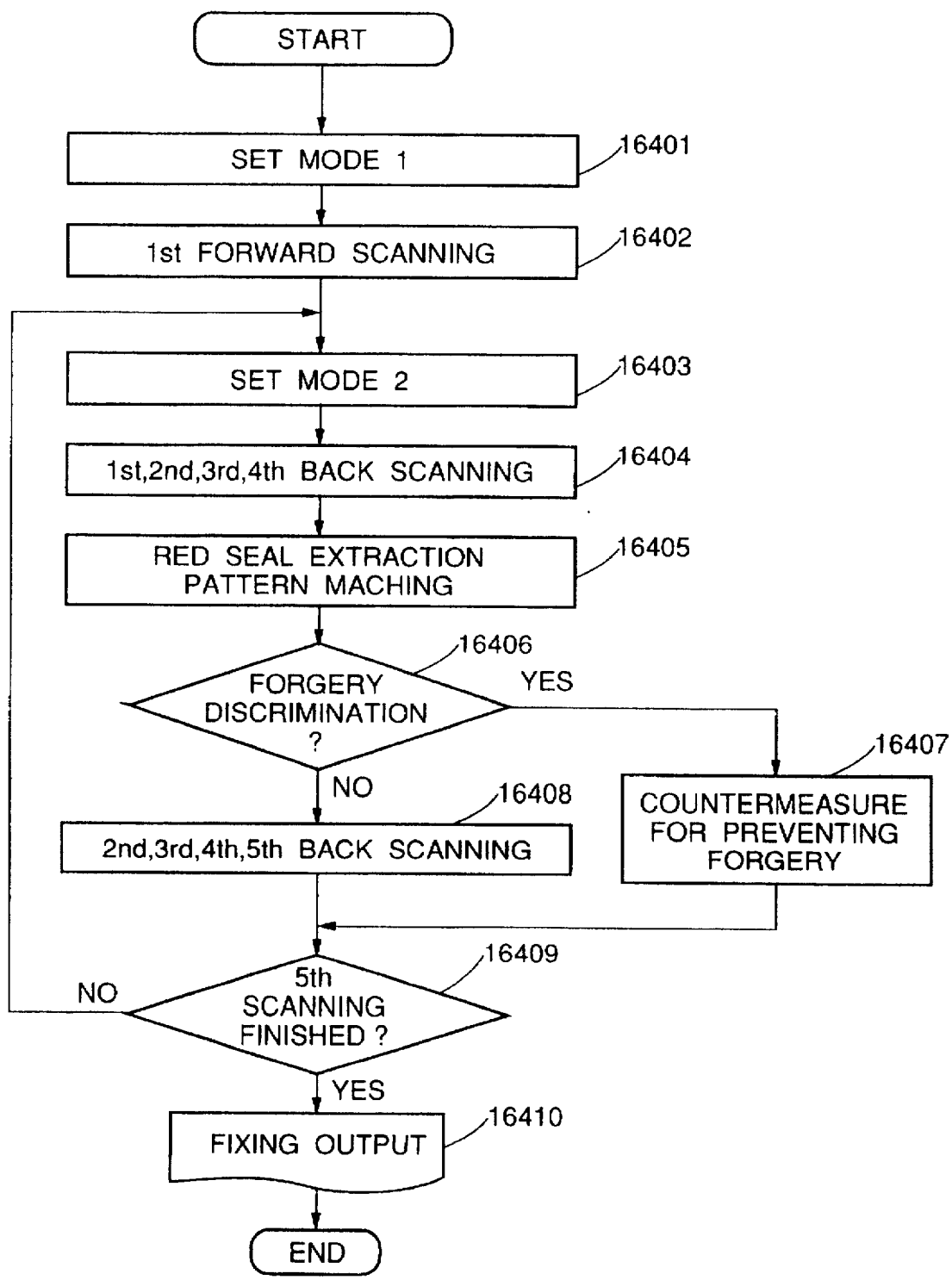
FIG. 38 is a flow chart of the 11th and 12th embodiments.

FIG. 38 is a flow chart showing processing under the control of the CPU. Referring to FIG. 38, when a copy start button is depressed, mode 1 is set (step 16401), and the 1st scanning is executed (step 16402). In this mode, the halogen lamp 205 is turned on, and the infrared LED 230 is not turned on. In this state, original size detection, original angle detection, and rough position detection of a watermark portion in an original are executed while moving the reading optical system forward. For this purpose, the CPU writes values capable of detecting a background of paper money in the registers 601 to 606 (FIG. 4) in the window comparator 5408.

The output from the window comparator 5408 is written in the RAM 5412 at four positions considered as the position of the red seal shown in FIG. 27.

Mode 2 is set (step 16403), a red seal pattern is read by backward scanning of the optical system (step 16404), and pattern matching is executed according to the algorithm described in the 10th embodiment (step 16405).

Forgery discrimination (step 16406) is executed by the same means as that in the 10th embodiment. If there is no possibility of forgery, i.e., if no red seal is detected, a normal image forming operation is performed by forward scanning (step 16408).

On the other hand, if it is determined in forgery discrimination step 16406 that there is a possibility of forgery, i.e., if a red seal is detected, a countermeasure for preventing forgery is taken in step 16407.

More specifically, a value "FFH" is set in the register 5408 (FIG. 29; a value "00H" is normally set), and is supplied to the printer unit. Thus, toners corresponding to the number of times of scanning operations are attached to the entire surface of a paper sheet to paint a copy, thus disturbing formation of a normal copied image.

In the 3rd, 4th, and 5th scanning operations, the same operations as in the 2nd scanning operation are repeated. Upon completion of the 5th scanning operation (step 16409), the developed image is fixed and output (step 16410), thus outputting a copy.

As described above, since a plurality of forgery discrimination operations (step 16406) are executed in the respective scanning operation, forgery becomes practically difficult to achieve.

(12th Embodiment)

In the 10th and 11th embodiments, a system using an infrared fluorescent material based on multi-stage energy transmission as an ink has been exemplified. In this embodiment, an infrared fluorescent material utilizing an infrared stimulation effect is used.

As described above, the infrared stimulation effect is a phenomenon wherein luminescence of visible light is generated by radiating infrared rays after light of a short wavelength is radiated in advance.

More specifically, the IR Phosphor Plate commercially available from Kodak Corp. is known as a substance having such an effect.

FIG. 39 shows the excitation spectrum a, stimulation spectrum b, and fluorescence spectrum c of the IR Phosphor Plate commercially available from Kodak Corp., and the emission spectrum d of the infrared LED.

The arrangement, sequence, and algorithm of the copying machine are substantially the same as those in the 11th embodiment, except that, as can be seen from the emission spectrum c shown in FIG. 39, since the LED emits red light, a fluorescent signal is read by the red CCD.

As a supplementary explanation, as for the excitation spectrum, since an original is irradiated with visible light emitted from the halogen lamp 205 in forward scanning, sufficient excitation light is obtained in subsequent scanning. Therefore, when an original is irradiated with light emitted from infrared LED 230 as stimulation light, stable light emission can be attained, thus obtaining a secondary effect.

As described above, a specific pattern is printed in advance on a specific original using an ink having characteristics that when excitation light of a specific wavelength is radiated onto the specific original, the ink emits light of a shorter wavelength than the specific wavelength, and the apparatus comprises illumination means having wavelength characteristics in a predetermined wavelength range including the wavelength of the excitation light. The specific pattern is read using sensor means having sensibility in a wavelength range including the emission wavelength and shorter than the predetermined wavelength range, and the similarity frequency between the read pattern and a pre-registered specific pattern is discriminated, thereby detecting a copy-inhibited original without influencing an actual use state under visible light.

Also, the apparatus comprises a light source having an excitation spectrum component, and a filter for attenuating a fluorescent wavelength component is arranged before light-receiving elements, thus allowing reading of fluorescent information at a high S/N ratio.

Since the emission spectrum component is present in the visible light range, a visible light receiving CCD which is normally used can be commonly used.

Since information which cannot be identified under visible light is recorded as visible information, a normal copying operation of a copy-inhibited original can be prevented.

When a specific pattern is read from an original, on which the specific pattern is printed using an ink which emits light of a wavelength different from a specific wavelength upon radiation of light of the specific wavelength, at a timing different from an image formation sequence, a copy-inhibited original can be detected without influencing an actual use state under visible light.

As described above, according to the above embodiments, a specific image can be reliably discriminated. The present invention can be modified within the scope of claims to be described below.

What is claimed is:

1. An image processing apparatus comprising:

reading means for reading an object image;

illumination means for illuminating the object image;

detection means for detecting light excited in response to illumination of the object image in a plurality of wavelengths different from each other, and for outputting a plurality of detection results;

discrimination means for discriminating the object image according to a combination of the plurality of detection results output by said detection means; and control means for controlling said reading means in response to a discrimination result produced by said discrimination means.

2. An apparatus according to claim 1, further comprising:

control means for controlling an output from said image processing apparatus in accordance with a detection result of said detection means.

3. An apparatus according to claim 1, further comprising:

image forming means for performing image formation in accordance with an output from said image processing apparatus.

4. An apparatus according to claim 3, further comprising:

control means for controlling an operation of said image forming means in accordance with a detection result from said detection means.

5. An apparatus according to claim 1, wherein said illumination means emits infrared rays.

6. An apparatus according to claim 1, wherein said illumination means emits ultraviolet rays.

7. An apparatus according to claim 1, wherein said wavelengths different from each other are specific wavelengths and said discrimination means discriminates an area in which the excited light of the specific wavelength is obtained.

8. An image processing apparatus comprising:

illumination means for illuminating an object image with a plurality of wavelengths different from each other;

detection means for detecting light excited in response to illumination of the object image with the plurality of wavelengths different from each other, and for outputting a plurality of detection results respectively corresponding to the plurality of wavelengths; and discrimination means for discriminating the object image according to a combination of the plurality of detection results output by said detection means, wherein said wavelengths different from each other are specific wavelengths and said discrimination means discriminates an area in which the excited light of the specific wavelengths is obtained, and wherein said discrimination means includes count means for counting the number of pixels from which the specific wavelengths are obtained.

9. An image reading apparatus comprising:

illuminatino means for illuminating an object image with a light beam including a predetermined wavelength; and detection means for detecting a light beam reflected by the object image upon illumination by said illumination means wherein said detection means detects a light beam of a shorter wavelength than said predetermined wavelength, and wherein the object image excites the light beam of the shorter wavelength than said predetermined wavelength by a light beam of said predetermined wavelength on the basis of a multi-stage energy transmission.

10. An apparatus according to claim 9, further comprising:

control means for controlling an output from said image reading apparatus in accordance with a detection result of said detection means.

11. An apparatus according to claim 9, further comprising:

image forming means for performing image formation in accordance with an output from said image reading apparatus.

12. An apparatus according to claim 11, further comprising:

control means for controlling an operation of said image forming means in accordance with a detection result from said detection means.

13. An apparatus according to claim 9, wherein said illumination means emits infrared rays.

14. An apparatus according to claim 9, further comprising:

discrimination means for discriminating a position pattern of the light beam of said short wavelength.

15. An apparatus according to claim 14, wherein said discrimination means discriminates by pattern matching whether or not said position pattern is the same as a predetermined pattern.

16. An image reading apparatus comprising:

first illumination means for illuminating an object image so as to perform a normal reading operation;

second illumination means for illuminating the object image with light characteristics different from characteristics of light emitted from said first illumination means, to discriminate that the object image is a specific image;

conversion means for converting a light beam reflected by the object image illuminated with light emitted from said first and second illumination means into an electrical signal; and control means for controlling conversion characteristics of said conversion means when the object image is illuminated with light emitted from each of said first and second illumination means.

17. An apparatus according to claim 16, wherein said second illumination means comprises means for illuminating said object image with ultraviolet rays or infrared rays.

18. An apparatus according to claim 16, further comprising:

control means for simultaneously operating said first and second illumination means.

19. An apparatus according to claim 16, further comprising:

means for adjusting a quantity of light emitted from each of said first and second illumination means.

20. An apparatus according to claim 16, further comprising:

correction means for correcting the electrical signal converted by said conversion means when the object image is illuminated with light emitted from each of said first and second illumination means.

21. An apparatus according to claim 16, further comprising:

image forming means for performing image formation in accordance with an output from said image reading apparatus.

22. An apparatus according to claim 21, further comprising:

control means for controlling an operation of said image forming means in accordance with a detection result from said detection means.

23. An image processing method comprising the steps of:

reading an object image;

illuminating the object image with light;

detecting light excited in response to illumination of the object image in a plurality of wavelengths different from each other, and outputting a plurality of detection results;

discriminating the object image according to a combination of the plurality of detection results; and controlling said reading step in response to a discrimination result produced by said discriminating step.

24. A method according to claim 23, further comprising the step of controlling an output from an image processing apparatus in accordance with a detection result obtained in said detecting step.

25. A method according to claim 23, further comprising the step of performing image formation in accordance with an output from an image processing apparatus in accordance with a result obtained in said discriminating step.

26. A method according to claim 25, further comprising the steps of:

controlling performance of said image forming step in accordance with a detection result obtained in said detecting step.

27. A method according to claim 23, wherein, in said illuminating step, infrared rays are emitted.

28. A method according to claim 23, wherein, in said illuminating step, ultraviolet rays are emitted.

29. A method according to claim 23, wherein the wavelengths different from each other are specific wavelengths and wherein, in said discriminating step, an area is discriminated in which the excited light of the specific wavelength is obtained.

30. An image processing method comprising the steps of:

illuminating an object image with a plurality of wavelengths different from each other;

detecting light excited in response to illumination of the object image by the plurality of wavelengths different from each other, and outputting a plurality of detection results respectively corresponding to the plurality of wavelengths; and discriminating the object image according to a combination of the plurality of detection results, wherein the wavelengths different from each other are specific wavelengths and wherein, in said discriminating step, an area is discriminated in which the excited light of the specific wavelengths is obtained, and wherein said discriminating step includes counting the number of pixels from which the specific wavelengths are obtained.

31. An image reading method, comprising the steps of:

illuminating an object image with a light beam including a predetermined wavelength; and detecting a light beam reflected by the object image upon illumination in said illuminating step, wherein, in said detecting step, a light beam of a shorter wavelength than the predetermined wavelength is detected, and wherein the object image excites the light beam of the shorter wavelength than the predetermined wavelength by a light beam of the predetermined wavelength on the basis of a multi-stage energy transmission.

32. A method according to claim 31, further comprising the step of controlling an output from said image reading method in accordance with a detection result obtained in said detecting step.

33. A method according to claim 31, further comprising the step of performing image formation in accordance with an output from said image reading method.

34. A method according to claim 33, further comprising the step of controlling performance of said image forming step in accordance with a detection result obtained in said detecting step.

35. A method according to claim 31, wherein said illuminating step includes emitting infrared rays.

36. A method according to claim 31, further comprising the step of discriminating a position pattern of the light beam of the short wavelength.

37. A method according to claim 36, wherein said discriminating step is performed by pattern matching whether or not the position pattern is the same as a predetermined pattern.

38. An image reading method comprising the steps of:

illuminating an object image so as to perform a normal reading operation;

illuminating the object image with light characteristics different from characteristics of light emitted in said first illuminating step, to discriminate whether the object image is a specific image;

converting a light beam reflected by the object image illuminated with light emitted in said first and second illuminating steps into an electrical signal; and controlling conversion characteristics in said converting step when the object image is illuminated with light emitted in each of said first and second illuminating steps.

39. A method according to claim 38, wherein said second illuminating step includes illuminating the object image with ultraviolet rays or infrared rays.

40. A method according to claim 39, further comprising the step of simultaneously performing said first and second illuminating steps.

41. A method according to claim 38, further comprising the step of adjusting a quantity of light emitted in each of said first and second illuminating steps.

42. A method according to claim 38, further comprising the step of correcting the electrical signal converted in said converting step when the object image is illuminated with light emitted in each of said first and second illuminating steps.

43. A method according to claim 38, further comprising the step of performing image formation in accordance with an output from said image reading method.

44. A method according to claim 43, further comprising the step of controlling performance of said image forming step in accordance with a detection result obtained in said detecting step.

45. A reading apparatus comprising:

first illumination means for illuminating a first reference plate;

second illumination means for illuminating a second reference plate with light characteristics different from characteristics of light emitted from said first illumination means;

detection means for detecting light reflected from the first reference plate and light reflected from the second reference plate; and control means for controlling an amount of light emitted from said first illumination means according to the detection of reflected light from said first reference plate, and for controlling an amount of light emitted from said second illumination means according to the detection of reflected light from said second reference plate.

46. An apparatus according to claim 45, wherein said first illumination means comprises a fluorescent lamp.

47. An apparatus according to claim 45, wherein said second illumination means comprises a halogen lamp.

48. An image reading apparatus comprising:

first illumination means for illuminating an object image so as to perform a normal reading operation;

second illumination means for illuminating the object image with light characteristics different from the characteristics of light emitted from said first illumination means;

reading means for reading the object image according to illumination of the object image by said first illumination means or said second illumination means; and control means for controlling an operation of said reading means in accordance with whether said first illumination means illuminates the object image or said second illumination means illuminates the object image, wherein said control means controls said reading means so that a reading signal level of said reading means assumes a high level when said reading means reads excited light generated by said second illumination means.

49. An apparatus according to claim 48, wherein said first illumination means comprises a fluorescent lamp.

50. An apparatus according to claim 48, wherein said second illumination means comprises a halogen lamp.

51. An apparatus according to claim 48, wherein said controlling mans controls a reading speed.

52. An apparatus according to claim 48, wherein said reading means comprises a charge coupled device and wherein said control means controls an accumulation time of said charge coupled device.

* * * * *

UNITED STATES PATENT AND TRADEMARK OFFICE
CERTIFICATE OF CORRECTION

PATENT NO. : 5,650,863
DATED : July 22, 1997
INVENTOR(S) : TSUTOMU UTAGAWA, ET AL.

It is certified that error appears in the above-identified patent and that said Letters Patent is hereby corrected as shown below:

ABSTRACT

[57]

"first and second" should be deleted.

SHEET 7

Sheet 7 of the drawings should show:

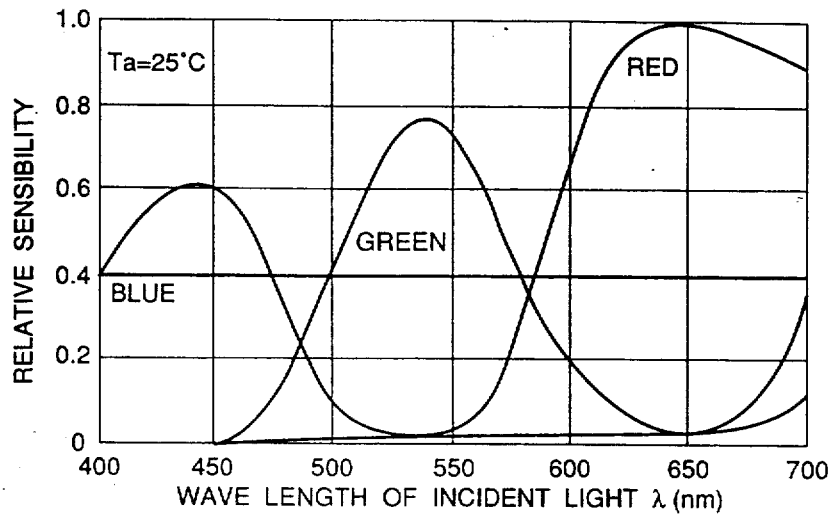

FIG.6A

UNITED STATES PATENT AND TRADEMARK OFFICE
CERTIFICATE OF CORRECTION

PATENT NO. : 5,650,863
DATED : July 22, 1997
INVENTOR(S) : TSUTOMU UTAGAWA, ET AL.

It is certified that error appears in the above-identified patent and that said Letters Patent is hereby corrected as shown below:

SHEET 7 (Continuation)

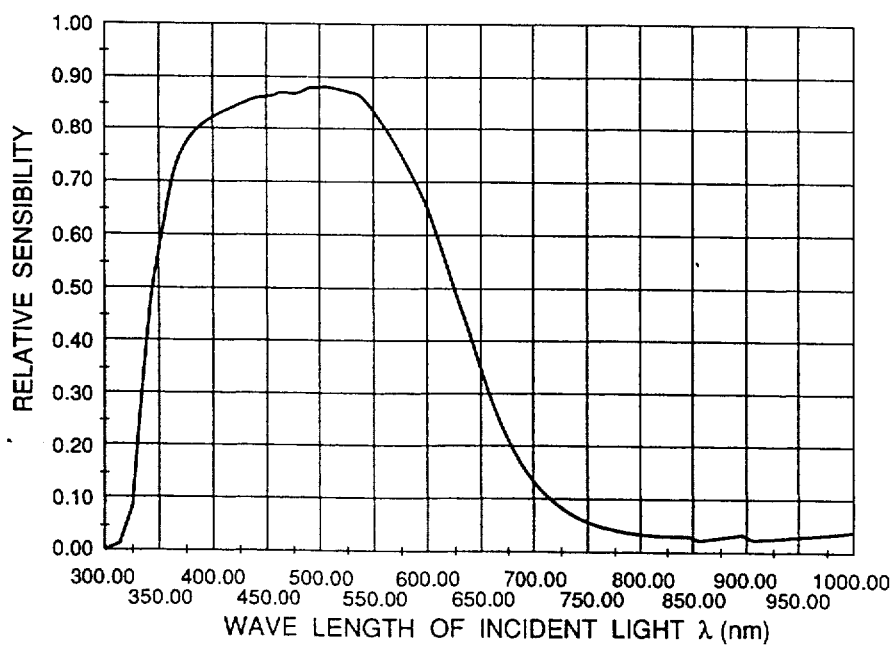

FIG.6B

UNITED STATES PATENT AND TRADEMARK OFFICE
CERTIFICATE OF CORRECTION

PATENT NO. : 5,650,863
DATED : July 22, 1997
INVENTOR(S) : TSUTOMU UTAGAWA, ET AL.

It is certified that error appears in the above-indentified patent and that said Letters Patent is hereby corrected as shown below:

SHEET 43

Figure 37, ".FORGREY" (both occurrences) should read -- .FORGERY--.

SHEET 44

Figure 38, "MACHING" should read --MATCHING--.

COLUMN 1

Line 26, "pen,.a" should read "pen, a--.
    Line 34, "operation" should be deleted.

COLUMN 4

Line 28, "(1/2) v" should read --(1/2)v--.

COLUMN 8

Line 16, "pate" should read --gate--.

UNITED STATES PATENT AND TRADEMARK OFFICE
CERTIFICATE OF CORRECTION

PATENT NO. : 5,650,863
DATED : July 22, 1997
INVENTOR(S) : TSUTOMU UTAGAWA, ET AL.

It is certified that error appears in the above-indentified patent and that said Letters Patent is hereby corrected as shown below:

COLUMN 9

Line 47, "pains" should read --gains--.
    Line 48, "pain" should read --gain--.

COLUMN 13

Line 20, "30701. FIG." should read --30701. (paragraph break before) FIG.--.

COLUMN 15

Line 2, "a police" should read --the police--.

COLUMN 16

Line 51, "effect The" should read --effect. (paragraph break before) The--.

COLUMN 17

Line 23, "&" should read --and--.

UNITED STATES PATENT AND TRADEMARK OFFICE
CERTIFICATE OF CORRECTION

PATENT NO. : 5,650,863

DATED : July 22, 1997

INVENTOR(S) : TSUTOMU UTAGAWA, ET AL.

It is certified that error appears in the above-indentified patent and that said Letters Patent is hereby corrected as shown below:

COLUMN 27

Line 37, "31," should read --Claim 31,--.

COLUMN 28

Line 40, "light" should read --light having--.

Signed and Sealed this

Seventeenth Day of February, 1998

Attest:

BRUCE LEHMAN

Attesting Officer     Commissioner of Patents and Trademarks